(12) United States Patent
Daraiseh et al.

(10) Patent No.: US 8,942,098 B2
(45) Date of Patent: Jan. 27, 2015

(54) ADAPTIVE HYBRID WIRELESS AND WIRED PROCESS CONTROL SYSTEM WITH HIERARCHICAL PROCESS AUTOMATION FIELD NETWORK SETS

(75) Inventors: Abdelghani Daraiseh, Dhahran (SA); Mohamed Adnan Landolsi, Dhahran (SA)

(73) Assignees: Saudi Arabian Oil Company, Dhahran (SA); King Fahd University Of Petroleum & Minerals, Dhahran (SA)

( * ) Notice: Subject to any disclaimer, the term of this patent is extended or adjusted under 35 U.S.C. 154(b) by 316 days.

(21) Appl. No.: 13/508,083

(22) PCT Filed: Nov. 3, 2010

(86) PCT No.: PCT/US2010/055236
§ 371 (c)(1),
(2), (4) Date: Nov. 29, 2012

(87) PCT Pub. No.: WO2011/056833
PCT Pub. Date: May 12, 2011

(65) Prior Publication Data
US 2013/0077477 A1    Mar. 28, 2013

Related U.S. Application Data

(60) Provisional application No. 61/258,119, filed on Nov. 4, 2009.

(51) Int. Cl.
*H04L 12/26* (2006.01)
*H04L 12/28* (2006.01)
(Continued)

(52) U.S. Cl.
CPC ............. *H04W 40/14* (2013.01); *H04W 40/22* (2013.01); *H04L 45/04* (2013.01); *H04L 45/124* (2013.01); *H04L 45/24* (2013.01); *H04L 45/42* (2013.01)
USPC .......................................... 370/235; 370/254

(58) Field of Classification Search
USPC ......................................... 370/328, 338, 408
See application file for complete search history.

(56) References Cited

U.S. PATENT DOCUMENTS 5,428,636 A    6/1995 Meier
6,895,547 B2 *    5/2005 Eleftheriou et al. .......... 714/801

(Continued)

OTHER PUBLICATIONS

Search Report and Written Opinion from priority international application PCT/US2010/055236, mailed Dec. 29, 2010 (21 pages).

(Continued)

*Primary Examiner* — Warner Wong
(74) *Attorney, Agent, or Firm* — Abelman, Frayne & Schwab

(57) ABSTRACT

A hybrid wired and wireless architecture for a process control system is disclosed that includes hierarchical adaptability and optimization capabilities. The system is arranged in three tiers, the first including a number of wireless end devices exchanging packets of data and/or instructions with the distributed control system, where each wireless end device is associated with one or more meters, remote terminal units, diagnostic devices, pumps, valves, sensors, or tank level measuring devices. The second tier includes a plurality of wireless routers, each including a memory that stores a routing table and a processor that routes packets. The third tier includes a master wireless gateway device operably connected to receive packets from and transmit packets to the distributed control system. The processor of each of the wireless routers routes packets across the tiers between the end devices and the wireless gateway devices based on the stored routing table.

66 Claims, 32 Drawing Sheets

(51) Int. Cl.
*H04W 40/14* (2009.01)
*H04W 40/22* (2009.01)
*H04L 12/715* (2013.01)
*H04L 12/721* (2013.01)
*H04L 12/707* (2013.01)
*H04L 12/717* (2013.01)

(56) References Cited

U.S. PATENT DOCUMENTS

| | | | |
|---|---|---|---|
| 6,961,584 B2* | 11/2005 | Leedom, Jr. | 455/552.1 |
| 2001/0044305 A1* | 11/2001 | Reddy et al. | 455/436 |
| 2002/0009056 A1* | 1/2002 | Kanehara | 370/255 |
| 2002/0025817 A1* | 2/2002 | Karino et al. | 455/445 |
| 2003/0169719 A1* | 9/2003 | Isobe et al. | 370/338 |
| 2004/0017783 A1* | 1/2004 | Szentesi et al. | 370/256 |
| 2005/0265259 A1* | 12/2005 | Thubert et al. | 370/255 |
| 2006/0227724 A1* | 10/2006 | Thubert et al. | 370/254 |
| 2008/0037525 A1 | 2/2008 | Karaoguz | |
| 2008/0126665 A1* | 5/2008 | Burr et al. | 710/316 |
| 2008/0279183 A1* | 11/2008 | Wiley et al. | 370/389 |
| 2009/0046602 A1* | 2/2009 | Mahany et al. | 370/255 |
| 2009/0154482 A1* | 6/2009 | Ham et al. | 370/408 |
| 2010/0034211 A1* | 2/2010 | Yanagihara | 370/408 |

OTHER PUBLICATIONS

IPRP from priority international application PCT/US2010/055236, mailed Mar. 28, 2012 (4 pages).

Supplemental Search Report from counterpart EPO Application No. 10829005.7, dated Apr. 12, 2013 (8 pages).

\* cited by examiner

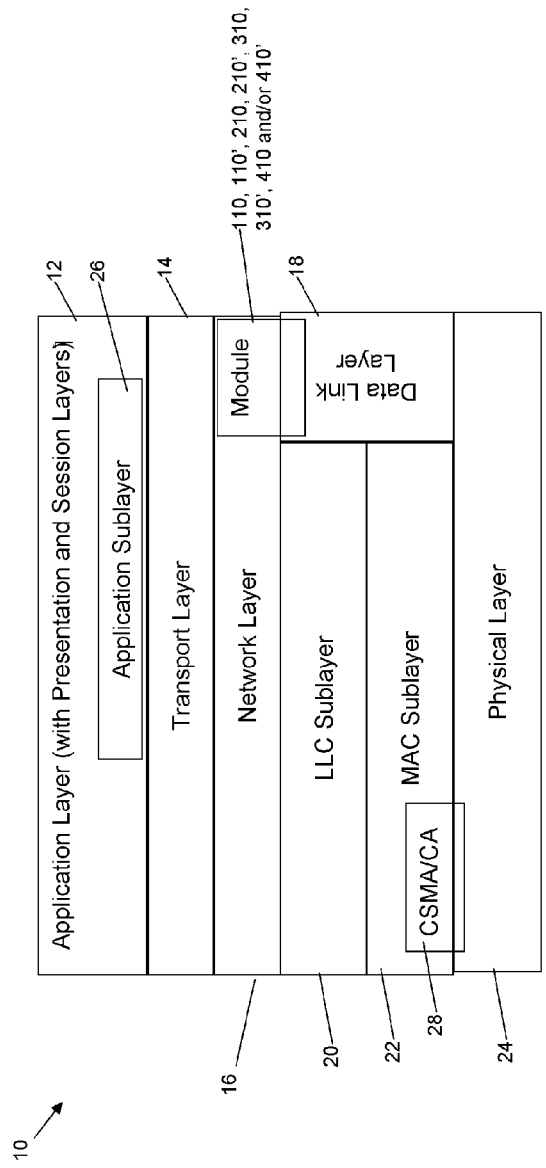

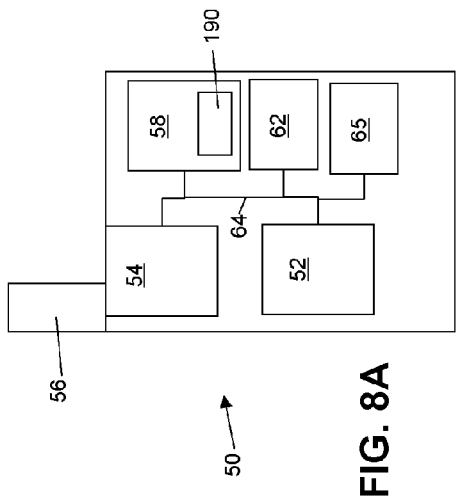
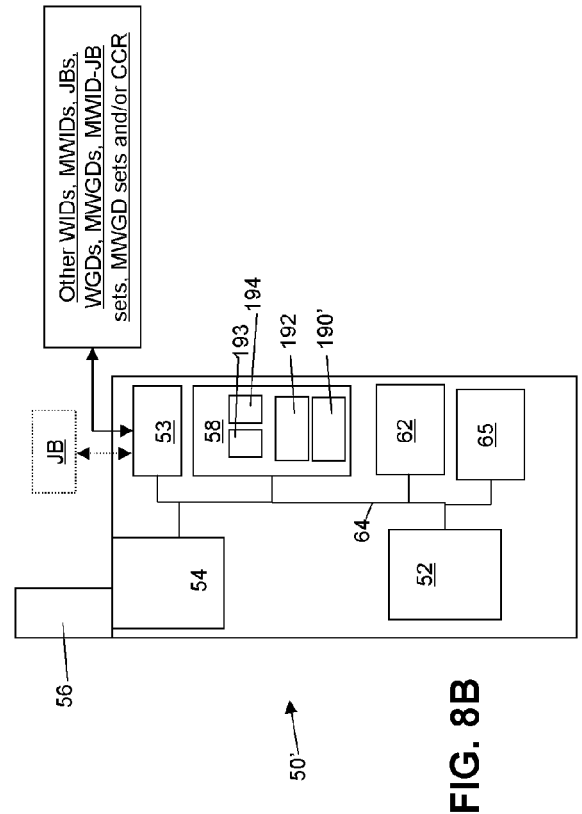
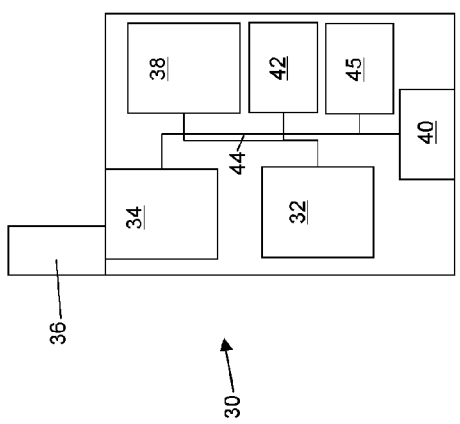

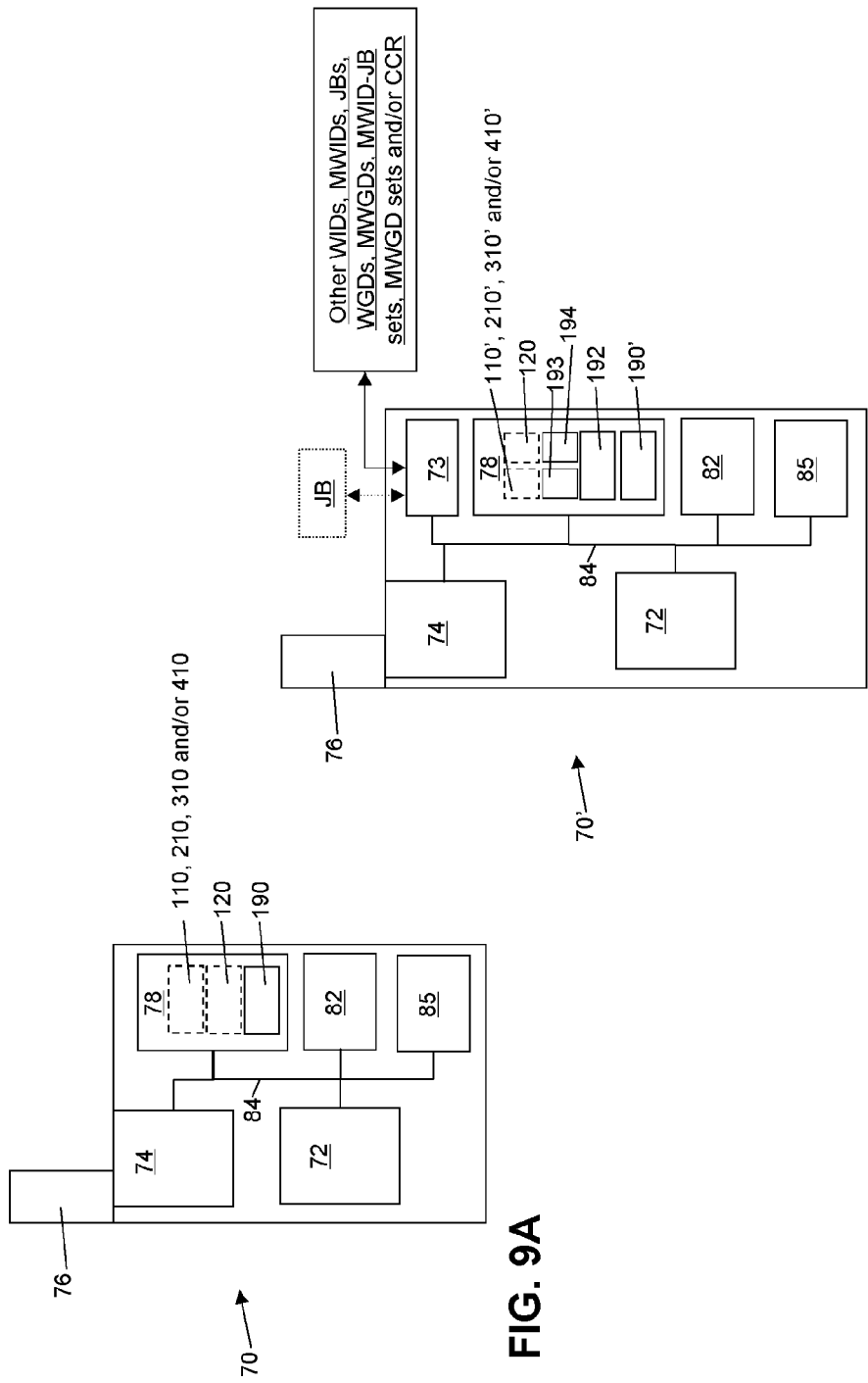

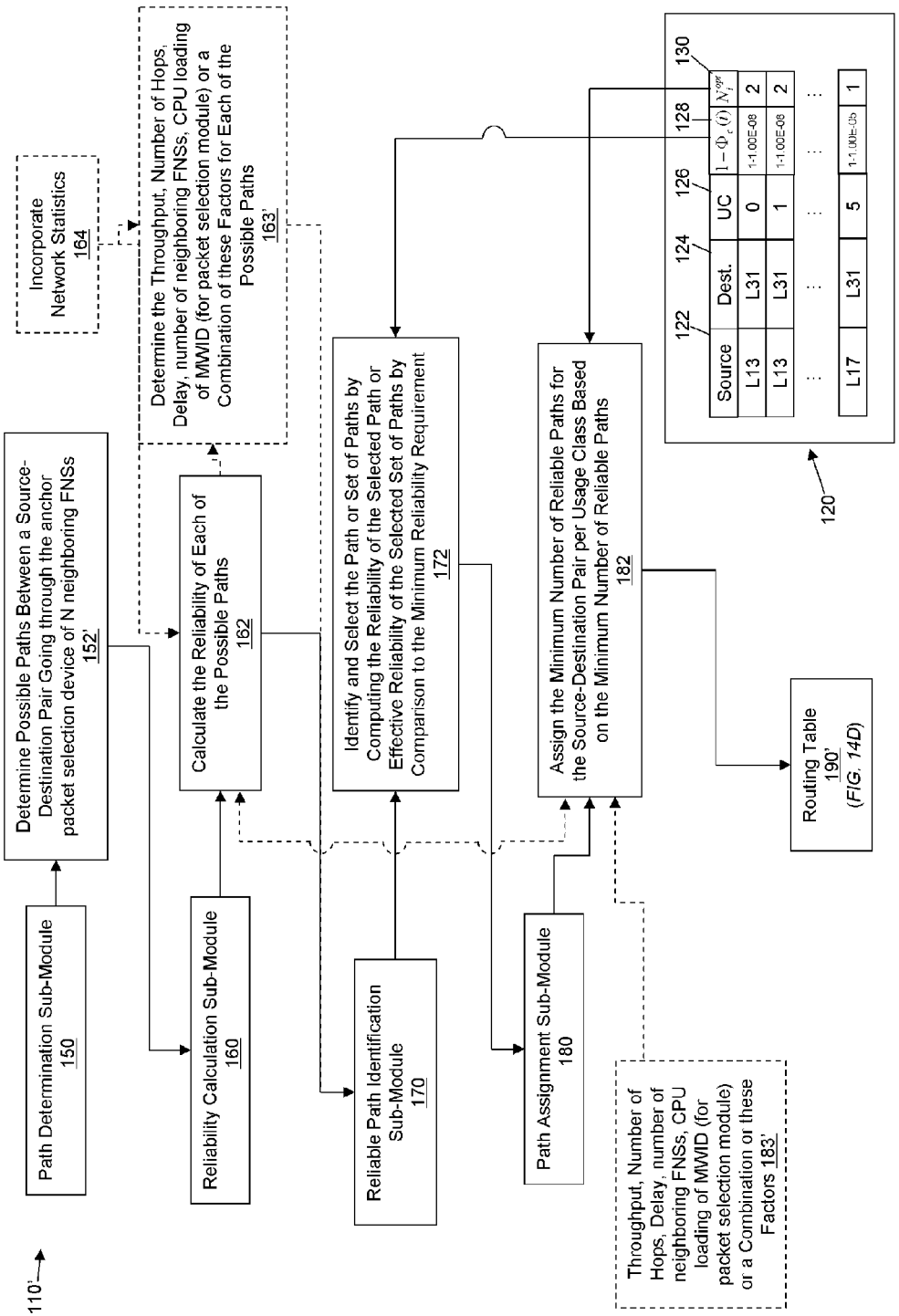

FIG. 14D

Path Routing Table

| UC | Assigned Path | Assigned FNSs | Assigned Anchor PS | Alt. Path | Assigned FNSs | Alt. Anchor PS |
|---|---|---|---|---|---|---|
| 0 | A & B | I & III | I-4 & III-7 | C & D | V & II | V-1 & II-5 |
| 1 | A & B | I & III | I-4 & III-7 | C & D | V & II | V-1 & II-5 |
| 2 | A & B | I & III | I-4 & III-7 | C & D | V & II | V-1 & II-5 |
| 3 | A & B | I & III | I-4 & III-7 | C & D | V & II | V-1 & II-5 |
| 4 | B | III | III-7 | A & C | I & V | I-4 & V-1 |
| 5 | B | III | III-7 | A & C | I & V | I-4 & V-1 |

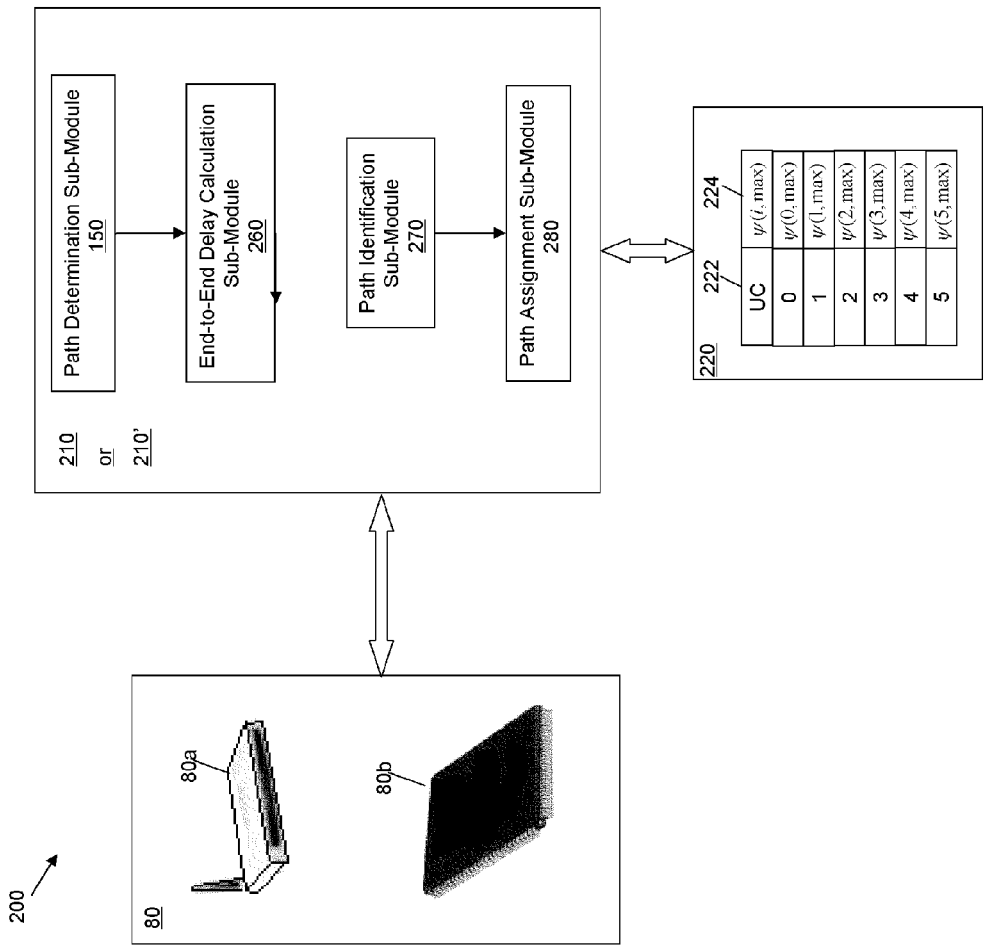

FIG. 15D

| Path Routing Table | | | |
|---|---|---|---|
| UC | Assigned Path | Assigned FNSs | Assigned Anchor PS |
| 0 | A & B | I & III | I-4 & III-7 |
| 1 | A & B | I & III | I-4 & III-7 |
| 2 | A & B | I & III | I-4 & III-7 |
| 3 | A & B | I & III | I-4 & III-7 |
| 4 | B | III | III-7 |
| 5 | B | III | III-7 |

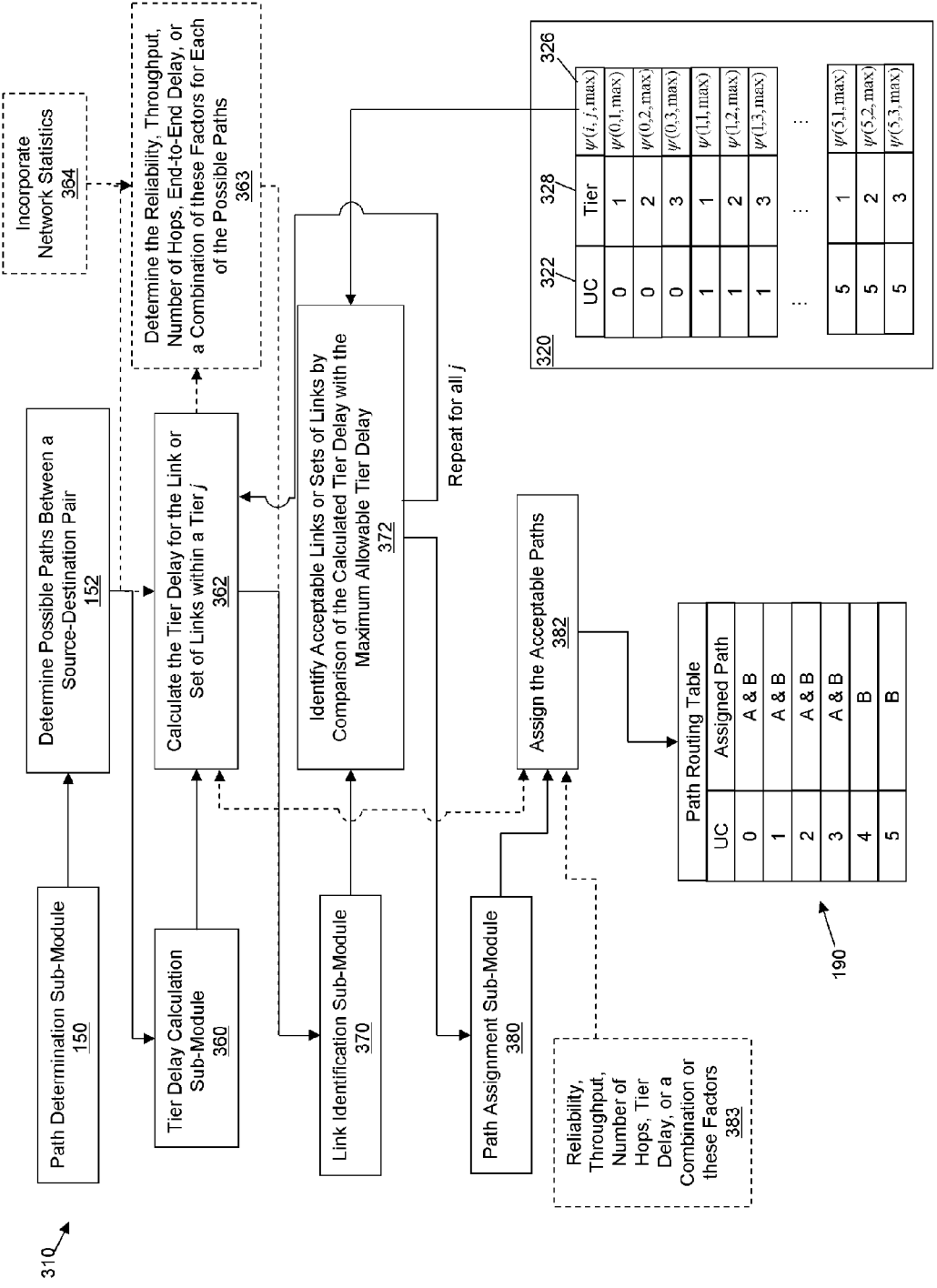

ADAPTIVE HYBRID WIRELESS AND WIRED PROCESS CONTROL SYSTEM WITH HIERARCHICAL PROCESS AUTOMATION FIELD NETWORK SETS

RELATED APPLICATIONS

This application is a United States national phase application under 35 USC §371 of PCT/US10/55236 filed on Nov. 3, 2010, which claims the benefit of U.S. Provisional Patent Application No. 61/258,119 filed Nov. 4, 2009, the disclosures of which is are both incorporated herein by reference in their entireties.

BACKGROUND OF THE INVENTION

1. Field of the Invention

The present invention relates to process control systems and methods, and more particularly to such systems and methods that include hierarchical adaptability and optimization capabilities to operate a hybrid wired and wireless process control and/or automation network while utilizing minimum system resources.

2. Description of Related Art

The current architecture of the wireless networks in various commercial and industrial processing facilities, including hydrocarbon and petrochemical plants, necessitates that most information packets transmitted from the wireless end devices (WEDs) have a single destination, the Central Control Room (CCR). However, the transmissions from the WEDs are passed through several wireless intermediate devices (WIDs) and wireless gateway devices (WGDs), resulting in multiple copies of the same packet arriving at the Central Control Room (CCR) gateway(s). WEDs can transmit to and receive from all other devices, but cannot route to other devices. WIDs transmit to and receive from all other devices, and route to other devices. WGDs transmit to, receive from, and route between other devices, and also conduct high level applications including protocol translation and assignment of paths for source-destination pairs. As used herein, the components WEDs, WIDs and WGDs are also referred to as "nodes."

Since a typical industrial process requires thousands of instruments, e.g., sensors, valves, diagnostic devices, and the like, that all must transmit information to the CCR, there exists, in the present state of the art, massive contention for access over the wireless bandwidth spectrum in and around the CCR. This contention ultimately results in degradation of the signal throughput and high packet loss rate.

As used herein, "commercial and industrial processing facilities" include chemical plants, hydrocarbon facilities, petrochemical facilities, manufacturing factories, or any facility that uses wireless process automation and/or control.

FIG. 1 is a schematic diagram of hardware interconnectivity for a typical prior art process control network 500 in a commercial and/or industrial processing facility. In FIG. 1, wired connectivity is depicted with solid double-arrow lines between nodes, and wireless connectivity is depicted with dashed double-arrow lines between nodes. Several junction boxes 506 (JBs), and up to several hundred in typical process control systems, are connected, typically by copper or fiber optic wires, to one or more marshalling cabinets 504 in the central control room 501 (CCR). The CCR 501 includes a distributed control system 502 that generally includes at least one processor coupled to a memory for providing functionality necessary for plant automation and/or control. Junction boxes 506 provide data distribution functionality and power (current and voltage) control, and are equipped with requisite power connectivity and a suitable environmental enclosure. The marshalling cabinets 504 provide interconnectivity between several junction boxes 506, and serve as an access point in the CCR 501 for installation of additional JBs, maintenance, testing and service. The JBs can be connected to any wired communication enabled pressure sensor, temperature sensor, pump, valve, tank level gauge, and the like. Typically these end devices can be the same process control device that connects to a WED, the difference being the I/O card of the end device. That is, end devices can be connected to the JBs when they support wired-only connectivity, or both wireless and wired connectivity. For end devices that support wireless-only connectively, a WED must be used. Typically, spare copper or fiber optic wires are provided in a trench between each junction box 506 and the CCR for future growth and expansion. These wire connections can be accessed at the junction boxes 506 and/or surrounding areas. The junction boxes 506 and the plant hardware in wired communication thereto (not shown), along with the marshalling cabinets, for, an independent wired network 509 in typical commercial and industrial processing facilities.

Traditionally, plant and industrial networks have relied on the wire as a means for communications and networking. Wireless communications were introduced within facilities as independent networks. Therefore commercial and industrial processing facilities commonly include a wireless network that is independent of the wired network. The wireless network generally includes a master WGD 510 coupled to the distributed control system 502 via an input/output interface 508. Several WGDs 512 and WIDs 514 are interconnected to each other and to the master WGD 510. The WIDs 514 receive and transmit data from/to the WEDs 516.

In prior art systems as shown in FIG. 1, the wireless network 520 under the control of the master WGD 510 Gateway is completely isolated from the wired network 509 connecting the several junction boxes 506 through the marshalling cabinets 504.

All field devices and subsystems, in the order of thousands, are typically within a relatively small area in a commercial and industrial processing facility, e.g., in a space on the order of about 500 meters by about 300 Meters. The WEDs 516 at the field devices generally broadcast their data, which is received by any and all available WIDs 514 and/or WGDs 512. The WIDs 514 retransmit the data to WGDs 512 and the master WGD 510, and the WGDs 512 retransmit the data to the master WGD 510. Ultimately, packet selection is accomplished with one or more appropriate software and/or firmware modules executable by the master WGD 510, which select the first packet that appears to have accurate data, and subsequent packets containing copes of the same data are discarded. This architecture, with substantial redundancy, is conventionally implemented to ensure that all of the data transmitted from the WEDs 516 is received at the CCR 501 for subsequent action and/or data collection purposes.

The International Society of Automation (ISA) has established a Wireless Systems for Automation Standards Committee (ISA-SP100) tasked with defining wireless connectivity standards. The SP100 wireless standard for process automation systems is applicable to industries such as oil and gas, petrochemical, water/wastewater treatment and manufacturing. The SP100 standard is intended for use in the 2.4 GHz band, with data transfer at speeds up to 250 kilobytes per second within a 300 meter range. SP100 devices have relatively lower data rates and energy requirements than comparable wireless Local Area Networks (LAN), as they are intended to be low-cost devices. Another commonly employed wireless process control and/or automation network has been recently developed as a derivative of the Highway Addressable Remote Transmitter (HART) Communication Foundation protocols, referred to generally as the HART® protocol.

The SP100 protocol specifies different types of communications, categorized as "usage classes," and increasing in criticality based upon decreasing numerical designation. "Class 0" communications include those categorized as critical for safety applications such as emergency shut-down systems, and are deemed always critical; "Class 1" is for closed-loop regulatory control, often deemed critical; "Class 2" is for closed-loop supervisory control, usually non-critical; "Class 3" is for open-loop control; "Class 4" is for alerting or annunciation; and "Class 5" is for data logging. Certain events, such as alarms, can have different classifications of service depending on the message type.

FIG. 2 is a schematic diagram of a prior art architecture for a wireless process control system 600 of the prior art, e.g., operating under the SP100 standard. In general, devices in an SP100 system are divided into three categories, commonly referred to as "tiers." Tier 1 includes end devices, such as meters, remote terminal units, valves, sensors, tank level measuring devices, and the like, each of which is connected to a WED 616. Tier 2 includes WIDs 614 and tier 3 includes WGDs 612. As described above, WEDs 616 can transmit to and receive from all other devices, but cannot route to other devices; WIDs 614 transmit to and receive from all other devices, and route to other devices; and WGDs 612 transmit to, receive from, and route between other devices, and also conduct high level applications including protocol translation and assignment of paths for source-destination pairs. In addition, a master wireless gateway device 610 is provided at tier 3, which is coupled to the CCR 601 and controls the ultimate communication of data to and from the DCS 602. Individual nodes are also labeled for further clarity of description and to simplify certain examples provided herein.

Connectivity between WEDs L17 and L13 and WGDs L35 and L31, respectively, is illustrated, although as will be understood by one of ordinary skill in the art, connectivity is typically provided between all WEDs 616 and the master WGD 610 for communication with the DCS 602. A path is the series of nodes commencing with the transmitting node, ending with the receiving node, and including the routing nodes therebetween. A link is a specific coupling within such a path. For example, L17-L293-L292-L36-L35 is a path for the source-destination pair L17-L35, and L292-L36 is one of the links within this path.

Devices in an SP100 wireless system are generally connected in the form of a mesh or star-mesh network. Connection between the various devices is performed through radio communications, for instance as specified by a Carrier Sense Multiple Access with Collision Avoidance (CSMA-CA) protocol or the like, and connections are established at a network layer and a Medium Access Control (MAC) layer.

In existing wireless process control and/or automation systems, every frame transmitted from a WED 616 to the DCS 602 at the CCR 601 is treated the same, regardless of its usage class or criticality. The standards mandate that the transmitted frames reach the DCS 602 within a specified maximum allowable end-to-end time delay and a specified frame error rate (FER). Commonly, all WIDs 614 and WGDs 612 route incoming traffic irrespective of the usage class, and without regard to a frame's status as an original transmission or a retransmission. Multiple paths between WEDs 616 and the master WGD 610 are typically specified in a routing table for increased reliability of data frame transmission and receipt. Retransmission of frames occurs and is requested if the received frame is judged to be erroneous or no acknowledgment is received (i.e., a timeout occurs).

While a large number of paths provide a certain degree of reliability, this topology increases the bandwidth requirements for the wireless spectrum and battery energy usage, and the quantity and/or sophistication level of the requisite hardware. Redundancy of transmission paths also requires additional capital investment in hardware and increased costs for the necessary testing and maintenance of the additional routers. In addition, channel contention often occurs due to high channel utilization, increased latency between the WEDs 616 and CCR 601, and frame blocking. Therefore, diminishing returns result, such that an increase in the number of paths beyond a certain level will not significantly increase the reliability, thereby inefficiently using bandwidth, hardware and battery power. Wireless implementation of the SP100 and the HART® protocols have suffered similar drawbacks including excess battery usage and increased channel contention.

Therefore, there is a significant need to reduce the number of unnecessary transmissions and reduce the number of wireless routers. In addition, a need exists for reliable and adaptable methods and systems to operate a wireless process control and/or automation network while utilizing minimum system resources.

Accordingly, it is an object of the present invention to reduce the overall congestion of wireless traffic in and around the CCR.

It is another object of the present invention to transmit, from one tier to another, data packets that meet optimal performance requirements for each source-destination pair, and maximize the quality of transmitted packets for each source-destination pair.

SUMMARY OF THE INVENTION

The above objects and further advantages are provided by the method and system of the present invention for improving communications within a commercial and industrial processing facility. In one aspect, the method and system provides hierarchical adaptability components to a process control and/or automation network that increase system efficiency and reliability. The invention comprehends an intelligent and efficient process to design and operate a process control and/or automation network while utilizing minimum system resources. In certain embodiments, path requirements are specified per usage class whereby minimum utilization of bandwidth, paths and hardware is allocated while meeting plant environment requirements for services such as closed-loop regulatory and supervisory control, open-loop control, alerting, logging and remote monitoring.

In wireless systems having a large number of networked devices, efficient spectrum usage and delay minimizations are critical design and planning factors. Wireless process control and/or automation networks, including those operating under the ISA-SP100 protocol and/or the wireless HART® protocol, co-exist with other wireless systems operating in similar bands, e.g., 2.4 MHz, such as wireless LAN (including IEEE 802.11), BLUETOOTH™, ZIGBEE™, and the like. Efficient spectrum utilization in operation of a wireless process control and/or automation network in turn benefits other wireless systems utilizing the same frequency band. Accordingly, the present invention minimizes spectrum utilization by routing only frames and/or packets that meet one or more constraints. Paths are identified that meet the specified constraint(s). During operation, paths are discarded and/or replaced when they no longer satisfy the constraint(s).

In addition, wireless process control and/or automation networks are commonly deployed in harsh and classified areas, such as hazardous areas referred to as "Class 1, Division 1" and "Class 1, Division 2." In these locations, flammable gas mixtures can be present. Many wireless control and/or automation devices in these environments are battery-operated, mandating periodic battery replacement. Accordingly, reducing battery demand through the use of more efficient spectrum utilization results in higher battery lifecycle, lower capital and operating costs, and reduced occurrences of worker access to these network devices in areas classified as hazardous.

In one method of operating a wireless process control and/or automation network according to the present invention, steps are carried out to select a minimum number of paths for one or more source-destination pairs. Potential paths between each source-destination pair are initially chosen. The reliabilities of each of the potential paths and/or the effective reliabilities of groups of paths are determined. Paths or groups of paths that meet the minimum reliability requirements are identified by comparing the calculated reliabilities and/or effective reliabilities with minimum reliability requirements specified in a set of routing rules. Paths are selected from the identified reliable paths based on a minimum number of paths specified in the set of routing rules and assigned in a routing table. Paths or groups of paths above the specified minimum number of paths that meet the reliability requirements are discarded, i.e., not assigned in the routing table (as opposed to disabling the path), or assigned as alternate paths in the routing table. The paths that are discarded can be assigned in the future, for instance, if one of the previously assigned paths or alternate paths encounters excessive traffic and can no longer meet the requisite constraint(s) including the minimum reliability requirements.

In another method of operating a wireless process control and/or automation network according to the present invention, steps are carried out to select paths based on constraints related to end-to-end delays between a source-destination pair.

In a further method of operating a wireless process control and/or automation network according to the present invention, steps are carried out to select paths based on constraints related to tier delays for links within a given tier. Notably, employing a constraint based on tier delays minimizes the number of links or hops in a given path between a source-destination pair.

In an additional method of operating a wireless process control and/or automation network according to the present invention, steps are carried out to select a minimum number of reliable paths that further meet constraints related to end-to-end delays and/or tier delays.

In still another method of operating a wireless process control and/or automation network according to the present invention, steps are carried out to select a minimum number of reliable paths that further meet constraints related to one or more of end-to-end delays and/or tier delays, maximum throughput per link, and a minimal number of hops.

In one system of the invention for operating a wireless process control and/or automation network, a route optimization module is executed by hardware which can include one or more of the wireless gateway devices, a separate computing device in communication with the wireless network, or a combination thereof. The route optimization module includes a path determination sub-module that determines possible paths between the selected source-destination pair. A reliability calculation sub-module is provided that determines the reliability of each of the possible paths, and/or the effective reliability of one or more groups of paths. The route optimization module also includes a reliable path identification sub-module that identifies reliable paths or groups of paths by comparing the reliability and/or effective reliability with minimum reliability requirements specified in a set of routing rules, and a path assignment sub-module for assigning reliable paths or one or more groups of paths to a routing table based on a minimum number of paths specified in the set of routing rules. Paths or groups of paths above the specified minimum number of paths that meet the reliability requirements are discarded, i.e., not assigned in the routing table, or assigned as alternate paths in the routing table.

In another system of the invention for operating a wireless process control and/or automation network, an end-to-end delay minimization module is provided, in which paths are selected based on constraints related to end-to-end delays for paths between a source-destination pair.

In a further system of the invention for operating a wireless process control and/or automation network, a tier delay minimization module is provided, in which paths are selected based on constraints related to tier delays for links within a given tier.

In an additional system of the invention for operating a wireless process control and/or automation network, a delay minimization module is provided, in which paths are selected based on constraints related to both end-to-end delays and tier delays.

In still another system of the invention for operating a wireless process control and/or automation network, a module is provided to select a minimum number of reliable paths, and one or more additional or sub-modules to select paths based on further constraints related to end-to-end delays and/or tier delays, maximum throughput per link, a minimal number of hops, or a combination of one or more of end-to-end delays and/or tier delays, maximum throughput per link, and a minimal number of hops.

In certain embodiments, the reliability, e.g., the maximum allowable frame error rate (FER), is specified for one or more of the usage classes, and the assigned minimum number of reliable paths is specified per usage class. Usage classes or groups of usage classes with higher degrees of criticality, e.g., classes 0 and 1 in an SP100 system, have a higher reliability threshold, i.e., lower maximum allowable frame error rates as compared to usage classes of lower criticality. Further, usage classes of lower criticality can have fewer assigned minimum reliable paths.

Further embodiments of the process of the present invention provide that the maximum allowable frame error rate per usage class, the process control wireless traffic distribution, the links' reliability profile, tier delay, or a combination of these factors are used to generate a subset of paths containing a minimum number of paths with associated reliability weight. For source-destination pairs in which the minimum number of paths is not attained based on the above-described routing assignment process or the above-described sub-modules, selective paths are combined, i.e., groups of paths, or additional paths are incorporated, until the end-to-end frame error rate for each usage class is lower than the class's maximum allowable threshold, while applying the criteria of employing a minimum number of intermediate links.

Embodiments of the present invention include additional steps or sub-modules for incorporation within conventional wireless network protocols, including: (1) defining a maximum allowable delay for each tier; (2) including usage class bits to the routing table; (3) considering whether a frame is a retransmit frame; (4) providing an action-type bit to the frame format structure where the received frames for a destination are not actioned until the end of the maximum allowable delay (i.e., the received frame is not actioned until the end of the maximum allowable delay to ensure that all frames arriving from different routes are received and the frames with a high quality indicator are passed to the CCR for action); (5) dropping and/or routing the frame as a function of the usage class; and/or (6) during abnormal channel conditions, sending a control message to WIDs and/or WGDs in a wireless process control and/or automation protocol network to allow routing of frames for a particular pair of source-destination pairs irrespective of the usage class, thereby dynamically increasing the number of available paths. Accordingly, in certain embodiments, the method and system of the present invention minimizes the required number of frames transported over wireless links while meeting reliability and latency requirements.

In an example described below, it is demonstrated that by using the system and method of the present invention in a wireless SP100 network, (1) the battery lifecycle of hardware is extended by more than 60%; (2) the cost of an SP100 system is significantly reduced due to reduction in the required number of WIDs and WGDs; and (3) spectrum utilization is reduced by at least 55%. These benefits are accomplished while maintaining the design requirements for plant applications such as closed-loop regulatory and supervisory control, open-loop control, alerting, and remote monitoring/logging.

In still further embodiments of the present invention, a new hybrid wired and wireless architecture is deployed for process control and/or automation. The new architecture includes several field network sets (FNSs). One or more FNSs in the intermediate tier each include one or more of a WID, a modified WID (MWID), and a set of a MWID coupled with a junction box (MWID-JB). One or more FNSs in the gateway tier includes one or more of a WGD, a modified WGD (MWGD) and a set of a MWGD and a JB (MWGD-JB). The master WGD may alternatively be a master MWGD or master MWGD-JB, with a MWGD-JB being preferred over a MWGD as the master device, and a MWGD being preferred over a WGD as the master device. Each FNS includes an anchor packet selection device. This hybrid system includes path selection and optimization with frame selection, packet selection and routing through a predetermined number paths depending on the class of service. Thus, the routers and gateway devices of each FNS act as a single device to route data to routers and gateway devices external to the FNS. The combination of these features is used to enhance the system reliability and performance. An FNS may also span two tiers, such as an FNS that spans tier 2 and tier 3.

In another embodiment, an FNS can have a secondary anchor packet selection device, for example, to provide redundancy, or in order to carry more traffic load where one device is inadequate due to packet load.

The architecture of the present invention improves performance and reliability of a process control and/or automation network by:

minimizing the required number of unnecessary transmission of packets, minimizing spectrum congestion and improving spectrum utilization, minimizing the hardware required to support a plant wireless system under certain mandated requirements, maximizing the utilization of existing plant infrastructure, and significantly increasing the battery life of wireless devices.

In addition, the total number of wireless routers can be reduced, and in certain embodiments, tier 3 gateway devices (except for the master WGD) can be reduced or eliminated altogether. This advantageously allows the number of data transmission to the CCR to be minimized, the spectrum usage to be maximized, packet loss to be reduced, and requisite hardware (and associated labor involved in deploying and maintaining such hardware) to be minimized.

In conventional wireless automation and/or control systems, packet selection is accomplished at the master WGD by selecting the first packet with correct received information and discarding the subsequent received copies of the same packet. According to the present invention, however, packets are not progressed to the next tier until: (1) the number of packets required to meet the minimum performance requirements for each pair of source-destination is optimized (minimum), and (2) the quality of transmitted packets for each source-destination pair is the highest.

According to one embodiment of the present invention, a plant wireless system or a wireless process control network includes MWIDs or MWGDs that perform (1) a selecting function, (2) a routing function, and (3) interface to a JB in the field network set via wired connection and neighboring WIDs via wireless connection. The routing function keeps track of all MWID-JB sets, the MWGD-JBs, and the master WGD/MWGD, and adjust the routing dynamically (per packet) as needed.

According to another embodiment of the present invention, a plant wireless system or a wireless process control system includes MWIDs and MWID-JBs grouped into FNSs. The MWIDs and MWID-JBs within each set are either hardwired or connected via a junction box router, while WIDs are wirelessly connected to MWID-JB or MWIDs. Each FNS can be connected to the CCR directly (through existing wiring available via the JB), connected wirelessly to intermediate MWGD-JB, or connected wirelessly to the master WGD/MWGD. Accordingly, each FNS can have single MWID-JB tasked with routing traffic to the destination.

According to another embodiment of the present invention, a plant wireless system or a wireless process control system includes, e.g., for a particular source-destination pair, one particular MWID within a FNS that is tagged as an anchor point for receiving all packets from that particular source, selecting the one packet with the highest quality index, and forwarding that one selected packet toward the destination (CCR) through MWID-JB, possibly in multiple paths. In the reverse direction, the anchor MWID within a set for a particular source-destination pair receives the packet from the CCR and transmits it ultimately to the WED. If packets belonging to particular source-destination pair passes through two different MWID-JBs belonging to different FNSs, then each MWID-JB set will have an anchor packet selection MWID for that pair (i.e., a total of two MWIDs are required). If packets belonging to a particular source-destination pair passes through three different MWID-JBs, then each FNS will have an anchor selection by assigning a MWID for that pair (a total of three MWIDs are required). Executing the algorithms described herein determine if one or more FNSs are needed for a particular source destination pair. The anchor MWID within an FNS is needed to provide the packet selection for a particular source-destination pair, while the MWID-JB within the same FNS is required to interface and route traffic to/from the CCR or master WGD/MWGD. At the WGD tier level, the anchor MWGD within a set is used to provide the packet selection for a particular source-destination pair, while the MWGD-JB within the same FNS is used to interface and route traffic to/from the CCR or master MWG/MWGD. However, if a MWID-JB set is directly hardwired to the master MWGD, then the anchor selection in the WIGD tier will be (by default) the master MWGD.

According to a further embodiment of the present invention, a wireless process control system includes a master MWGD that maintains the configuration of the sets, including which MWID-JBs belong to which set, which MWID-JB is the interface to the CCR and which MWID-JB is the backup (if any). While a selected path for a particular source-destination pair can vary from one transmission to another, the anchor packet selection device within a set for that particular source and destination pair remains the same until changed by an operator or if certain conditions arise (e.g., device failure, additional devices added or the like) that result in re-designation of the anchor packet selection device. Source-destination pairs sharing one particular FNS will distribute the selection function (load balanced) across the MWIDs within that set.

BRIEF DESCRIPTION OF THE DRAWINGS

The foregoing summary, as well as the following detailed description of preferred embodiments of the invention will be best understood when read in conjunction with the attached drawings. For the purpose of illustrating the invention, there are shown in the drawings embodiments which are presently preferred. It should be understood, however, that the invention is not limited to the precise arrangements and instrumentalities shown. In the drawings the same numeral is used to refer to the same or similar elements or steps, in which:

FIG. 6 is a schematic diagram of architecture of a wireless process control and/or automation network according to certain embodiments of the present invention;

FIG. 7 is a block diagram of a wireless end device according to certain embodiments of the present invention;

FIGS. 8A and 8B are block diagrams of a wireless intermediate device and a modified wireless intermediate device according to certain embodiments of the present invention;

FIGS. 9A and 9B are block diagrams of a wireless gateway device and a modified wireless gateway device according to certain embodiments of the present invention;

FIG. 14C is a flow chart of a method of assigning reliable paths for a source-destination pair in a hybrid network including field network sets in accordance with the present invention;

FIG. 14D is an exemplary routing table that can be created using the method of FIG. 14C;

FIG. 15A is a schematic block diagram including an end-to-end delay minimization module in accordance with an embodiment of the present invention;

FIG. 15D if an exemplary routing table that can be created using the method of FIG. 15C;

FIG. 16B is a flow chart of a method of assigning paths for operating the tier delay minimization module in accordance with the present invention;

DETAILED DESCRIPTION OF THE INVENTION

Figure 3:
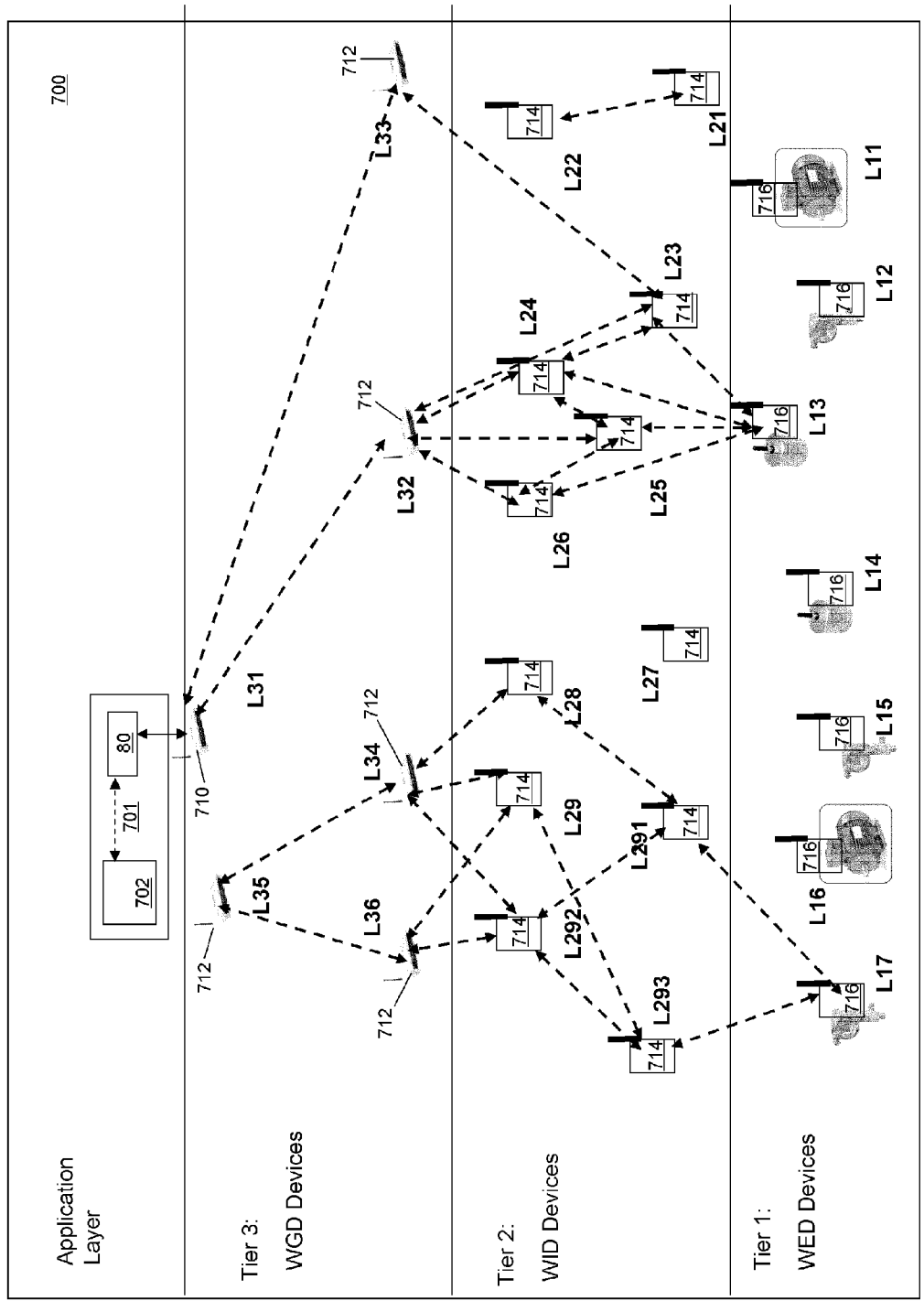
FIG. 3 is a schematic diagram of a wireless process control and/or automation network in accordance with the present invention.

FIG. 3 is a diagram of a wireless process control and/or automation network 700 such as one following the ISA-SP100 protocol; for clarity, only connectivity for WEDs L17 and L13 to WGDs L35 and L31, respectively, is illustrated.

The path L17-L293-L292-L36-L35 is one of the paths of the source-destination pair of L17 and the CCR 701. The combination L292-L35 is considered one of the links within this path. The path L17-L291-L28-L34-L35 is a path independent from L17-L293-L292-L36-L35, since no single intermediate link is common to the two paths. Elements L11 through L17 are WEDs 716 at tier 1; elements L21 through L29 and L291 through L293 are WIDs 714 at tier 2; and elements L32 through L36 are WGDs 712 at tier 3. In general, WEDs 716 broadcast in all directions, however, for simplicity in the description of the present invention, communication is depicted only between select WEDs and WIDs. In network 700, the WGD L31 at the CCR 701 is the master WGD 710, and the other WGDs L32 through L36 are additional WGDs 712 that provide additional links and/or serve as backup gateway devices in the event that the master WGD 710 fails. In accordance with the present invention, a computing device 80 is provided that executes one or more modules for path selection. These modules can be the route optimization module 110, the end-to-end delay minimization module 210, the tier delay minimization module 310, the delay minimization module 410, other modules that apply constraints including one or more of throughput and number of hops, or a combination including at least one of the foregoing modules, to create the routing table 190 for path selection. The resulting routing table 190 is loaded in memory of the routing WIDs and WGDs. The computing device 80 can be provided within or associated with the master WGD 710, and/or within or associated with the DCS 702. Note that some or all of the modules executed by the computing device 80 can be executed in separate computing devices, e.g., certain modules at or associated with the master WGD, other WGDs, WIDs, MWIDs and/or MWGDs.

As used herein, the term "routing table" refers to a collection of data or instructions that specifies one or more paths between a source-destination pair, and can be in the form of a table, database, dataset or other collection of electronically stored data that includes such instructions in a form that is readable by WGDs, MWGDs, WIDs and/or MWIDs in the present invention.

Figure 4:
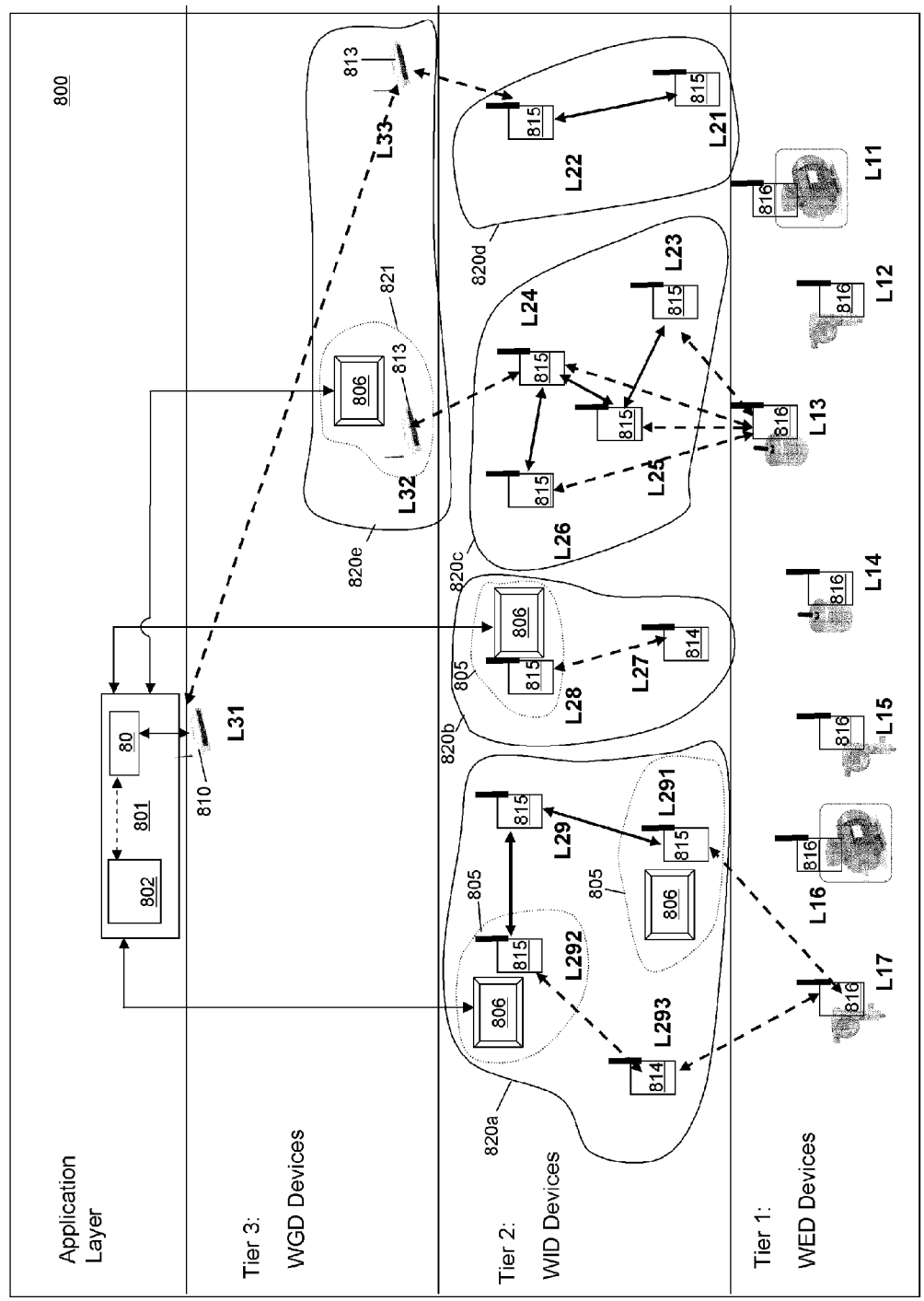
FIGS. 4, 4A and 5 are schematic diagrams of a hybrid wired and wireless process control and/or automation network in accordance with the present invention.

FIG. 4 is a diagram of a hybrid wired and wireless process control and/or automation network 800 according to the present invention. The wireless connectivity is in accordance with a suitable process control standard, such as the ISA-SP100 protocol. As in FIG. 3, only connectivity for WEDs L17 and L13 to WGDs L35 and L31, respectively, is illustrated for clarity. In FIG. 4, wired connectivity is depicted with solid double-arrow lines between nodes, and wireless connectivity is depicted with dashed double-arrow lines between nodes.

The plant architecture according to the present invention includes a plurality of field networks sets 820 (FNSs) in communication with the CCR 801 and/or a master WGD 810. The CCR 801 includes the DCS 802. The computing device 80 can be provided within or associated with the master WGD 810, and/or within or associated with the DCS 802. Each FNS 820 at the intermediate tier (tier 2) includes one or more WIDs 814, one or more modified wireless intermediate devices 815 (MWIDs), or a combination thereof. Furthermore, the FNS 820e in tier 3 includes modified WGDs 813 (MWGDs) and a JB 806. Note that one or more WGDs can also be provided (not shown) in tier 3.

MWIDs or MWGDs within an FNS are employed to interface with a JB and/or to execute packet selection as described further herein. In a preferred embodiment, at least one MWID or MWGD is provided in each FNS 820 for connection to the CCR 801 and/or the next tier. One or more additional MWIDs/MWGDs can optionally be provided in an FNS 820 as backup, for connection to multiple JBs in an FNS 820, and/or to co-execute packet selection module(s). Note that even if a MWID/MWGD is provided that does not serve as the node which connects to the JB and/or executes packet selection, these MWIDs/MWGDs perform all of the functionalities of a conventional WID/WGD. Determination as to installation of MWIDs/MWGDs as devices at locations that that do not execute packet selection module(s) and/or include wired connectivity can be made based on factors including but not limited to capital cost, whether the installation is an upgrade or a grass roots installation of a control/automation system, the anticipated need to define further network sets during future modifications or additions, and any requirements for availability of backup modified WIDs/WGDs.

One or more MWIDs and/or MWGDs in the architecture of the present invention each contain stored in their respective memories one or more routing tables to provide path selection, similar to the WIDs and/or WGDs described with respect to FIG. 3. In addition, one or more MWIDs and/or MWGDs in an FNS 820, particularly the MWID or MWGD selected as the anchor device, executes a packet routing module. The packet routing module provides functionality to (1) route packets to correct JBs within an FNS; (2) route packets to the correct anchor packet for a particular source-destination pair; (3) route packets from one FNS to another, and (4) provide routing tables to assist in the wireless-wired networks integration.

In general, WEDs 816 broadcast in all directions, however, for simplicity in the description of the present invention, communication is depicted only between select WEDs and WIDs/MWIDs. For example, according to the present invention, when a WED transmits in all directions, it will reach several FNSs, each potentially having several MWIDs. By applying the routing table according to the present invention, a predetermined number of FNSs are required and selected (e.g., two), thus the transmission is only routed through selected FNSs. Upon further application of the routing tables of the present invention, certain paths of WIDs and/or MWIDs are selected within the predetermined number of FNSs.

Certain FNSs 820 include one or more junction boxes (JBs) 806, e.g., FNSs 820a and 820b. In addition, certain FNSs do not include JBs, in which the MWID or MWGD serves to execute the packet selection process according to the routing table. Communication to the next tier in the FNSs without JBs is accomplished by wireless connectivity.

Figure 1:
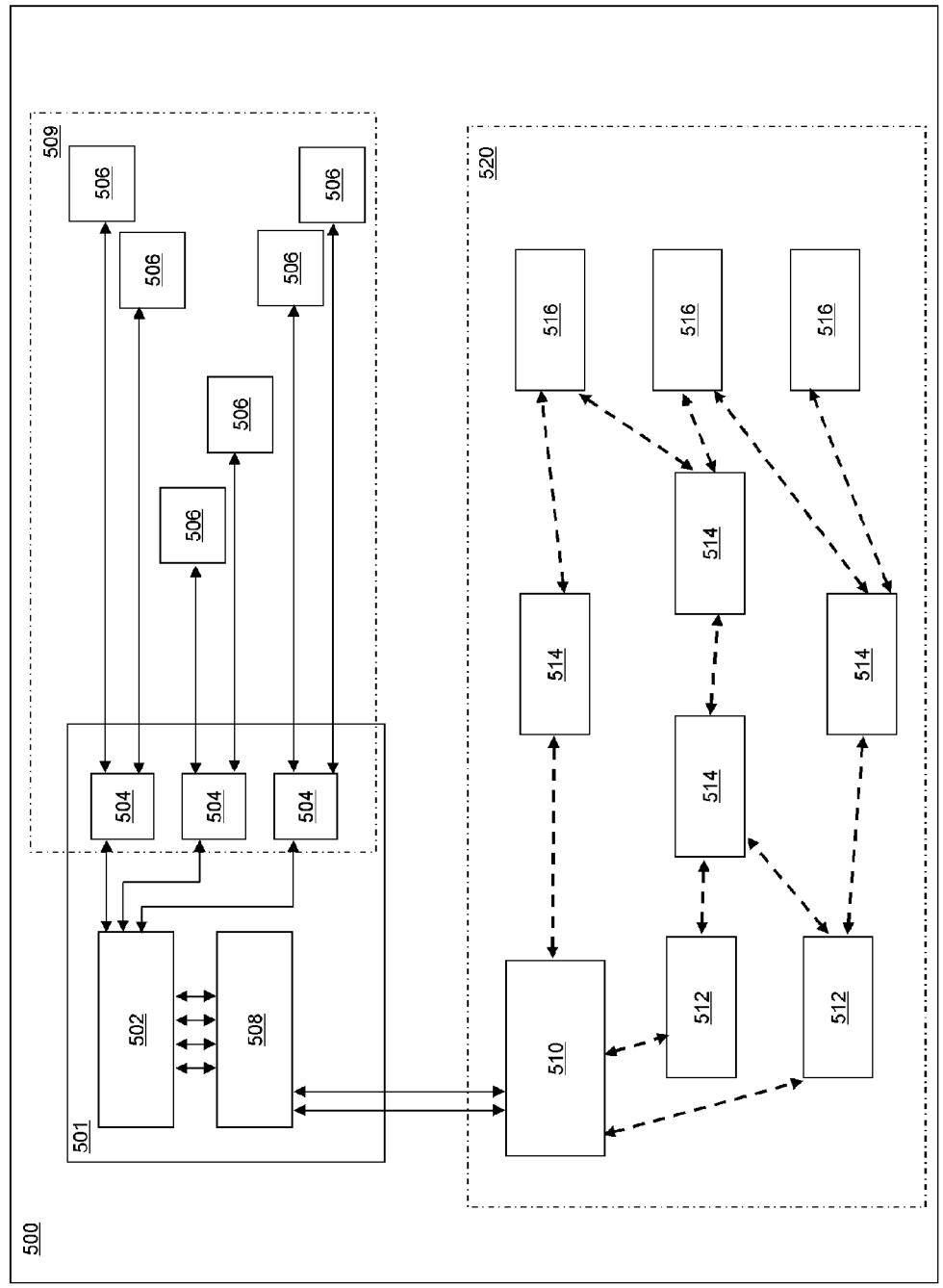
FIG. 1 is a schematic diagram of a process control and/or automation network of the prior art including a wireless facility network and a wired facility network that are distinct and not integrated except at the CCR.
Figure 2:
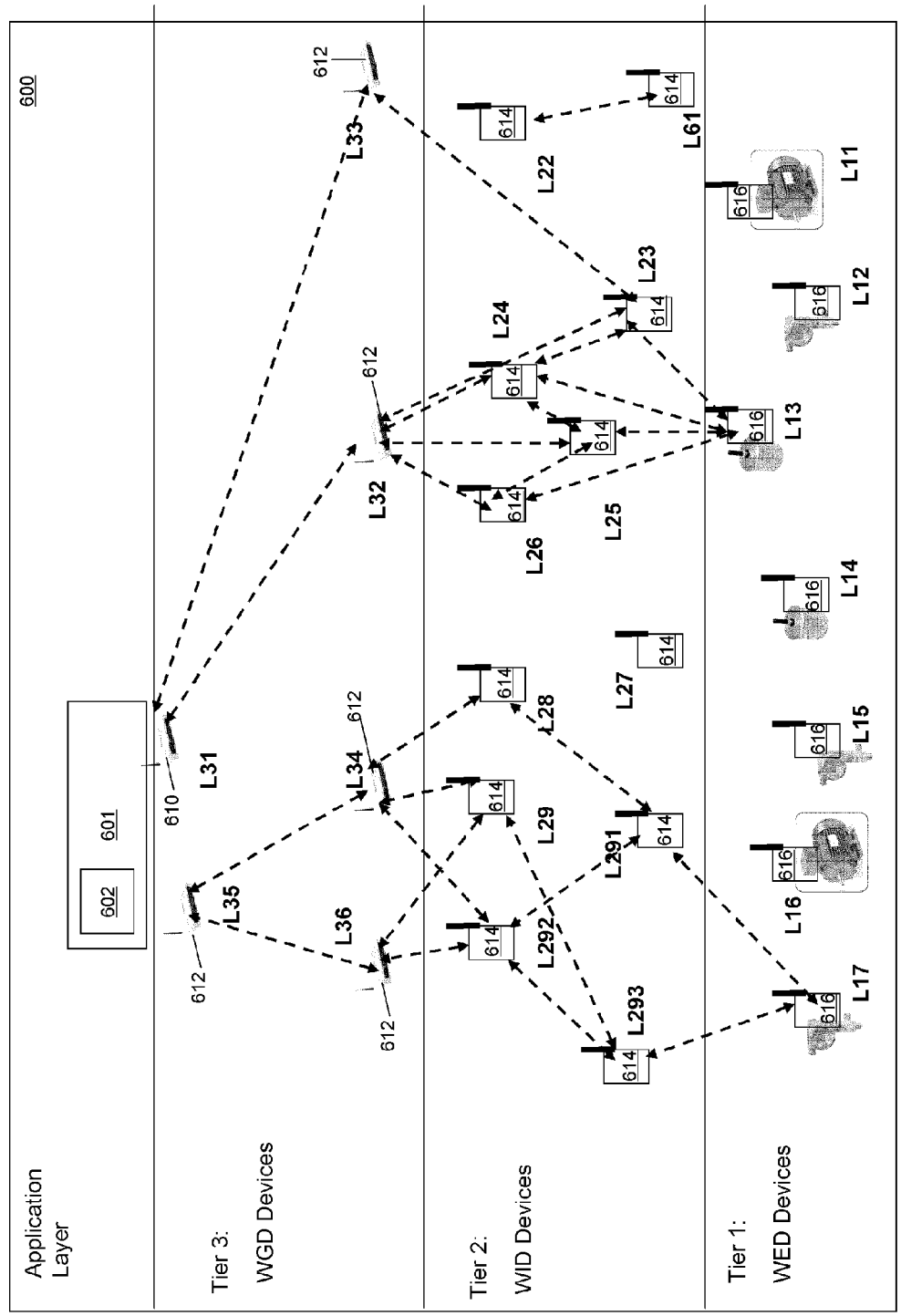
FIG. 2 is a schematic diagram of a wireless process control and/or automation network of the prior art.

In addition, certain embodiments of the FNSs 820 comprise at least one set 805 including a MWID 815 coupled with a junction box 806, the set referred to herein as a MWID-JB 805. For instance, one MWID-JB 805 includes the set of the MWID L292 and its proximate JB 806; another MWID-JB 805 includes the set of the MWID L28 and its proximate JB 806. An FNS 820 including a group of one or more WIDs and either or both of one or more MWIDs or MWID-JBs is provided with one direct connection to the CCR via the master WGD 810, rather than multiple connections or the use a secondary WGD (e.g., WGD L35 shown in FIGS. 2 and 3. For instance, the FNS 820 with WID L293, MWID L29 and MWID-JBs L292 and L291 coupled to their proximate JBs 806 effectively communicates with the CCR 801 using a single connection rather than four separate connections. The connection between each FNS 820 and the CCR 801 can be redundant, and can include wired, wireless or both wired and wireless connections.

Likewise, FNS 820e at the gateway tier (tier 3) includes a modified wireless gateway device 813 (MWGDs), and a set 821 of a MWGD 813 device coupled with a JB 806 (MWGD-JB).

Network 800 includes certain FNSs 820 having MWIDs and/or MWID-JBs, and certain FNSs having MWGDs and/or MWGD-JBs. In contrast, in networks 600 of the prior art and network 700 of the present invention, the WIDs are individual, and several nodes communicate with WGDs in tier 3. Within an FNS having MWID-JB 805, the MWID-JB 805 can be connected via a wired interface to one or more MWID(s) 815 and connected by wireless interface to traditional WIDs 814. Each set can be connected to the CCR directly (through existing wiring available via the JB), or connected wirelessly to intermediate MWGD-JBs, or connected wirelessly to the master MWGD. Accordingly, each set can have a MWID-JB, MWGD-JB, MWID or MWGD tasked with routing traffic to the destination.

FIG. 4 shows the detailed connectivity of the MWID-JBs to the CCR and master MWGD. The master MWGD will maintain the configuration of the sets including which MWID-JBs belong to which set, which of the MWID-JBs is/are the interface to the CCR and which one is the backup. The master MWGD maintains the configuration of the sets including which MWIDs belong to which FNS, and which MWID is the primary/backup within an FNS for packet selecting functionality for each source-destination pair in the wireless network. While the selected path for a particular source and destination pair may vary from one transmission to another, the anchor packet selection function within an FNS for that particular source and destination pair generally remains constant until changed by the master MWGD or an operator.

In general, possible sequences of packet transmission between the CCR 801 and a WED 816 include, but are not limited to:

CCR 801↔ master WGD 810↔ MWGD-JB 821 ↔ MWGD 813↔ MWID-JB 805↔ MWID 815↔ WED 816;

CCR 801↔ master WGD 810↔ MWGD 813↔ MWID-JB 805↔ MWID 815↔ WED 816;

CCR 801↔ master WGD 810↔ MWGD-JB 821 ↔ MWGD 813↔ MWID-JB 805↔ MWID 815↔ WID 814↔ WED 816; or CCR 801↔ master WGD 810↔ MWID-JB 805 ↔ MWID 815↔ WED 816.

Figure 4A:
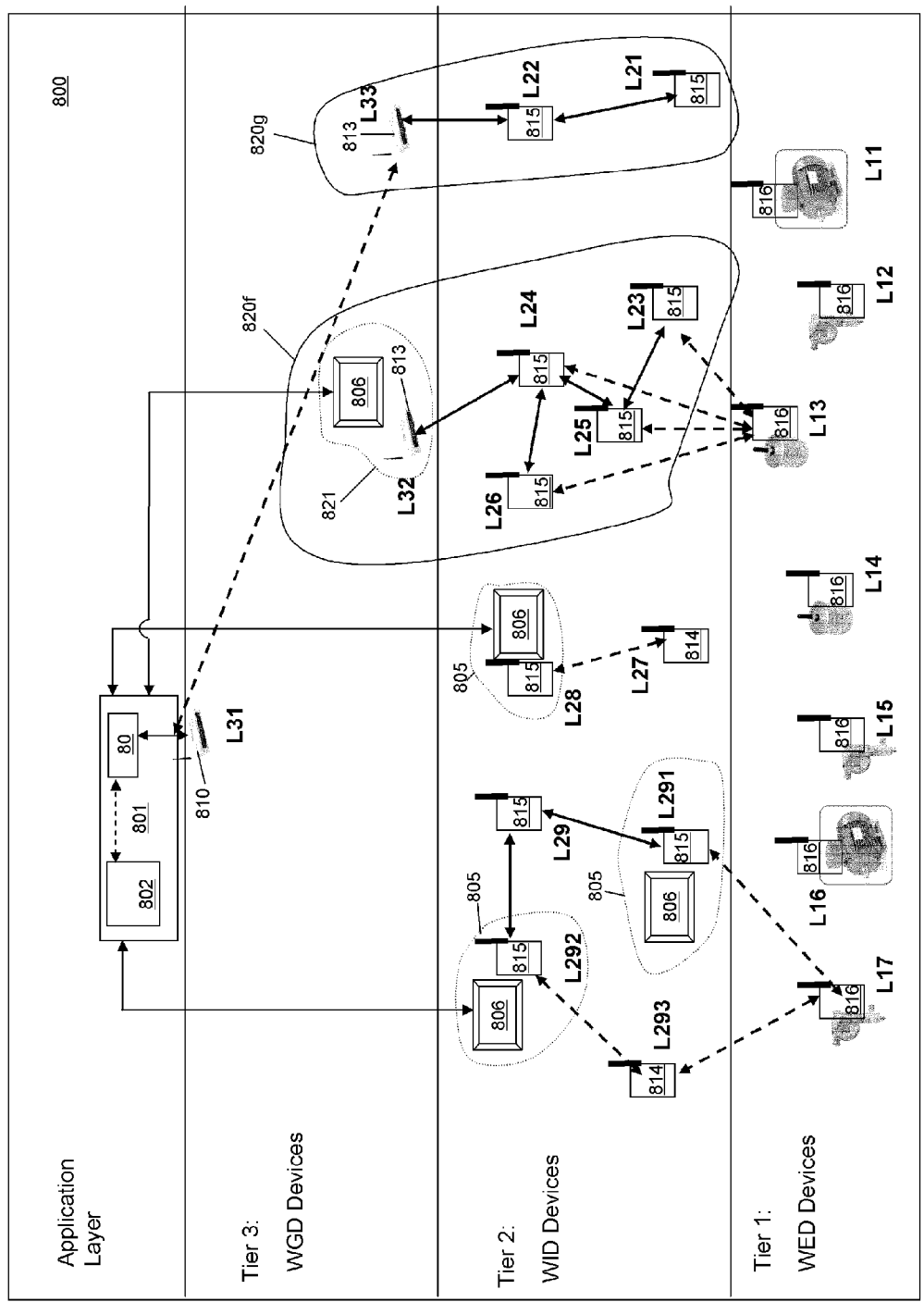

The embodiment shown in FIG. 4A includes field network sets 820 (FNSs) that span two tiers. FNS 820g spans the intermediate tier (tier 2) and the gateway tier (tier 3), including two modified wireless intermediate devices 815 (MWIDs) in tier 2 and one modified wireless gateway device 813 (MWGD) in tier 3. FNS 820f also spans tiers 2 and 3, with four modified wireless intermediate devices 815 (MWIDs) in tier 2 and one modified wireless gateway device 813 (MWGD) with associated JB 806 in tier 3.

Figure 5:
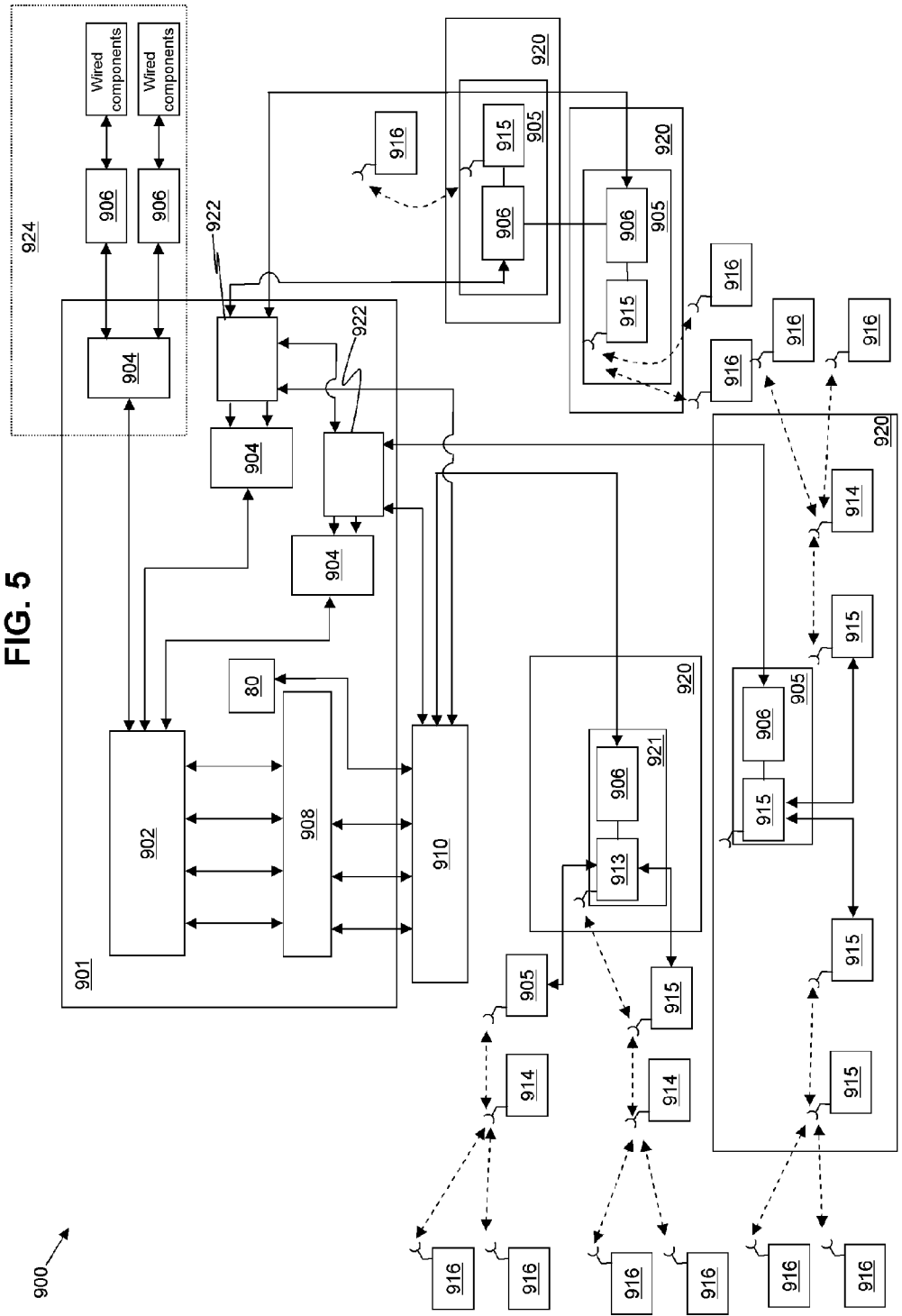

FIG. 5 is a diagram of a network 900 according to the present invention including a CCR 901 having a DCS 902 in communication with an interface 908, e.g., to facilitate communication with the master WGD 910, and also in communication with a plurality of marshalling cabinets 904. The master WGD 910 can communicate with the CCR 901 (and the DCS 902 in the CCR 901) via various connections, including through interface 908 (which can be separate from or integrated with the DCS 902), through marshalling cabinets 904, through other I/O interfaces, or any combination of these interfaces.

The network 900 includes a tier of WEDs 916 generally in communication with WIDs 914 and/or MWIDs 915. Furthermore, network 900 can include an existing wired sub-network 924, e.g., having wired components connected to a marshalling cabinet 904 in the CCR 901 through JB 906.

Further, similar to network 800 shown in FIG. 4, network 900 includes an intermediate tier having FNSs 920, and also can include one or more independent (i.e., not within an FNS 920) WIDs 914, MWIDs 915 and MWID-JBs 905 (having a MWID 915 and a JB 906). The FNSs 920 each include a MWID-JB 905 (although as discussed above it is possible to have an FNS without a MWID-JB). Further, as shown in FIG. 5, one of the FNSs 920 includes a WID 914 and plural MWIDs 915. The MWID-JB sets 905 are connected via wire to a junction box router 922 (JBR). Further, the anchor MWID/MWGD in an FNS, or an independent MWID/MWGD, can be in wired communication with a JBR 922.

A third tier includes an FNS 920 having at least a MWGD-JB set 921 (including a MWGD 913 and a JB 906). Note that other wireless gateway devices can also be included in the FNS 920 having the MWGD-JB set 921, or the MWGD-JB set 921 can be a standalone set, i.e., without the associated FNS 920. The MWGD-JB set 921 is connected directly to the master WGD 910 and to the MC 904. The MC 904 is connected directly to the DCS 902.

As discussed above, the MWIDs and the MWGDs include one or more routing tables for path optimization and a packet selection module to determine, among other things, which packet of multiple packets of the same data are to be propagated to the next tier or to the master WGD 910.

Certain MCs 904 are in communication with one or more JBRs 922 (JBR) to facilitate integration between the plant wireless network and the plant wired network and provide suitable routing functionality and instructions to the MWID-JBs 905. The JBRs 922 can also be wired to each other and can be connected to the master WGD 910.

Hardwired connectivity between the master WGD 910 and a MWGD 913 or the set 921 of the MWGD-JB 921 can be via direct connection, and/or through a JBR 922 (e.g., master WGD 922 in connection with the JBR 922, which is connected to the MWGD-JB set 921 including connection to the MWGD 913. As depicted in network 900, the set 921 of the MWGD-JB is directly connected to the master WGD 910.

In accordance with the present invention, a computing device 80 is provided that executes the route optimization module 110', the end-to-end delay minimization module 210', the tier delay minimization module 310', the delay minimization module 410', other modules that apply constraints including one or more of throughput and number of hops, or a combination including at least one of the foregoing modules, to create the routing table 190', and downloads the resulting routing table 190' to the routing WIDs and WGDs (which can include MWIDs and MWGDs). In addition, the computing device 80 can execute the modules for determining the number and size of the FNS(s), and the anchor packet selection device for each FNS. Instructions generated by the computing device 80 that is a part of the DCS 902 or a separate computing device within the central control room 901 are transmitted to the master WGD 910, which in turn transmit the instructions to certain nodes (identified herein as the "anchor packet selection device" or "anchor point" within a particular FNS) in the FNSs 920. Likewise, data related to the delays (end-to-end and link), reliability, number of hops, throughput, field network set data, and other network statistics is communicated to the computing device 80, and is used to, inter alia, create or modify the routing tables and create or modify the members of each FNS.

As shown in FIG. 5, the JBRs 922 route wireless traffic to and from the MWID-JBs 905 to the master WGD 910 and to the DCS 902. Furthermore, the JBRs 922 route wireless traffic between an MWID-JB 905 in one FNS 920 to another MWID-JB 905 in a different FNS 920, and between an MWID 915 in one FNS 920 to another MWID 915 in a different FNS 920.

Interconnecting JBs 906 with each other and with the wireless infrastructure within a commercial and industrial processing facility is a unique aspect of the present invention, for which there are no established standards. The network 900 of the present invention shows the interconnectivity of JBs and the wireless plant network devices to yield improved performance and reliability. An existing wired infrastructure illustrated in FIG. 5 as subsystem 924 that operates in a conventional facility can continue to pass directly through one or more MCs 904 without going to or through a JBR 922. Selected wireless and wired traffic passes through the JBRs 922. Accordingly, the present invention can be practiced as a stand alone system and method, e.g., used to design and build a new or replacement process automation and/or control network, or the present invention can be practiced as a complementary network that is added onto, or modifies a portion of an existing wired or wireless network, without changing certain existing and operational JBs or MCs (e.g., within existing subsystem 924).

FIG. 6 shows an exemplary architecture 10 of a wireless process control and/or automation system. The architecture generally follows the Open Systems Interconnection Reference Model (OSI model), and includes: an application layer 12, a transport layer 14, a network layer 16, data link layer 18 including a logical link control sublayer 20 and a media access control sublayer 22, and a physical layer 24. The application layer 12 includes the functionality of presentation and session layers according to a wireless process control and/or automation protocol such as the ISA-SP100 protocol, and generally provides the interface to user application processes. The application layer 12 further includes an application sublayer 26 that provides a wireless process control and/or automation protocol interface. The transport layer 14 provides for the addressing of user application processes via selection of a specific application layer entity. The network layer 16 provides network-wide addressing of devices and relays messages between network layers of different devices. Furthermore, in accordance with embodiments of the present invention, the network layer supports frame routing between source-destination pairs based upon the route optimization modules 110 and/or 110', the end-to-end delay minimization module 210 and/or 210', the tier delay minimization module 310 and/or 310', the delay minimization module 410 and/or 410', or other modules that apply constraints including one or more of throughput and number of hops of the present invention. The data link layer 18 generally manages use of the physical layer, and includes the logical link control (LLC) sublayer 20 and the medium access control (MAC) sublayer 22, and can also carry out certain optimization functionalities in the adaptive methods and systems of the present invention, such as collecting frame error rate data, throughput data and/or delay statistics, and passing that data to the route optimization module 110 and/or 110', the end-to-end delay minimization module 210 and/or 210', the tier delay minimization module 310 and/or 310', the delay minimization module 410 and/or 410', or other modules that apply constraints including one or more of throughput and number of hops. The LLC sublayer 20 provides multiplexing and flow control mechanisms, and generally acts as an interface between the MAC sublayer 22 and the network layer 16. The MAC sublayer 22 provides multiple access methods including the carrier sense multiple access with collision avoidance (CSMA-CA) protocol 28 commonly used in wireless networks, which is also carried out in the physical layer 24. Finally, the physical layer 24 provides bit-by-bit delivery of data, a standardized interface transmission media including radio interfacing, modulation, and physical network topology such as mesh or star networks. In addition, channel assignments and/or changes are carried out in the network layer 24 and the data link layer 18.

FIG. 7 is a block diagram of a WED 30 for receiving data from, and transmitting data to, one or more networked WIDs and/or WGDs. WED 30 generally includes a processor 32, such as a central processing unit, a wireless transceiver 34 and associated antenna 36, an input/output interface 40, a clock 45 and support circuitry 42. The processor 32, wireless transceiver 34, input/output interface 40, clock 45 and support circuitry 42 are commonly connected via a bus 44, which also connects to a memory 38. Memory 38 can include both volatile (RAM) and non-volatile (ROM) memory units, and stores software or firmware programs in a program storage portion and stores data in a data storage portion. The input/output interface 40 sends and receives information via a communication link to and from the associated end devices 46, e.g., process equipment such as meters, remote terminal units, valves, sensors, tank level measuring devices, and the like. The WED 30 can transmit to and receive from all other devices. In a receiving mode, the WED 30 receives instructions via the antenna 32 and transceiver 34. These instructions are processed by the processor 32 and can be stored in memory 38 for later use or cached. A timestamp is preferably added to the data using the clock 45, or alternatively, with a global positioning system. All devices in the network are synchronized to allow for accurate delay calculations as described below. The instructions are conveyed to the end device via the port 40. In a transmission mode, data is conveyed from the end device to the port 40, and passed to memory 38. The data can be processed by the processor 36 including a timestamp generated by clock 45 or other means, and sent across the network through the transceiver 34 and antenna 32. The processor 32 generally operates using the OSI model described above for end devices, and carries out instructions for transmission and receipt of data.

FIG. 8A is a block diagram of a WID 50 for transmitting to and receiving from all other devices, and for routing to other devices. WID 50 generally includes a processor 52, such as a central processing unit, a wireless transceiver 54 and associated antenna 56, a clock 65 and support circuitry 62. The processor 52, wireless transceiver 54, clock 65 and support circuitry 62 are commonly connected via a bus 64, which also connects to a memory 58. Memory 58 commonly can include both volatile (RAM) and non-volatile (ROM) memory units, and stores software or firmware programs in a program storage portion and stores data in a data storage portion. A routing table 190 specified in accordance with the present invention resides in memory 58, i.e., in the data storage portion. In a receiving mode, the WID 50 receives data frames via the antenna 56 and transceiver 54. The data is generally cached in memory 58, for instance, for transmission when specified by the CSMA-CA protocol, or for retransmission in the event of a failed frame transmission. In a transmission mode, data is conveyed from the memory to the transceiver 54 under control of the processor 52. In a receiving mode, the WID 50 receives data frames via the antenna 56 and transceiver 54. In a routing mode, data frames are received and transmitted. The clock 65 or other means such as a global positioning system can add timestamps to received, transmitted and/or routed data. The WID 50 has sufficient intelligence to be able to address and route to specific communication devices. The processor 52 generally operates using the OSI model described above for intermediate devices, and carries out instructions for transmission, receipt and routing of data.

FIG. 8B is a block diagram of an MWID 50' for transmitting to and receiving from all other devices, and for routing to other devices. MWID 50' is similar in function and architecture as WID 50, with the addition of a wired interface 53. As shown in FIGS. 4 and 5, the MWIDs (MWIDs 815 in FIG. 4 and MWIDs 915 in FIG. 5) in the system and method of the present invention are in hardwired communication with other MWIDs (e.g., within the same FNS) and with JBs. In addition, MWIDs can be provided in hardwired connection directly with the DCS in the CCR (e.g., via an interface at the CCR) or with MWGDs. Furthermore, MWIDs 50' can form part of a MWID-JB set, wherein the JB is wired to the MWID via the wired interface 53. The routing table 190' stored in the memory 58 of the MWID 50' includes the requisite FNSs through which assigned paths pass. Further, data 192 is also provided which includes information about other MWIDs, WIDs, WGDs, MWGDs, MWID-JB sets, MWGD-JB sets, and/or the master MWGD. Data 192 is used to dynamically route data transmissions, on a packet-by-packet basis, as required.

At least certain MWIDs 50', and in particular any MWIDs 50' that serve as anchor packet selection devices within an FNS, also includes a packet selection module 193 and a routing module 194. Since multiple copies of the same transmitted packet originates from a particular source toward a particular destination reach an anchor MWID within tier 2, the packet selection module 193 (1) selects the best packet among the various copies of received packets from different paths, and (2) forwards the selected packet to the next tier, either through wired or wireless paths, or both, depending on the reliability requirements. Further, the routing module 194 supports the architecture of the FNSs and support the packet selection module, including modified/expanded routing tables (routing tables 190' described herein) to support the following routing scenarios: (1) routing wireless packets to the correct JBs; (2) routing packets to the correct anchor packet selection device for particular source-destination pair; (3) routing packet from one FNS to another FNS, and (4) routing tables to assist in the wireless-wired networks integration. Note that the functionalities of the packet selection module 193 and a routing module 194 can be combined in a single module.

FIG. 9A is a block diagram of a WGD 70 for transmitting to and receiving from all other devices, for routing to other devices, and in certain embodiments of the present invention for practicing high level applications including protocol translation and assignment of paths for source-destination pairs. WID 70 generally includes a processor 72, such as a central processing unit, a wireless transceiver 74 and associated antenna 76, a clock 85 and support circuitry 82. The processor 72, wireless transceiver 74, clock 85 and support circuitry 82 are commonly connected via a bus 84, which also connects to a memory 78. Memory 78 commonly can include both volatile (RAM) and non-volatile (ROM) memory units, and stores software or firmware programs in a program storage portion and stores data in a data storage portion. A routing table 190 specified in accordance with the present invention resides in memory 78, i.e., in the data storage portion. Furthermore, in certain embodiments of the present invention, the program storage portion of the memory 78 can include a routing optimization module 110 and a set of routing rules 120. In receiving, transmission and routing modes, the WGD 70 operates in a manner similar to the operation of the WID 50. The processor 72 generally operates using the OSI model described above for gateway devices, and carries out instructions for transmission, receipt and routing of data. The WGD 70 has sufficient intelligence to be able to address and route to specific communication devices. In addition, in certain embodiments of the present invention, the processor 72 of the WGD 70, in particular a master WGD 70 executes the logic for the route optimization module 110, the end-to-end delay minimization module 210, the tier delay minimization module 310, the delay minimization module 410, other modules that apply constraints including one or more of throughput and number of hops, or a combination including at least one of the foregoing modules, and the path assignments are stored in the routing table 190. In embodiments where the route optimization module and associated logic is carried out in other computing devices, the routing table 190 can be downloaded directly to the WIDs and WGDs for use during data routing operations, or transmitted through the wireless network in data frames and stored where required, i.e., in the routing WIDs and WGDs.

In certain embodiments of the present invention, the tier containing the WIDs can be bypassed, such that the WEDs transmit to, and receive from, WGDs. For instance, such a configuration is common in a wireless HART® protocol. In additional embodiments, WIDs can transmit frames to, and receive frames from, other WIDs, for instance, whereby WGDs are bypassed.

FIG. 9B is a block diagram of an MWGD 70' for transmitting to and receiving from all other devices, for routing to other devices, and in certain embodiments of the present invention for conducting high level applications including protocol translation and assignment of paths for source-destination pairs. MWGD 70' is similar in function and architecture as WGD 70, with the addition of a wired interface 73. The MWGDs in the system and method of the present invention are in hardwired communication with other MWGDs, including the master WGD or master MWGD. In addition, MWGDs can be provided in hardwired connection directly with the MWIDs, JBs or MWID-JB sets. Furthermore, MWGDs 70' can form part of a MWGD-JB set, wherein the JB is wired to the MWGD via the interface 73. The routing table 190' stored in the memory 58 of the MWGD 50' includes the requisite FNSs through assigned paths pass. Further, data 192 is also provided which includes information about other MWGDs, WIDs, WGDs, MWIDs, MWID-JB sets, MWGD-JB sets, and/or the master MWGD. This information is used to dynamically route data transmissions, on a packet-by-packet basis, as required.

In addition, in certain embodiments of the present invention, the processor 72 of the MWGD 70', in particular a master MWGD 70' executes the logic for the route optimization module 110', the end-to-end delay minimization module 210', the tier delay minimization module 310', the delay minimization module 410', other modules that apply constraints including one or more of throughput and number of hops, or a combination including at least one of the foregoing modules, and the path assignments are stored in the routing table 190'. Note that modules 110', 210', 310' and 410' are similar to modules 110, 210, 310 and 410, respectively, with the additional information related to the hardwired connections and the field network sets used to determine the route optimization module and associated logic. Furthermore, data 192 is also provided which includes information about other MWIDs, WIDs, WGDs, MWGDs, MWID-JB sets, MWGD-JB sets, and/or the master MWGD. Data 192 is used to dynamically route data transmissions, on a packet-by-packet basis, as required.

At least certain MWGDs 70', and in particular any MWGDs 50' that serve as anchor packet selection devices within an FNS, also includes a packet selection module 193 and a routing module 194. Since multiple copies of the same transmitted packet originates from a particular source toward a particular destination can reach an anchor MWGD within tier 3, the packet selection module 193 (1) selects the best packet among the various copies of received packets from different paths, and (2) forwards the selected packet to the master WGD or to an MC, either through wired or wireless paths, or both, depending on the reliability requirements. Further, the routing module 194 supports the architecture of the FNSs and support the packet selection module, including modified/expanded routing tables (routing tables 190' described herein) to support the following routing scenarios: (1) routing wireless packets to the correct JBs; (2) routing packets to the correct anchor packet selection device for particular source-destination pair; (3) routing packet from one FNS to another FNS, and (4) routing tables to assist in the wireless-wired networks integration. Note that the functionalities of the packet selection module 193 and a routing module 194 can be combined in a single module.

Figure 10:
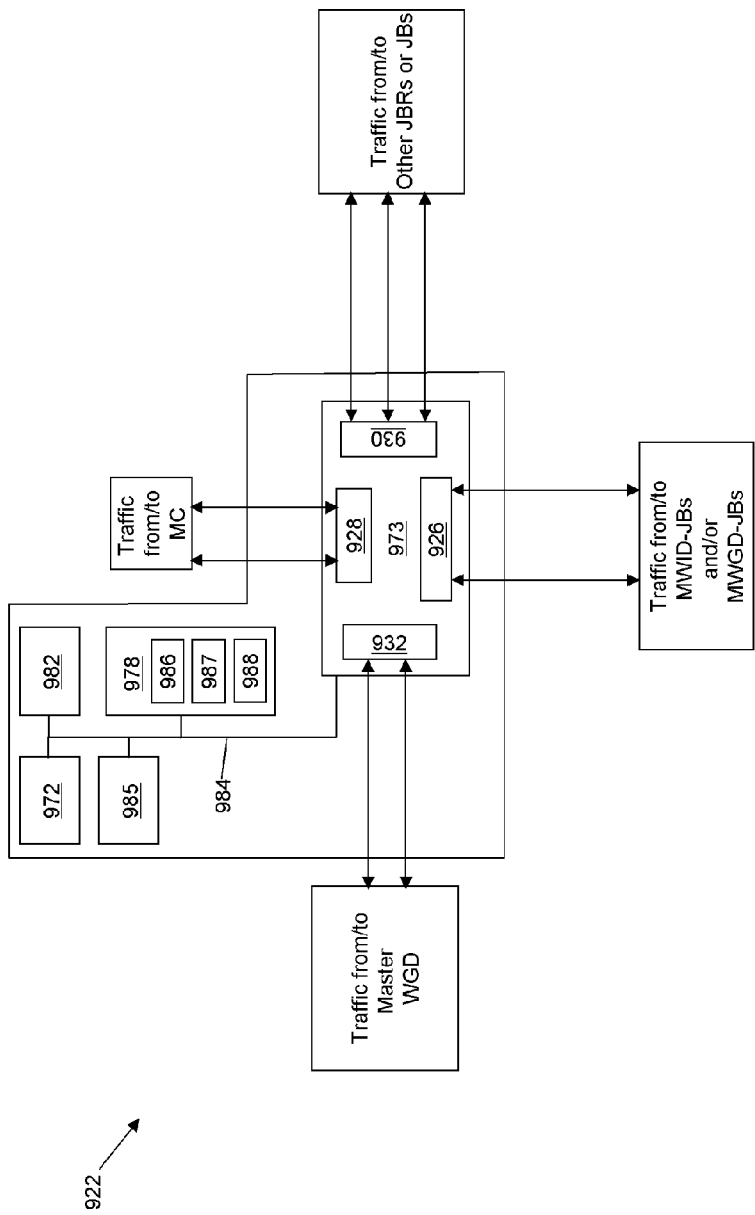
FIG. 10 is a block diagram of a junction box router according to certain embodiments of the present invention.

FIG. 10 is a block diagram of the junction box router (JBR) 922. JBR 922 generally includes a processor 972, such as a central processing unit, a clock 985, an interface 973 and support circuitry 982. The processor 972, interface 973, clock 985 and support circuitry 982 are commonly connected via a bus 984, which also connects to a memory 978. Memory 978 commonly can include both volatile (RAM) and non-volatile (ROM) memory units, and stores software or firmware programs in a program storage portion and stores data in a data storage portion. The data storage portion of memory 978 includes an address table 986, and the program storage portion of the memory 978 includes a routing logic module 987 and a router management diagnosis module 988.

The interface 973 serves as a routing engine that provides functionality of a router switch, includes an interface 926 for wired connectivity to one or more MWID-JBs or MWGD-JBs, an interface 928 for wired connectivity to a marshalling cabinet, an interface 930 for wired connectivity to other JBRs or JBs (within the same FNS or different FNS), and an interface 932 for wired connectivity to the master WGD of the network.

For wireless traffic routing, the MWIDs within an FNS can be interconnected directly to other MWIDs. In certain preferred embodiments, MWIDs are interconnected through the nearest JBs and/or JBR in the CCR (e.g., MWID #1 to JB #1 to JBR to JB #2 to MWID #2), thereby permitting the various MWID-JBs and MWIDs within an FNS to operate as a single wireless routing device covering a larger physical area in the facility.

In addition, in accordance with the present invention, the wireless plant network is interfaced with the wired network, advantageously allowing existing JBs installed in a facility, typically having sufficient spare fiber optic/wire connectivity, to ensure that a large portion of the wireless paths and/or links use wired connectivity. This reduces the wireless congestion, and improves the overall efficiency of the wireless network.

The following definitions and symbols are used herein in the description of the route optimization module and associated system and method of the present invention:

i denotes usage class as described above, and can be 0, 1, 2, 3, 4 or 5;

j denotes the tier of the wireless device and can be 1, 2 or 3;

$D_i$ denotes the traffic distribution, i.e., percentage of the total traffic, for class i;

$N_P$ denotes the number of possible paths between a source and a destination;

$N_i^{opt}$ denotes the minimum or optimum number of paths for a source-destination pair in usage class i;

x denotes the path number, i.e. x=1, 2, 3, . . . , $N_P$; e.g., x=5 mean the $5^{th}$ path out of $N_P$ paths;

$|L(x)|$ denotes the number of intermediate links for the x-th path;

$|L_i^{opt}|$ denotes the maximum number of intermediate links for a path for a source-destination pair in usage class i;

$L(x,y)$ denotes the y-th link of the x-th path, for y=1, 2, 3, . . . , $|L(x)|$;

$\Phi(L(x,y))$ denotes the frame error probability for the y-th link of the x-th path, and the link reliably profile is a matrix consisting of all $[1-\Phi(L(x,y))]$;

$\Phi(x)$ denotes the frame error probability for the x-th path, e.g., $\Phi(2)$ is the frame error probability of path 2, $\Phi(2,5)$ is the effective frame error probability for the combined path 2 and 5;

$1-\Phi_c(i)$ denotes the end-to-end reliability requirements for class i;

$\Phi_c(i)$ denotes the end-to-end frame error probability requirements for class i;

α denotes the maximum allowable frame error probability for a single link;

$\eta(L(x,y))$ is the existing throughput for the y-th link of the x-th path;

$\eta(L(x,y), max)$ is the maximum throughput for the y-th link of the x-th path;

$\psi(j,i,x)$ denotes the calculated delay in tier j for class i going through path x, and the tier delay profile is a matrix for all $\psi(j,i,x)$;

$\psi(i,j,max)$ denotes the maximum allowable delay in tier j for class i;

$\psi(i,x)$ denotes the calculated delay for a particular path x for class i; and $\psi(i,max)$ denotes the maximum allowable end-to-end delay for class i.

Table 1 represents process control system requirements based upon each usage class:

TABLE 1

| Class (i) | Class Description | Traffic Distribution $D_i$ | Reliability Requirements $1 - \Phi_c(i)$ | Delay Requirements $\psi(i, j, max)$, $\psi(i, max)$ |
|---|---|---|---|---|
| 0 | Safety & Emergency Actions | $D_0$ | $1 - \Phi_c(0)$ | $\psi(0, j, max)$, $\psi(0, max)$ |
| 1 | Closed-Loop Regulatory Control | $D_1$ | $1 - \Phi_c(1)$ | $\psi(1, j, max)$, $\psi(1, max)$ |
| 2 | Closed-Loop Supervisory Control | $D_2$ | $1 - \Phi_c(2)$ | $\psi(2, j, max)$, $\psi(2, max)$ |
| 3 | Open-Loop Control | $D_3$ | $1 - \Phi_c(3)$ | $\psi(3, j, max)$, $\psi(3, max)$ |
| 4 | Alerting | $D_4$ | $1 - \Phi_c(4)$ | $\psi(4, j, max)$, $\psi(4, max)$ |
| 5 | Logging | $D_5$ | $1 - \Phi_c(5)$ | $\psi(5, j, max)$, $\psi(5, max)$ |

The following description and related equations set forth an exemplary process and route optimization module for determining and assigning one or more reliable paths for a source-destination pair. However, one of ordinary skill in the art will appreciate that deviations from the set of equations that follow, including variations in sequence and precise definition of terms, can result in the same or an equivalent determination and assignment. Accordingly, in accordance with an embodiment of the present invention, the method steps described with respect to FIGS. 14A and 14B, FIGS. 15A and 15B, FIGS. 16A and 16B, FIGS. 17A and 17B, and variations thereof, are implemented as a module, or set of instructions, in a computing device, which can include a WGD or a separate computing device. In the case of the module being executed by a WGD, the module can be executed in a master wireless gateway device, for instance, located in the CCR, or alternatively by one or more of the additional wireless gateway devices within tier 3.

In embodiments in which the one or more modules 110, 210, 310, 410 are executed by a separate computing device, the end results, i.e., the assignment and determination of one or more reliable paths between a selected source-destination pair, can be ascertained and uploaded to one or more of the wireless gateway devices. In certain embodiments employing a separate computing device, an adaptive system is provided whereby communication between the separate computing device and one or more WGDs is maintained continuously (wired or wireless). In an adaptive system, one or more WGDs can be programmed to look to the separate computing device to determine and assign new paths between one or more selected source-destination pairs. In alternative embodiments, the WGDs and WIDs can communicate with the separate computing device periodically to receive updates. In further alternative embodiments, one or more WGDs and/or WIDs can instruct the separate computing device to execute the route optimization module of the present invention to alter assignments when performance degradation is detected, for example, in the case of one or more bad links or nodes within the wireless process control and/or automation network.

Figure 11:
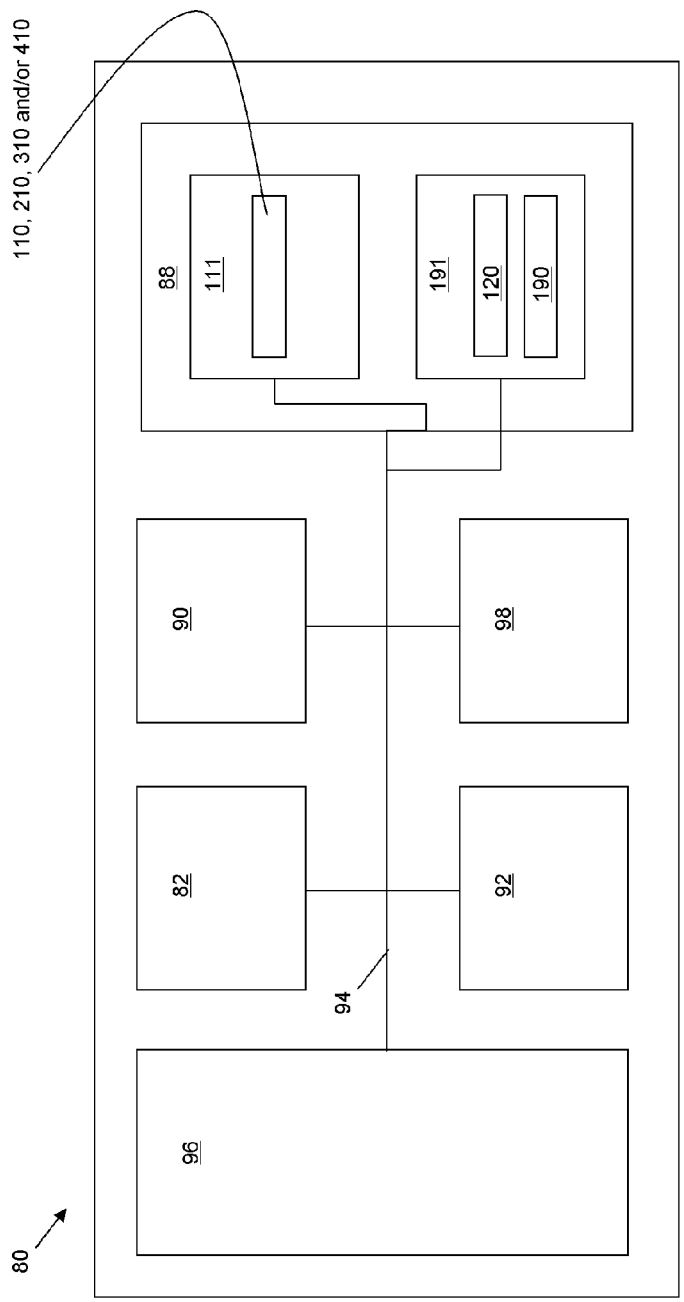
FIG. 11 is a block diagram of a basic computing device configuration in accordance with embodiments of the present invention.

An exemplary block diagram of a computer system 80 by which the route optimization module of the present invention can be implemented is shown in FIG. 11. Computer system 80 includes a processor 82, such as a central processing unit, an input/output interface 90 and support circuitry 92. In certain embodiments, where the computer 80 requires a direct human interface, a display 96 and an input device 98 such as a keyboard, mouse or pointer are also provided. The display 96, input device 98, processor 82, and support circuitry 92 are shown connected to a bus 94 which also connects to a memory 88. Memory 88 includes program storage memory 111 and data storage memory 191. Note that while computer 80 is depicted with direct human interface components display 96 and input device 98, programming of modules and exportation of data can alternatively be accomplished over the interface 90, for instance, where the computer 80 is connected to a network and the programming and display operations occur on another associated computer, or via a detachable input device as is known with respect to interfacing programmable logic controllers.

Program storage memory 111 and data storage memory 191 can each comprise volatile (RAM) and non-volatile (ROM) memory units and can also comprise hard disk and backup storage capacity, and both program storage memory 111 and data storage memory 191 can be embodied in a single memory device or separated in plural memory devices. Program storage memory 111 stores software program modules and associated data, and in particular stores a route optimization module 110, the end-to-end delay minimization module 210, the tier delay minimization module 310, the delay minimization module 410, other modules that apply constraints including one or more of throughput and number of hops, or a combination including at least one of the foregoing modules. Data storage memory 191 stores a set of routing rules 120 and a routing table 190 generated by the one or more modules of the present invention.

It is to be appreciated that the computer system 80 can be any computer such as a personal computer, minicomputer, workstation, mainframe, a dedicated controller such as a programmable logic controller, or a combination thereof. While the computer system 80 is shown, for illustration purposes, as a single computer unit, the system can comprise a group/farm of computers which can be scaled depending on the processing load and database size. In addition, as described above, the functionality of the computer system 80 can be executed by one or more of the WGDs, MWGDs, and/or within the DCS.

The computing device 80 preferably supports an operating system, for example stored in program storage memory 111 and executed by the processor 82 from volatile memory. According to an embodiment of the invention, the operating system contains instructions for interfacing the device 80 to the wireless process control and/or automation network, including the route optimization module of the present invention as more fully discussed herein.

Figure 12:
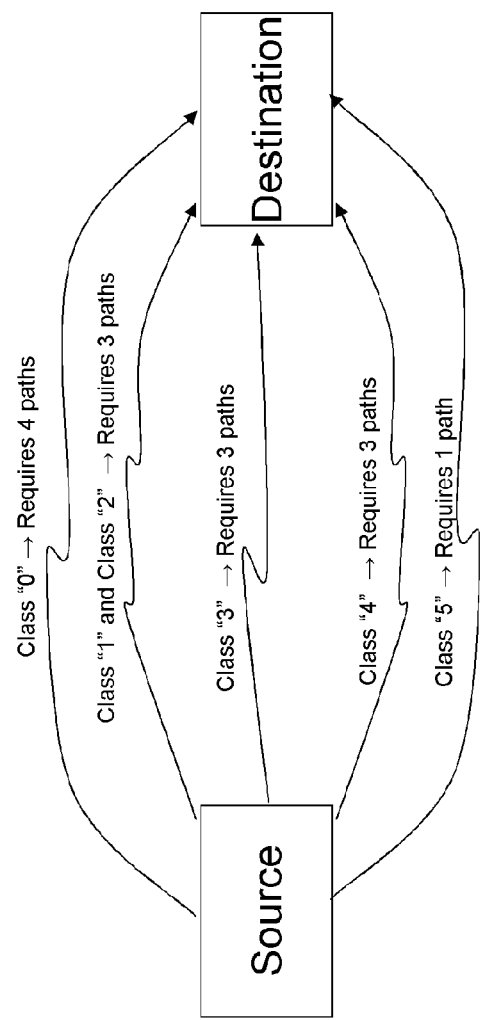
FIG. 12 is an overview of an example of the requisite number of paths per usage class according to the present invention.

FIG. 12 shows six (6) types of traffic transmitted between the source and the destination. Assignment of paths is determined in a manner to meet the usage class performance requirement. For instance, instead of having 4 paths to cover all traffic between a source and a destination, paths are assigned per usage class performance requirement.

Figure 13:
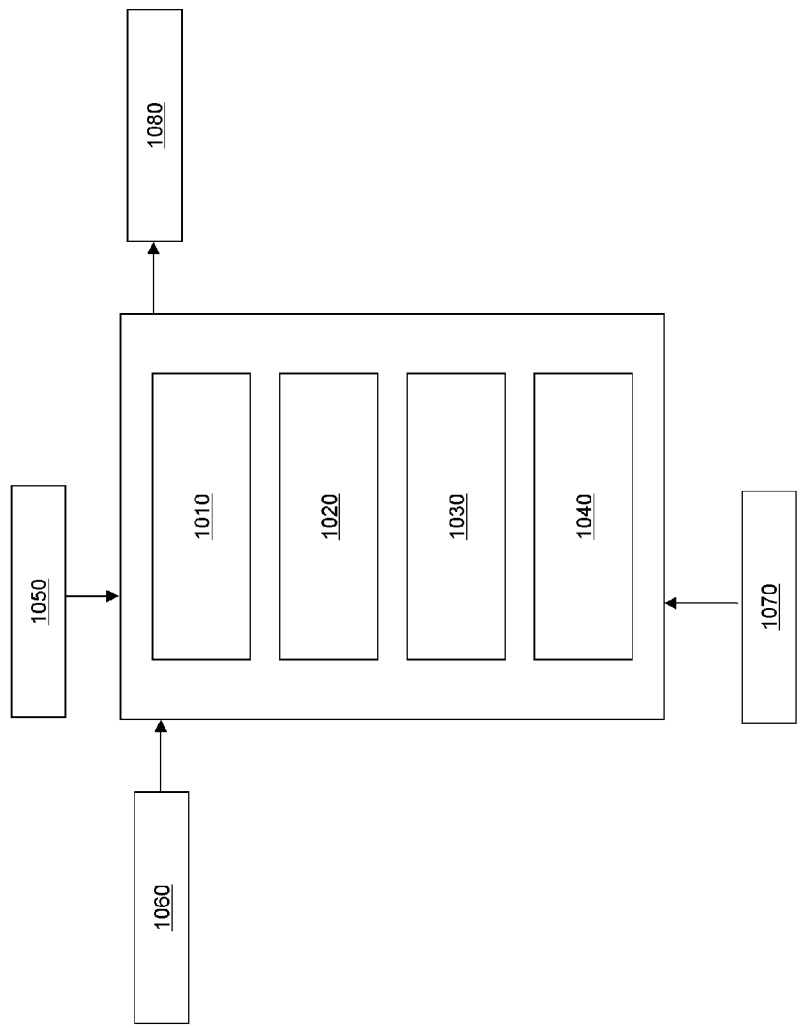
FIG. 13 is a block diagram of the optimization framework carried out by one or more modules in accordance with certain embodiments of the present invention.

FIG. 13 is a block diagram representing the optimization framework in accordance with the present invention. A suitable computer (e.g., computer 80 provided in the CCR and/or at the master WGD) executes a set of modules 1010, 1020, 1030 and 1040. Module 1010 determines the architecture configuration of JBs, MWIDs and MWGDs. Module 1020 determines the configuration of the FNSs, including the number of FNSs, the size of each FNS (i.e., number of components), and the area of the plant that each FNS shall encompass. Module 1030 is a path optimization module. Module 1040 is a packet selection module. The modules 1010, 1020, 1030 and 1040 are executed based on objectives 1050, inputs 1060, and constraints 1070, and generate outputs 1080.

Objectives 1050 include minimization of the number of paths and transmitted packets for each source-destination pair per usage class. Inputs 1060 include the plant layout (e.g., the physical location of the end devices and existing control/automation intermediate and gateway devices), traffic distribution, location of junction boxes, network statistics, the number of WIDs and MWIDs, the number of WGDs and MWGDs, and the usage classes. Constraints 1070 include the throughput per link, the reliability per link, the end-to-end reliability, the number of neighboring FNSs, maximum allowable tier delay and end-to-end delay, and allowable processor loading of an MWID (e.g., the anchor MWID) for packet selection in FNSs. The outputs 1080 include the assigned and alternate paths for each source-destination pair per usage class, for instance, in the form of a routing table.

Figure 14A:
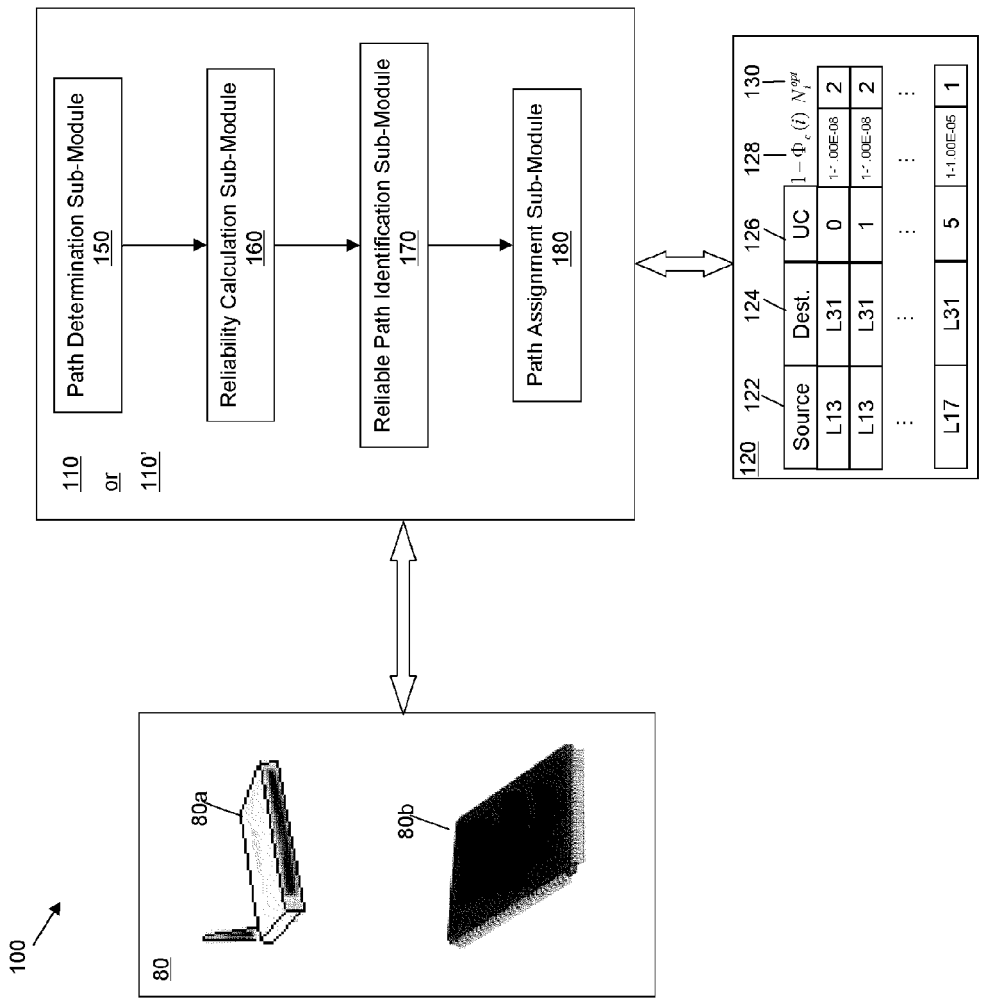
FIG. 14A is a schematic block diagram including a route optimization module in accordance with an embodiment of the present invention.

FIG. 14A is a schematic block diagram of a wireless process control and/or automation network routing system 100 according to an embodiment of the present invention. In general, the wireless process control and/or automation network routing system 100 includes a route optimization module 110, a set of routing rules 120, e.g., in the form of a routing table, and hardware 80 for executing the route optimization module 110 based on the set of routing rules 120. In general, the route optimization module 110 is executable by suitably interconnected hardware 80, such as one or more wireless gateway devices 80a, a separate computing device 80b, a combination of one or more wireless gateway devices 80*a* and a separate computing device 80*b*, or other known processing device.

The set of routing rules 120 is commonly in the form of a rule table, although one of ordinary skill in the art of computer science will appreciate that the set of rules can be in a format other than a table, e.g., a database, a directory, or other type of file structure. The set of routing rules 120 in the form of a rule table includes a source column 122, a destination column 124, a usage class column 126, a minimum reliability requirement $1-\Phi_c(i)$ column 128 and a column 130 specifying the minimum number of paths $N_i^{opt}$ in a source-destination pair per usage class. In general, the rules are specified for end-to-end source-destination pairs, although in certain embodiments it can be desirable to specify rules for other source-destination pairs. For example, a destination WGD can be provided with communication to the CCR outside of the route optimization module 110 of the present invention. The route optimization module 110 uses this set of routing rules 120 in certain steps or sub-modules as described further herein. The set of routing rules 120 can be stored in the hardware 80, or in a separate and accessible computer memory device, depending, for instance, upon the desired system configuration.

Figure 14B:
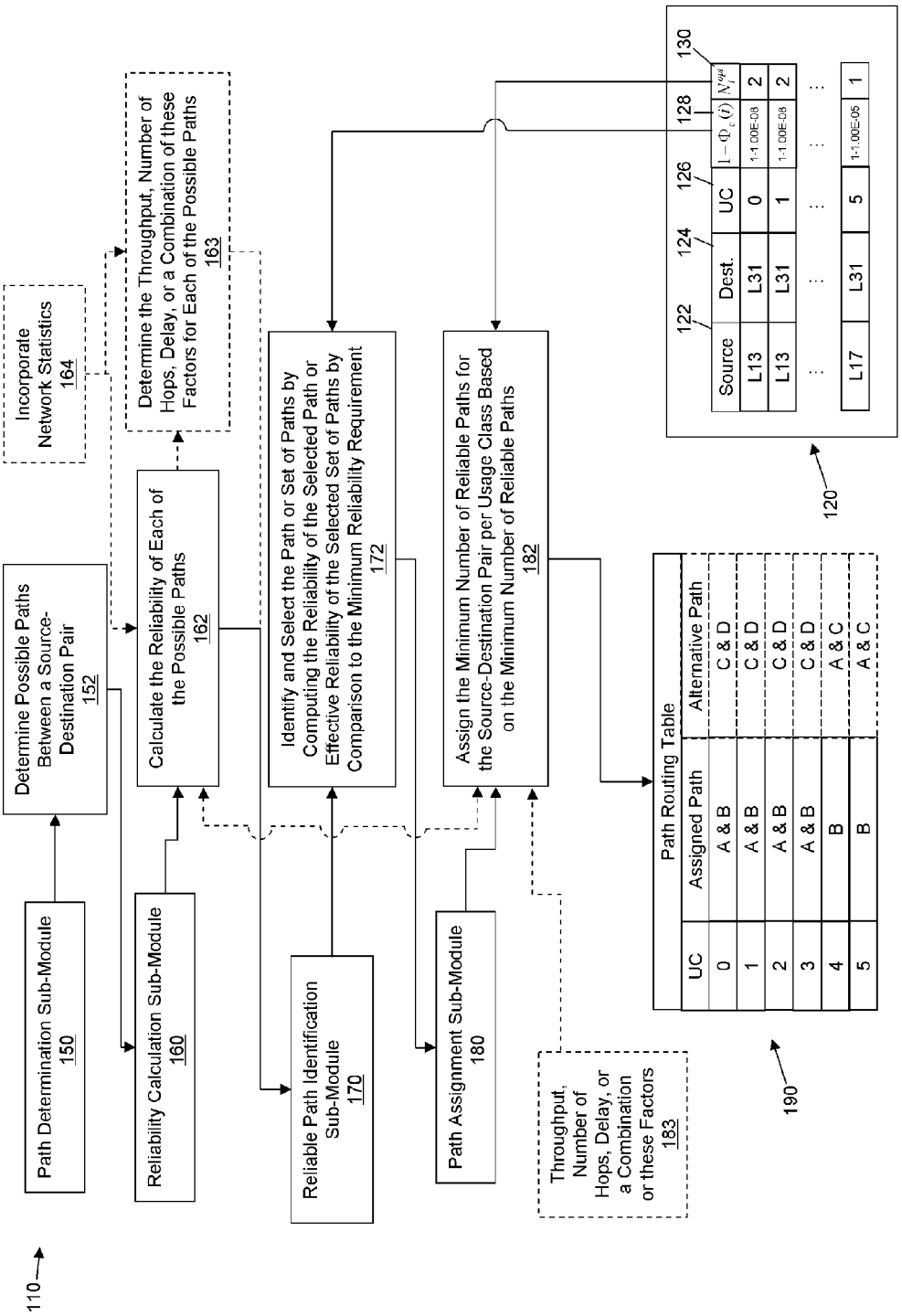
FIG. 14B is a flow chart of a method of assigning reliable paths for a source-destination pair in accordance with the present invention.

Still referring to FIG. 14A, and also referring to FIG. 14B, the operation of an embodiment of the route optimization module 110 is shown in more detail. A path determination sub-module 150 determines at step 152 possible paths between a selected source-destination pair. For example, referring to FIG. 3, for the source-destination pair of the wireless end device L17 and the wireless gateway device L35, the wireless paths shown by dashed lines include:

(i) L17-L293-L292-L36-L35;
(ii) L17-L293-L29-L36-L35;
(iii) L17-L293-L29-L34-L35;
(iv) L17-L291-L292-L36-L35;
(v) L17-L291-L292-L34-L35;
(vi) L17-L291-L28-L34-L35;
(vii) L17-L293-L292-L291-L28-L34-L35;
(viii) L17-L291-L292-L293-L29-L36-L35; and
(ix) L17-L291-L292-L293-L29-L34-L35.

For the source-destination pair of the wireless end device L13 and the wireless gateway device L31 at the central control room, the paths shown by dashed lines include:

(i) L13-L23-L24-L32-L31;
(ii) L13-L23-L32-L31;
(iii) L13-L24-L23-L32-L31;
(iv) L13-L24-L32-L31;
(v) L13-L24-L25-L32-L31;
(vi) L13-L24-L25-L26-L32-L31;
(vii) L13-L25-L32-L31;
(viii) L13-L26-L32-L31
(ix) L13-L25-L24-L32-L31;
(x) L13-L26-L25-L32-L31; and
(xi) L13-L26-L25-L24-L32-L31.

Note that while paths show that data frames generally hop from a tier 1 node to one or more tier 2 nodes, and then to one or more tier 3 nodes, in certain embodiments a path can include data frames that hop from a tier 2 node to a tier 3 node, back to a tier 2 node and back to a tier 3 node, whereby duplication of nodes within a path is generally avoided. However, as described further herein, such paths having a larger number of hops will likely be eliminated from consideration in preferred embodiments of the present invention. Of course, one of ordinary skill in the art will recognize that other paths not specifically marked in FIG. 3 are possible.

Next, a reliability calculation sub-module 160 calculates at step 162 the reliability of each of the possible paths, calculated from a link reliability profile. In certain alternative embodiments, the listing of all of the paths can be preliminarily filtered to eliminate those that are greater than a maximum number of links for a given usage class i, $|L_i^{opt}|$. For example, if $|L_i^{opt}|$ is specified as five for all usage classes, an excessive path link filter sub-module can be applied to discard from the routing table 190 paths with more than five links, i.e., $|L(x)|>|L_i^{opt}|$, such as paths (vii), (viii) and (ix) of the source-destination pair of the wireless end device L17 and the wireless gateway device L35. Likewise, an excessive path link filter sub-module can be applied to discard from the routing table 190 paths (vi) and (xi) related to the source-destination pair of the wireless end device L13 and the wireless gateway device L31.

In additional and/or alternative embodiments, as described further herein, the link reliability profile data can be obtained from empirical data of frame error rates of each link, or derived from estimates calculated based upon the type of hardware and network loading. For instance, an exemplary profile of link FER values is given in Table 2 below:

TABLE 2

| Source | Destination | Link FER $\Phi(L(x, y))$ |
|---|---|---|
| L13 | L23 | 1.00E−05 |
| L13 | L24 | 1.00E−06 |
| L13 | L25 | 5.00E−07 |
| L13 | L26 | 1.00E−07 |
| L23 | L32 | 5.00E−04 |
| L24 | L32 | 5.00E−06 |
| L25 | L32 | 5.00E−04 |
| L26 | L32 | 5.00E−03 |

The reliability $1-\Phi(x)$ for a path x is calculated from the link reliability profile data in Table 2 as follows:

$$1 - \Phi(x) = \prod_{y=1}^{|L(x)|} (1 - \Phi(L(x, y))). \tag{1}$$

Calculations in accordance with Equation (1) are repeated for each path x for each source-destination pair.

It is noted that a link in a path having a relatively low reliability will adversely affect the entire path performance, even if the remaining links have relatively high reliabilities. Therefore, it is advantageous to provide links with a small variance in reliability within a path. In certain preferred embodiments, this is accomplished by ensuring that:

$$\Phi(L(x,y)) \leq \alpha \text{ for all } y \tag{2}.$$

Paths x that include links y that do not meet Equation (2) are eliminated from consideration.

It is well known that the simultaneous transmission of a frame over two independent paths connecting a source and destination creates a higher reliability than if the frame were only transmitted via a single path. Applied to the present invention, when combining two independent paths, namely $x_1$ and $x_2$, the effective reliability is expressed as:

$$1 - \Phi(x_1, x_2) = 1 - \Phi(x_1) * \Phi(x_2) \tag{3},$$

and for $N_P$ independent paths, the effective reliability of the combined $N_P$ paths, denoted by $1-\Phi(x_1, x_2, \ldots, x_{N_p})$, is given by:

$$1 = \Phi(x_1, x_2, \ldots, x_{N_p}) = 1 - \prod_{w=1}^{N_p} (\Phi(x_w)). \quad (4)$$

In certain embodiments, in addition to calculating the reliability of each of the possible paths, or effective reliability of groups of paths, at step 162, sub-module 160 or another sub-module (not shown) performs an optional step 163 (shown by dashed lines) in which the throughput, number of hops, delay (tier and/or end-to-end), or a combination of one or more of throughput, number of hops and delay, for each of the possible paths is determined or calculated. This determination or calculation can be used in path selection to assign one or more paths that meet multiple constraints.

In additional embodiments, sub-module 160, and in particular step 162 and optionally step 163, considers statistics from the wireless process control and/or automation network, indicated by step 164 in dashed lines. Step 162 can determine reliability of each of the possible paths based on frame error rate statistics determined at each link, node and/or path. In addition, step 163 can obtain statistics at step 164 related to one or more of determined reliability, calculated throughput, calculated end-to-end delay and calculated tier delay.

A reliable path identification sub-module 170, at step 172 identifies and selects a path, i.e., reliable paths $1-\Phi(x)$, or set of paths, i.e., $1-\Phi(x_1,x_2)$ or $1-\Phi(x_1,x_2,\ldots,x_{N_p})$, from the possible paths x between a selected source-destination pair. The selected path or set of paths is identified by comparison to the minimum reliability requirements $1-\Phi(i)$ specified in the set of routing rules 120. Accordingly, paths meeting the following conditions are identified as reliable:

$$1-\Phi(x) \geq 1-\Phi(i) \text{ for each usage class} \quad (5),$$

and $$|L(x)| \text{ is smallest} \quad (6).$$

Note that in circumstances in which combined independent paths are selected, i.e., a selected group of paths, the comparison of Equation (5) is carried out substituting $1-\Phi(x_1,x_2)$ calculated from Equation (3) or $1-\Phi(x_1,x_2,\ldots,x_{N_p})$ calculated from Equation (4) for $1-\Phi(x)$.

In certain embodiments, the paths and/or group of paths can be selected based on the condition that $|L(x)|$ satisfies the following constraint:

$$|L_i^{opt}| \geq |L(x)| \quad (7).$$

Finally, a path assignment sub-module 180 assigns at step 182 the minimum number of reliable paths for the selected source-destination pair based on the minimum number of paths $N_i^{opt}$ for a source-destination pair specified in the set of routing rules 120. These paths can be then assigned in a path routing table 190, where the notations "A," "B," "C" and "D" refer to different paths that meet the conditions of Equation (5) and have the lowest $|L(x)|$. Where the number of paths having the lowest $|L(x)|$ value do not meet the minimum number of paths $N_i^{opt}$ for a source-destination pair, the path(s) having the next largest $|L(x)|$ are assigned so that the minimum number of paths $N_i^{opt}$ for a source-destination pair is provided. In the alternative, the paths selected satisfy the conditions of Equation (7). As described further herein, in optional embodiments of the present invention, at step 182, the path assignment sub-module 180 also considers additional constraints in assigning paths to the path routing table 190, including throughput, delay (end-to-end and/or tier), number of hops, or a combination of one or more of throughput, number of hops and delay, as indicated by step 183 in dashed lines.

Furthermore, in additional embodiments of the present invention, the path assignment step 182 is iterative, wherein, based upon network statistics related to one or more of calculated reliability, number of hops, calculated throughput, calculated end-to-end delay and calculated tier delay, certain paths are discarded and replaced with additional paths to meet the minimum number of paths $N_i^{opt}$ for a source-destination pair. This optional embodiment allows the system and method to be adaptive to continuously maintain optimal network traffic flow, and is comprehended in FIG. 14B with a dashed connector between steps 162 and 182.

In certain embodiments, several combinations of paths or groups of paths will meet the requirements of Equations (5)-(6). In these cases, the selection of the paths should seek a uniform distribution of traffic over the network. The method of the present invention therefore assigns the minimum number of paths $N_i^{opt}$ for a source-destination pair and in certain embodiments additional alternate paths. For instance, as shown in path routing table 190, up to two alternate paths are provided. The remaining set of paths $N_p - (N_i^{opt}+2)$ are discarded.

For a particular source-destination pair, during normal operating conditions, data traffic is routed through the assigned paths rather than the alternate paths. However, if degradation in the usage class performance is sensed at either end, or at one of the links or nodes in an assigned path, data traffic passes through both the assigned paths and the alternate paths.

In certain alternative embodiments of the present invention, the minimum number of paths $N_i^{opt}$ for a source-destination pair is dynamically adjusted based on the usage class reliability requirements $1-\Phi_c(i)$ and variations in network and/or traffic loading. The minimum number of paths $N_i^{opt}$ that meet the network reliability requirements can be determined such that:

$$\Phi(N_i^{opt}) \leq \Phi_c(i), \text{ for all } i \quad (8)$$

In an additional embodiment of the present invention, consideration is given to a maximum allowable delay in assignment of particular paths for a source-destination pair. Accordingly, if the calculated delay exceeds the maximum allowable delay for a given path, another path, e.g., a set of WED, WID, and/or WGD, can be added to minimize delay. Alternatively, or in conjunction, another radio frequency channel and/or hopping pattern can be employed to minimize delay for the given path.

In certain embodiments in which the path assignment is based on usage class, one or more paths x are assigned such that the following conditions are satisfied:

$$\psi(j,i,x) \leq \psi(j,i,\text{max}) \text{ for all } j,i, \text{ and } x \quad (9a), \text{ and}$$

$$\psi(i,x) \leq \psi(i,\text{max}) \text{ for all } i \text{ and } x \quad (9b).$$

Paths x that do not meet the conditions of Equation (9a) or Equation (9b) are discarded in this embodiment.

In certain embodiments of the present invention, the maximum allowable delay is considered in selecting the minimum number of paths $N_i^{opt}$ for a source-destination pair based on satisfaction of Equations (9a) and (9b).

In further embodiments of the present invention, the method and system of the present invention defines a maximum allowable delay for frame transmission within each tier j, $\psi(i,j,\text{max})$, as a function of the class i. The sum of all values $\psi(i,j,\text{max})$ for all j should not exceed the maximum system delay constraints. Because wireless process control and/or automation networks can be sensitive to delay, maintaining the transport delay at each tier within the system maximum allowable delay is desirable to ensure proper operation.

FIG. 14C is a flow process diagram illustrating the operation of an embodiment of a route optimization module 110' adapted to prepare a routing table 190' in a system including FNSs. A path determination sub-module 150 determines at step 152' possible paths between a selected source-destination pair. Note that step 152' is similar to step 152 of route optimization module 110, with the additional constraint that the paths determination for each source-destination pair requires passage through the anchor packet selection device, e.g., an MWID or in certain instances an MWGD. This is determined for N neighboring FNSs, wherein N is a predetermined value depending on various factors. In certain embodiments, N can be selected as three (3), however this value can be increased. Preferably it is not reduced below 3, as the lowest value for the minimum number of paths $N_i^{opt}$ in the set of routing rules 120 is generally 2, and it is desirable assign paths that pass through different FNSs.

In addition, the optional steps 163' and 183' are modified in module 110' as compared to steps 163 and 183 of module 110 by the inclusion of the number of neighboring FNSs and CPU loading of the MWID (for packet selection module).

The result of execution of the route optimization module 110' is the creation of the routing table 190' as shown in FIG. 14D. Routing table 190' is similar to routing table 190, with the inclusion of columns for assigned FNSs, assigned anchor packet selection (PS) device, alternate FNSs and alternate anchor packet selection for each source-destination pair. For instance, as shown in FIG. 14D, path "A" includes the assigned anchor path selection device "4" in FNS "I"; path "B" includes the assigned anchor path selection device "7" in FNS "III"; path "C" includes the assigned anchor path selection device "1" in FNS "V"; and path "D" includes the assigned anchor path selection device "5" in FNS "II."

In certain embodiments of the present invention, certain paths having wired connectivity are selected by the route optimization module 110' as at least one of the assigned paths for a source-destination pair for a give usage class, presuming that such paths exceed the reliability of paths that are entirely or substantially wireless. If more than one hardwired path is available, they will both be used as assigned paths and/or alternative paths. In further embodiments, for each source-destination pair, at least one wireless path is selected as an assigned or alternate path in the event that a hardwired link to the CCR is disabled, due to an unexpected failure or an anticipated disconnection (e.g., for service or maintenance). Furthermore, if multiple paths are required to meet a usage class requirement, in preferred embodiments paths are selected for routing table 190' that pass through different FNSs.

FIG. 15A is a schematic block diagram of a wireless process control and/or automation network routing system 200 according to another embodiment of the present invention. In general, the wireless process control and/or automation network routing system 200 includes an end-to-end delay minimization module 210, a set of maximum allowable end-to-end delay rules 220, e.g., in the form of a maximum allowable end-to-end delay table, and hardware 80 for executing the delay minimization module 210. In general, the delay minimization module 210 is executable by suitably interconnected hardware 80, such as one or more wireless gateway devices 80a, a separate computing device 80b, a combination of one or more wireless gateway devices 80a and a separate computing device 80b, or other known processing device.

The end-to-end delay minimization module 210 generally includes a path determination sub-module 150, an end-to-end delay calculation sub-module 260, a path identification sub-module 270 and a path assignment sub-module 280.

Figure 15B:
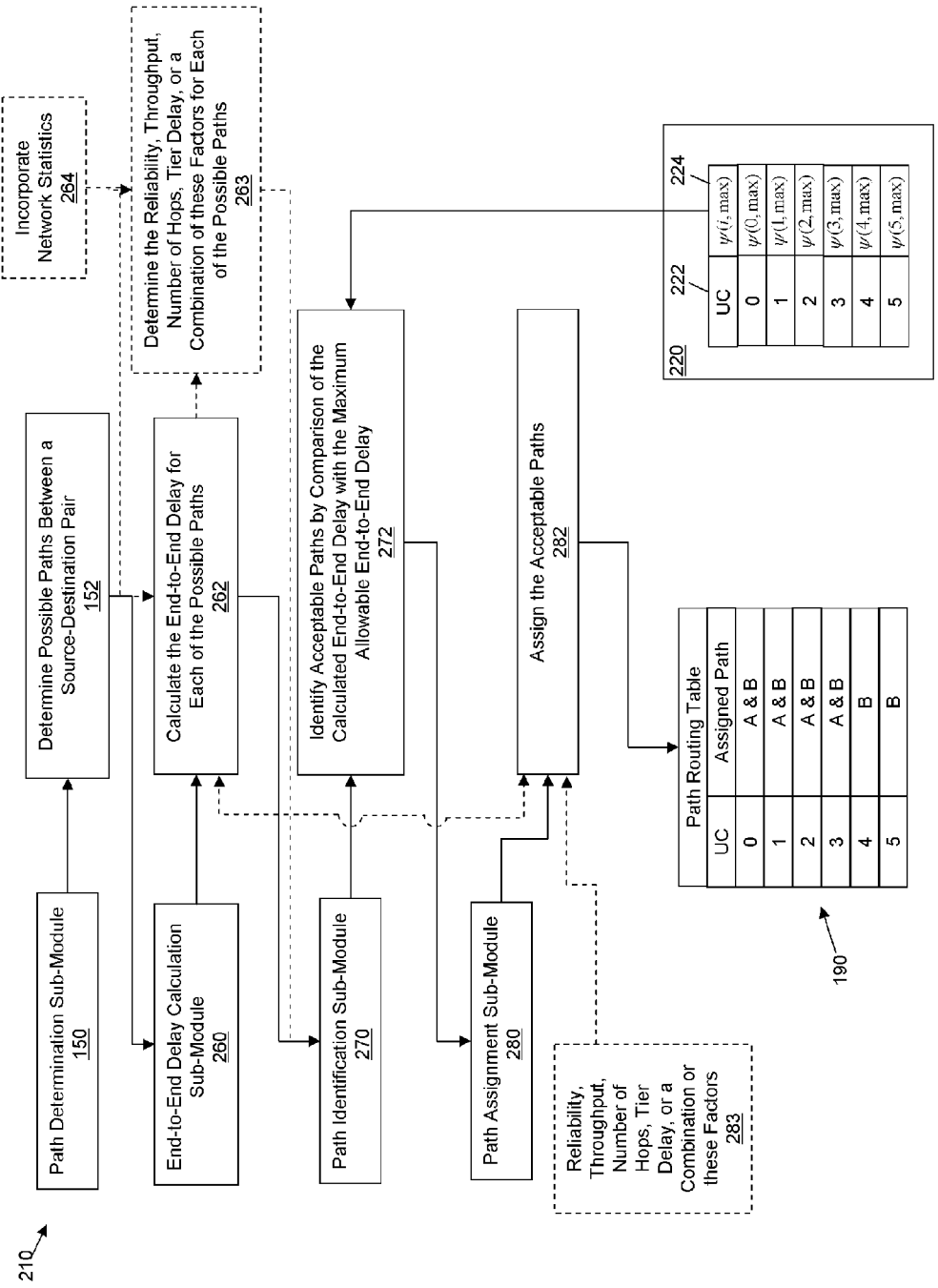
FIG. 15B is a flow chart of a method of assigning paths for operating the end-to-end delay minimization module in accordance with the present invention.

Still referring to FIG. 15A, and also referring to FIG. 15B, the operation of an embodiment of the end-to-end delay minimization module 210 is shown in more detail. A path determination sub-module 150 determines at step 152 possible paths between a selected source-destination pair. This step 152 and module 150 operate, for instance, in the same manner as described above with respect to FIGS. 14A and 14B.

Next, the end-to-end delay calculation sub-module 260 calculates at step 262 the end-to-end delay for each of the possible paths determined in step 152. These calculations can be based upon network statistics incorporated at step 264. For instance, each transmitted frame includes a timestamp with the time at which frame processing commences at the source. When the frame is received by the destination, a receipt timestamp is incorporated, and the end-to-end delay can be calculated based on the difference between the receipt time of the destination and the time that frame processing commenced at the source. This calculation accounts for all frame or packet processing time and transmission time at each node in the path.

In certain embodiments, in addition to calculating the end-to-end delay of each of the possible paths at step 262, sub-module 260 or another sub-module (not shown) performs an optional step 263 (shown by dashed lines) in which the reliability, throughput, number of hops, tier delay, or a combination of one or more of reliability, throughput, number of hops and tier delay, for each of the possible paths is determined or calculated. This determination or calculation can be used in path selection to assign one or more paths that meet multiple constraints.

Next, at step 272, the path identification sub-module 270 identifies acceptable paths by comparison of the calculated end-to-end delay with the maximum allowable end-to-end delay specified in the set of maximum allowable end-to-end delay rules 220. The set of maximum allowable end-to-end delay rules 220 includes, in certain embodiments, specified maximum allowable end-to-end delay 224 per usage class 222, denoted as $\psi(i,max)$. Paths are identified as acceptable if Equation (9b) set forth above is satisfied.

Finally, a path assignment sub-module 280 assigns at step 282 the acceptable paths, i.e., paths that satisfy Equation (9b), to the routing table 190. In additional embodiments of the present invention, at step 282, the path assignment sub-module 280 also considers additional constraints in assigning paths to the path routing table 190, including minimum reliability (e.g., following the module 110 described with respect to FIGS. 14A and 14B), maximum throughput, a maximum allowable tier delay, maximum number of hops, or a combination of one or more of minimum reliability, maximum throughput, maximum number of hops and minimum allowable tier delay, as indicated by step 283 in dashed lines.

During network transmission incorporating the system and method of the present invention, if a frame is received at the destination with a calculated end-to-end delay that exceeds the maximum allowable end-to-end delay, the path through which that frame passed will be identified in the network statistics as unacceptable for failing to satisfy the end-to-end delay constraint. This information will be used to dynamically discard that failed path from the routing table 190, and replace that path with one or more additional paths, for instance, if necessary to meet any other specified constraints.

In addition, in still further embodiments of the present invention, the path assignment step 282 is iterative, wherein, based upon network statistics related to one or more of calculated reliability, calculated throughput, number of hops and calculated tier delay, certain paths are discarded and replaced with additional paths. The iterative nature of the end-to-end delay minimization module 210 allows the system and method to be adaptive to continuously maintain optimal network traffic flow, and is comprehended in FIG. 15B with a dashed connector between steps 262 and 282.

Figure 15C:
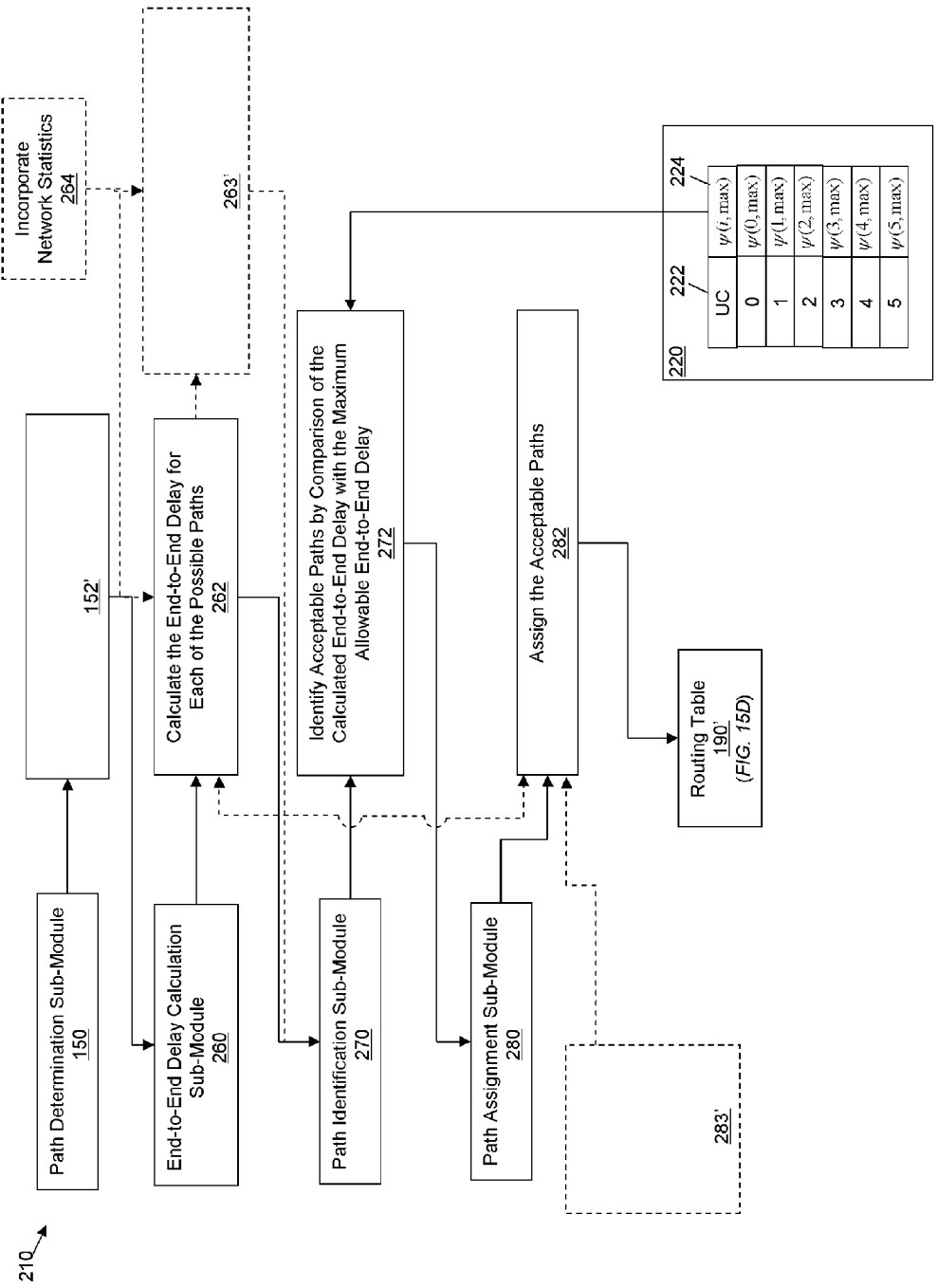
FIG. 15C is a flow chart of a method of assigning paths for operating the end-to-end delay minimization module in a hybrid network including field network sets in accordance with the present invention.

FIG. 15C is a flow process diagram illustrating the operation of an embodiment of an end-to-end delay minimization module 210' adapted to prepare a routing table 190' in a system including FNSs. A path determination sub-module 150 determines at step 152' possible paths between a selected source-destination pair. Step 152' includes the additional constraints (as compared to step 152 of end-to-end delay minimization module 210) described with respect to the route optimization module 110', i.e., that the paths determination for each source-destination pair requires passage through the anchor packet selection device for N neighboring FNSs In addition, the optional steps 263' and 283' are modified in module 210' as compared to steps 263 and 283 of module 210 in a similar manner as described with respect to steps 163' and 183' in the route optimization module 110', i.e., by the inclusion of the number of neighboring FNSs and CPU loading of the MWID (for packet selection module).

The result of execution of the end-to-end delay minimization module 210' is the creation of the routing table 190' as shown in FIG. 15D. Note that this routing table is similar to that shown with respect to FIG. 14D, with the elimination of the alternate paths, but the alternate paths can also be provided in the routing table 190' created using the end-to-end delay minimization module 210'. Routing table 190' as shown in FIG. 15D is similar to routing table 190 shown in FIG. 15B, with the inclusion of columns for assigned FNSs and assigned anchor packet selection (PS) devices.

In certain embodiments of the present invention, certain paths having wired connectivity are selected by the end-to-end delay minimization module 210' as at least one of the assigned paths for a source-destination pair for a give usage class, presuming that such paths have an end-to-end delay that is less than that of paths that are entirely or substantially wireless. If more than one hardwired path is available, they will both be used as assigned paths and/or alternative paths. In further embodiments, for each source-destination pair, at least one wireless path is selected as an assigned or alternate path in the event that a hardwired link to the CCR is disabled, due to an unexpected failure or an anticipated disconnection (e.g., for service or maintenance). Furthermore, if multiple paths are required to meet a usage class requirement, in preferred embodiments paths are selected for routing table 190' that pass through different FNSs.

Figure 16A:
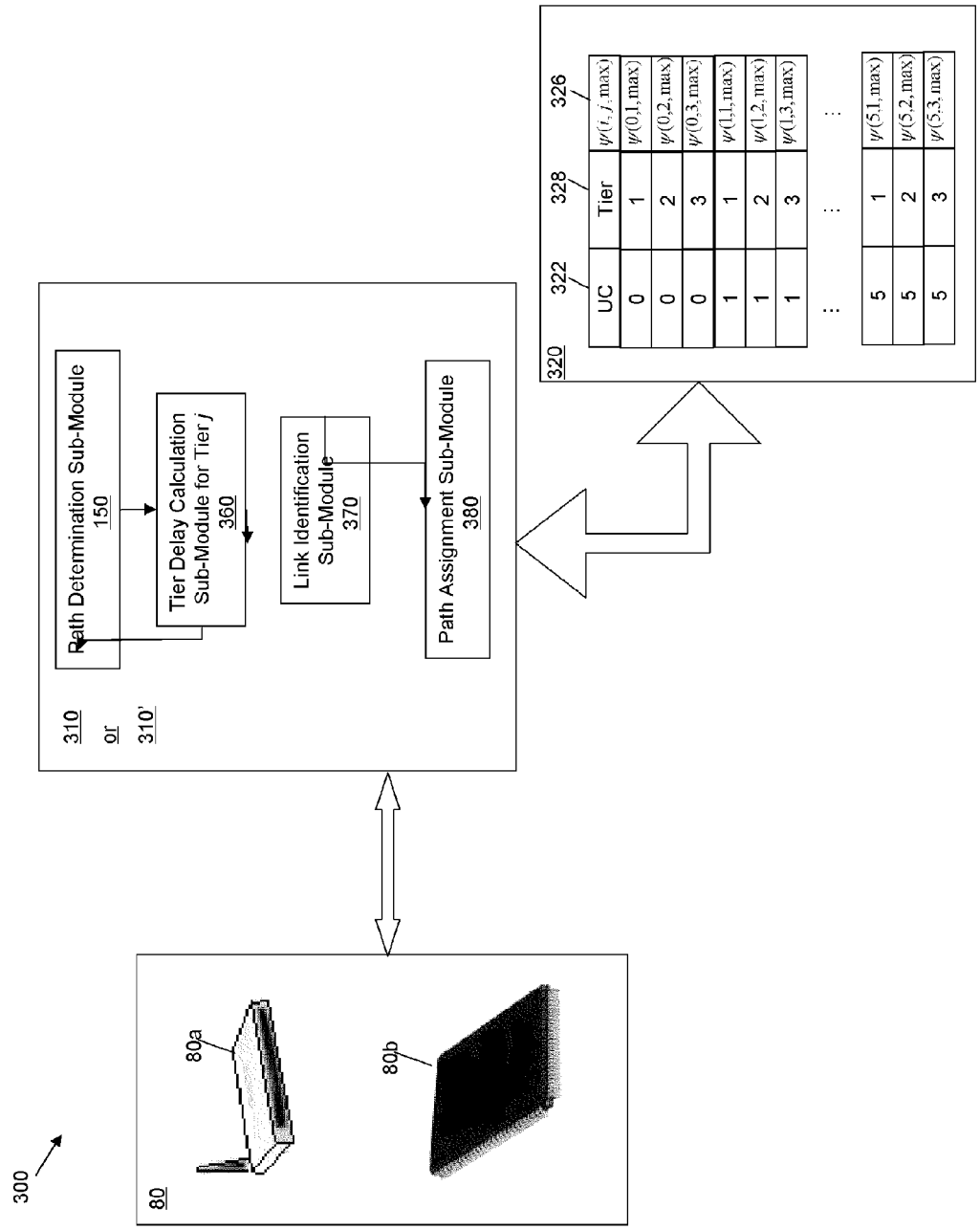
FIG. 16A is a schematic block diagram including a tier delay minimization module in accordance with an embodiment of the present invention.

FIG. 16A is a schematic block diagram of a wireless process control and/or automation network routing system 300 according to yet another embodiment of the present invention. In general, the wireless process control and/or automation network routing system 300 includes a tier delay minimization module 310, a set of maximum allowable tier delay rules 320, e.g., in the form of a maximum allowable tier delay table, and hardware 80 for executing the delay minimization module 310. In general, the delay minimization module 310 is executable by suitably interconnected hardware 80, such as one or more wireless gateway devices 80a, a separate computing device 80b, a combination of one or more wireless gateway devices 80a and a separate computing device 80b, or other known processing device. The tier delay minimization module 310 generally includes a path determination sub-module 150, a tier delay calculation sub-module 360, a link identification sub-module 370 and a path assignment sub-module 380.

Still referring to FIG. 16A, and also referring to FIG. 16B, the operation of an embodiment of the tier delay minimization module 310 is shown in more detail. A path determination sub-module 150 determines at step 152 possible paths between a selected source-destination pair. This step 152 and module 150 operate, for instance, in the same manner as described above with respect to FIGS. 14A and 14B.

Next, the tier delay calculation sub-module 360 calculates at step 362 the tier delay for each of the links or set of links in tier j for the possible paths determined in step 152. These calculations can be based upon network statistics incorporated at step 364. For instance, each transmitted frame includes a timestamp with the time at which frame processing commences at the source. When the frame is transmitted from the last node in the given tier, a transmission timestamp is incorporated, and the tier delay can be calculated based on the difference between the transmission time at the last node in the tier j and the time that frame processing commenced at the first node in the tier j. This calculation accounts for all frame or packet processing time and transmission time at each node in the path in tier j.

In certain embodiments, in addition to calculating the tier delay of each of the possible paths at step 362, sub-module 360 or another sub-module (not shown) performs an optional step 363 (shown by dashed lines) in which the reliability, throughput, number of hops, end-to-end delay, or a combination of one or more of reliability, throughput, number of hops and end-to-end delay, for each of the possible paths is determined or calculated. This determination or calculation can be used in path selection to assign one or more paths that meet multiple constraints.

Next, at step 372, the link identification sub-module 370 identifies acceptable links or sets of links by comparison of the calculated tier delay with the maximum allowable tier delay specified in the set of maximum allowable tier delay rules 320. The set of maximum allowable tier delay rules 320 includes, in certain embodiments, specified maximum allowable tier delay 326 per usage class i 322 per tier j 328, denoted as $\psi(j,i,max)$. A link or a set of links is identified as acceptable if Equation (9a) set forth above is satisfied. The steps 362 and 372 are repeated for each tier j within a path, or unless a calculated tier delay exceeds the maximum allowable tier delay, at which point the path is discarded.

Finally, after Equation (9a) is satisfied for all tiers within a given path, the path assignment sub-module 380 assigns at step 382 the acceptable paths to the routing table 190. In additional embodiments of the present invention, at step 382, the path assignment sub-module 380 also considers additional constraints in assigning paths to the path routing table 190, including reliability (e.g., following the module 110 described with respect to FIGS. 14A and 14B), throughput, a maximum allowable end-to-end delay, number of hops, or a combination of one or more of throughput, number of hops and tier delay, as indicated by step 383 in dashed lines.

During network transmission incorporating the system and method of the present invention, if a frame is received at the end of a tier with a calculated tier delay that exceeds the maximum allowable tier delay, that frame will be dropped, and the link or set of links within the tier will be identified in the network statistics as unacceptable as failing to satisfy the end-to-end delay constraint. This information will be used to dynamically discard the one or more paths including that link or set of links from the routing table 190, and replace the one or more discarded paths with one or more additional paths, for instance, if necessary to meet any other specified constraints.

In addition, in still further embodiments of the present invention, the path assignment step 382 is iterative, wherein, based upon network statistics related to one or more of calculated reliability, calculated throughput, number of hops and calculated tier delay, certain paths are discarded and replaced with additional paths. The iterative nature of the tier delay module 310 allows the system and method to be adaptive to continuously maintain optimal network traffic flow, and is comprehended in FIG. 16B with a dashed connector between steps 362 and 382.

Figure 16C:
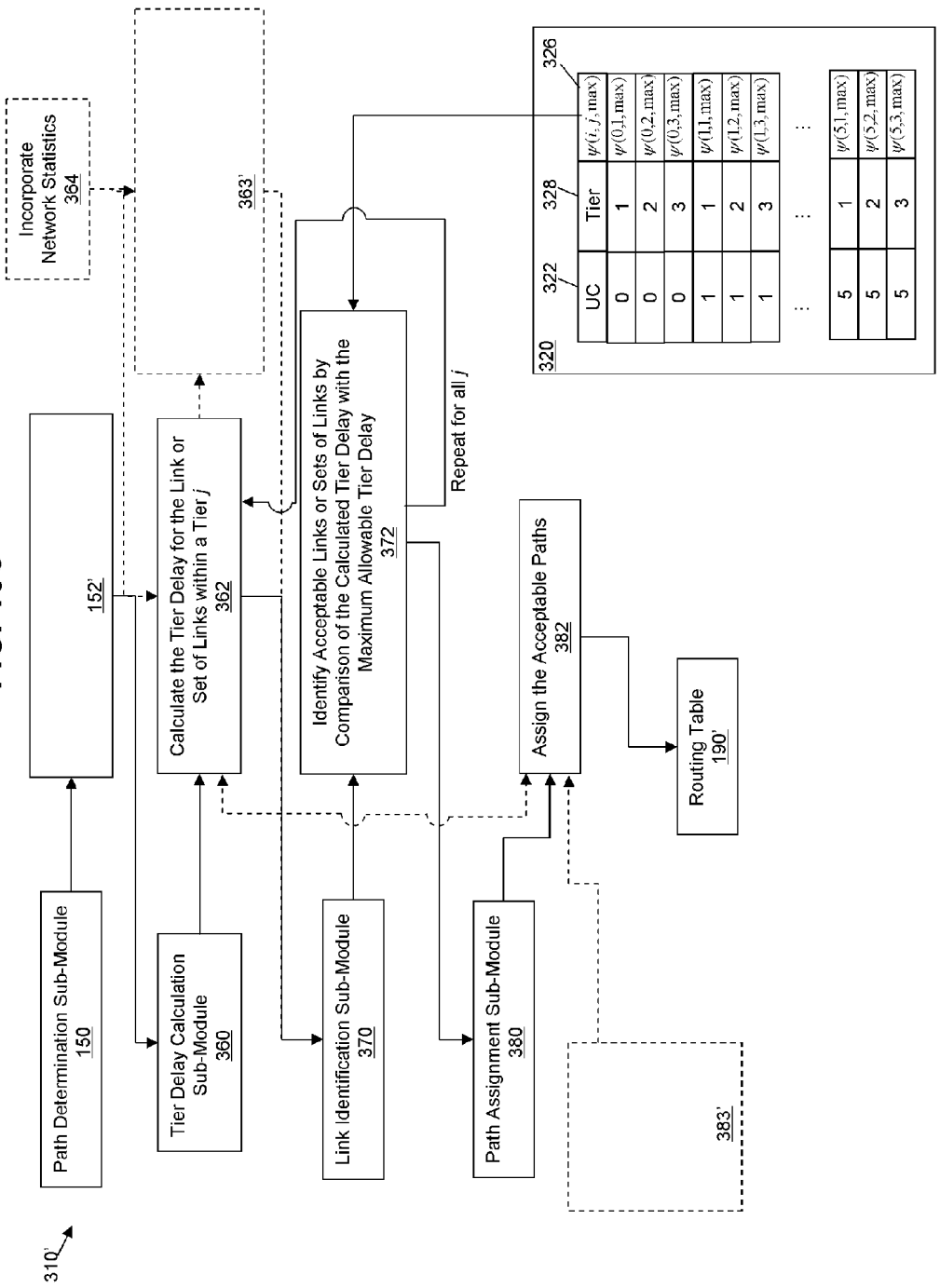
FIG. 16C is a flow chart of a method of assigning paths for operating the tier delay minimization module in a hybrid network including field network sets in accordance with the present invention.

FIG. 16C is a flow process diagram illustrating the operation of an embodiment of a tier delay minimization module 310' adapted to prepare a routing table 190' in a system including FNSs. A path determination sub-module 150 determines at step 152' possible paths between a selected source-destination pair. Step 152' includes the additional constraints (as compared to step 152 of tier delay minimization module 310) described with respect to the route optimization module 110', i.e., that the paths determination for each source-destination pair requires passage through the anchor packet selection device for N neighboring FNSs In addition, the optional steps 363' and 383' are modified in module 310' as compared to steps 363 and 383 of module 310 in a similar manner as described with respect to steps 163' and 183' in the route optimization module 110', i.e., by the inclusion of the number of neighboring FNSs and CPU loading of the MWID (for packet selection module).

The result of execution of the tier delay minimization module 310' is the creation of the routing table 190' as shown in FIG. 14D or 15D.

In certain embodiments of the present invention, certain paths having wired connectivity are selected by the tier delay minimization module 310' as at least one of the assigned paths for a source-destination pair for a give usage class, presuming that such paths have a tier delay that is less than that of paths that are entirely or substantially wireless. If more than one hardwired path is available, they will both be used as assigned paths and/or alternative paths. In further embodiments, for each source-destination pair, at least one wireless path is selected as an assigned or alternate path in the event that a hardwired link to the CCR is disabled, due to an unexpected failure or an anticipated disconnection (e.g., for service or maintenance). Furthermore, if multiple paths are required to meet a usage class requirement, in preferred embodiments paths are selected for routing table 190' that pass through different FNSs.

Figure 17A:
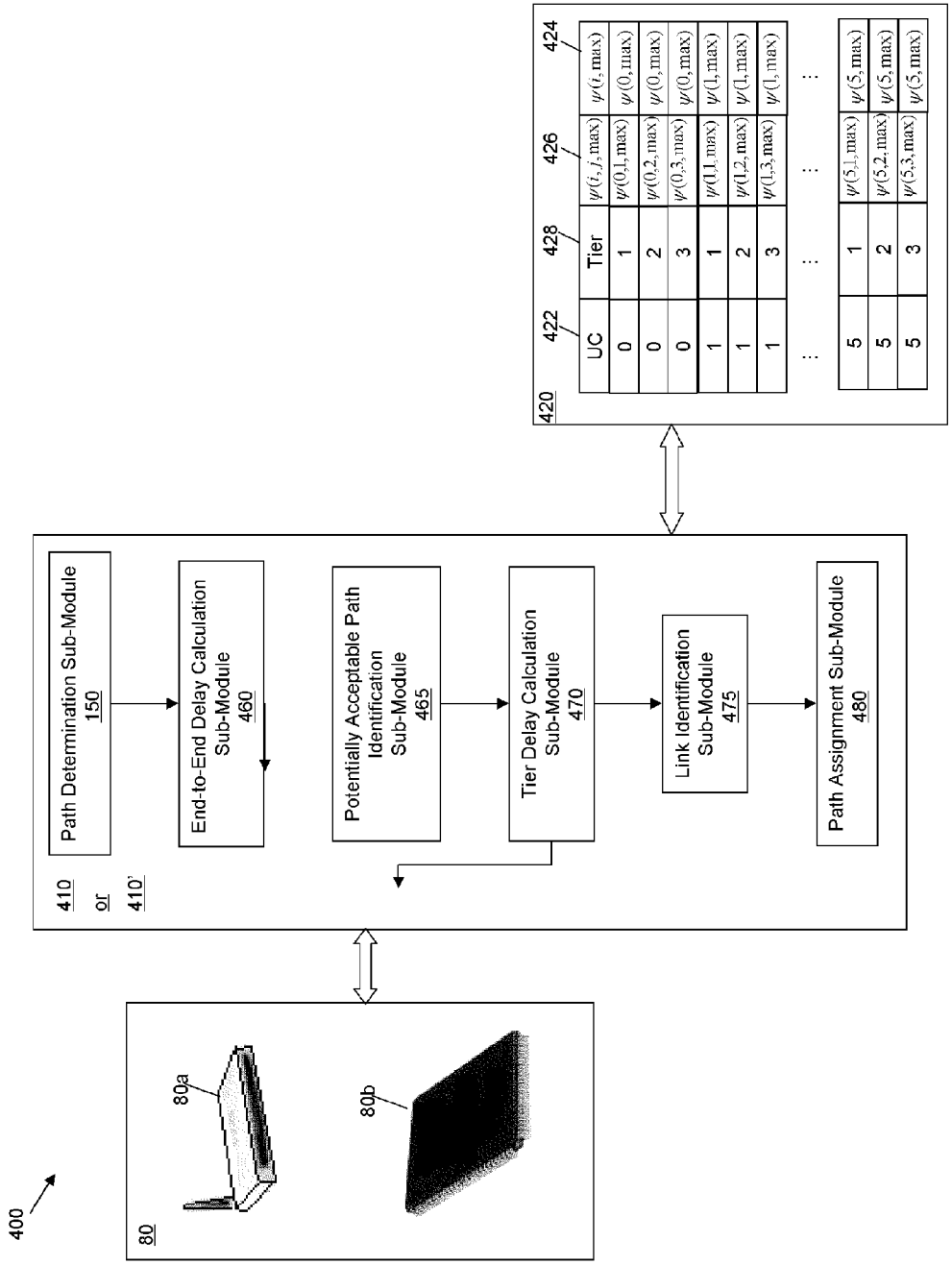
FIG. 17A is a schematic block diagram including a delay minimization module in accordance with an embodiment of the present invention.

FIG. 17A is a schematic block diagram of a wireless process control and/or automation network routing system 400 according to still another embodiment of the present invention. In general, the wireless process control and/or automation network routing system 400 includes a delay minimization module 410, a set of maximum allowable delay rules 420, e.g., in the form of a maximum allowable delay table incorporating maximum allowable tier delay values 426 for tiers j 428 in a given usage class i 422 and maximum allowable end-to-end delay values 424 for a given usage class i 422, and hardware 80 for executing the delay minimization module 410. In general, the delay minimization module 410 is executable by suitably interconnected hardware 80, such as one or more wireless gateway devices 80*a*, a separate computing device 80*b*, a combination of one or more wireless gateway devices 80*a* and a separate computing device 80*b*, or other known processing device. The tier delay minimization module 410 generally includes a path determination sub-module 150, an end-to-end delay calculation sub-module 460, a potentially acceptable path identification sub-module 465, a tier delay calculation sub-module 470, a link identification sub-module 475 and a path assignment sub-module 480.

Figure 17B:
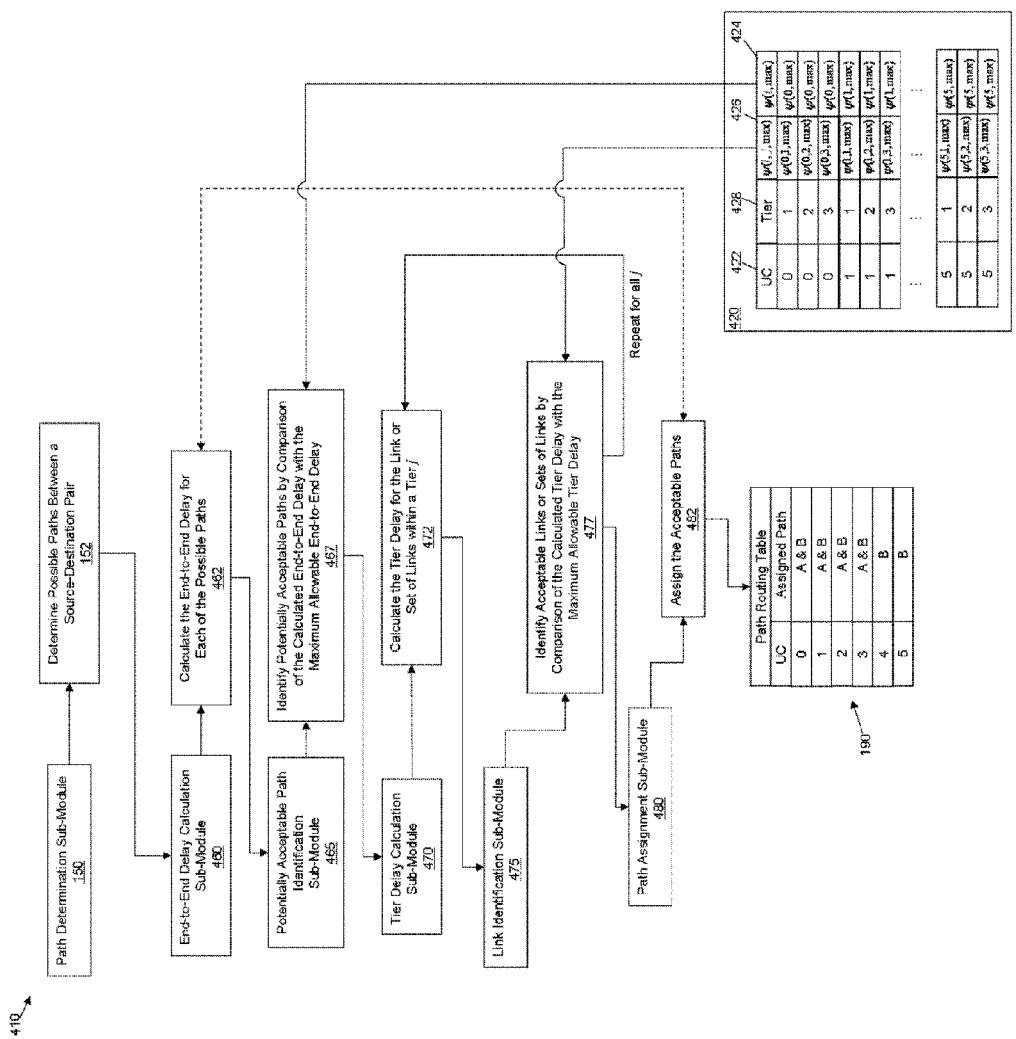
FIG. 17B is a flow chart of a method of assigning paths for operating the delay minimization module in accordance with the present invention.

Still referring to FIG. 17A, and also referring to FIG. 17B, the operation of an embodiment of the delay minimization module 410 is shown in more detail. While the steps of incorporating network statistics, and determining and employing the additional factors including reliability, throughput and total number of hops for the assignment of paths, are not specifically shown with respect to FIG. 17B for sake of clarity, one of skill in the art will appreciate based on the previous embodiments described herein that these additional steps can be incorporated in the module 410.

As shown in FIG. 17B, a path determination sub-module 150 determines at step 152 possible paths between a selected source-destination pair. This step 152 and module 150 operate, for instance, in the same manner as described above with respect to FIGS. 14A and 14B.

Next, the end-to-end delay calculation sub-module 460 calculates at step 462 the end-to-end delay for each of the possible paths determined in step 152. These calculations can be based upon network statistics (not shown in FIG. 17B), for instance, as discussed with respect to FIG. 15A (reference numeral 264). For instance, each transmitted frame includes a timestamp with the time at which frame processing commences at the source. When the frame is received by the destination, a receipt timestamp is incorporated, and the end-to-end delay can be calculated. This calculation accounts for all frame or packet processing time and transmission time at each node in the path.

In certain embodiments, for instance, as depicted in FIG. 15A (reference numeral 263), in addition to calculating the end-to-end delay of each of the possible paths at step 462, sub-module 460 or another sub-module performs an optional step in which the reliability, throughput, number of hops, or a combination of one or more of reliability, throughput and number of hops for each of the possible paths is determined or calculated. This determination or calculation can be used in identification of potentially acceptable paths as described below with respect to sub-module 465 and step 467 to designate one or more paths that meet multiple constraints.

Next, at step 467, the potentially acceptable path identification sub-module 465 identifies potentially acceptable paths by comparison of the calculated end-to-end delay determined at step 462 with the maximum allowable end-to-end delay specified in the set of delay rules 420 (column 424). The set of delay rules 420 includes, in certain embodiments, specified maximum allowable end-to-end delay 424 per usage class 422, denoted as $\psi(i,max)$. Paths are identified as potentially acceptable if Equation (9b) set forth above is satisfied.

In the method of the module 410, even though certain paths can be identified as potentially acceptable at step 467, these potentially acceptable paths will not be assigned to the routing table 190 if any one of the tier delays exceeds the maximum allowable tier delay $\psi(j,i,max)$. Therefore, the tier delay calculation sub-module 470 and link identification sub-module 475 are incorporated to ensure that the delay at each tier meets the constraints. In particular, the tier delay calculation sub-module 470 calculates at step 472 the tier delay for each of the links or set of links in tier j for the possible paths determined in step 152. These calculations can be based upon network statistics, for instance, as described with respect to FIG. 10 (reference numeral 364). For example, each transmitted frame includes a timestamp with the time at which frame processing commences at the source; when the frame is transmitted from the last node in the given tier, a transmission timestamp is incorporated, and the tier delay can be calculated based on all frame or packet processing time and transmission time at each node in the path in tier j.

In certain embodiments, in addition to calculating the tier delay of each of the possible paths at step 472, sub-module 470 or another sub-module performs an optional step in which the reliability, throughput, number of hops, or a combination of one or more of reliability, throughput and number of hops for each of the possible paths is determined or calculated, as described with respect to FIG. 16B (reference numeral 363).

Next, at step 477, the link identification sub-module 475 identifies acceptable links or sets of links by comparison of the calculated tier delay with the maximum allowable tier delay specified in the set of maximum allowable tier delay rules 420. A link or a set of links is identified as acceptable if Equation (9a) set forth above is satisfied. The steps 472 and 477 are repeated for each tier j within a path, or unless a calculated tier delay exceeds the maximum allowable tier delay, at which point the path is discarded.

Finally, after Equation (9a) is satisfied for all tiers within a given path, the path assignment sub-module 480 assigns at step 482 the acceptable paths to the routing table 190. In additional embodiments of the present invention, at step 482, the path assignment sub-module 480 also considers additional constraints in assigning paths to the path routing table 190, including reliability (e.g., following the module 110 described with respect to FIGS. 14A and 14B), throughput, number of hops, or a combination of one or more of reliability, throughput and number of hops, as indicated by step 383 in FIG. 16B.

In addition, in still further embodiments of the present invention, the path assignment step 482 is iterative, wherein, based upon network statistics related to one or more of determined reliability, calculated throughput, number of hops and calculated tier delay, certain paths are discarded and replaced with additional paths. The iterative nature of the delay module 410 allows the system and method to be adaptive to continuously maintain optimal network traffic flow, and is comprehended in FIG. 17B with a dashed connector between steps 462 and 482.

Figure 17C:
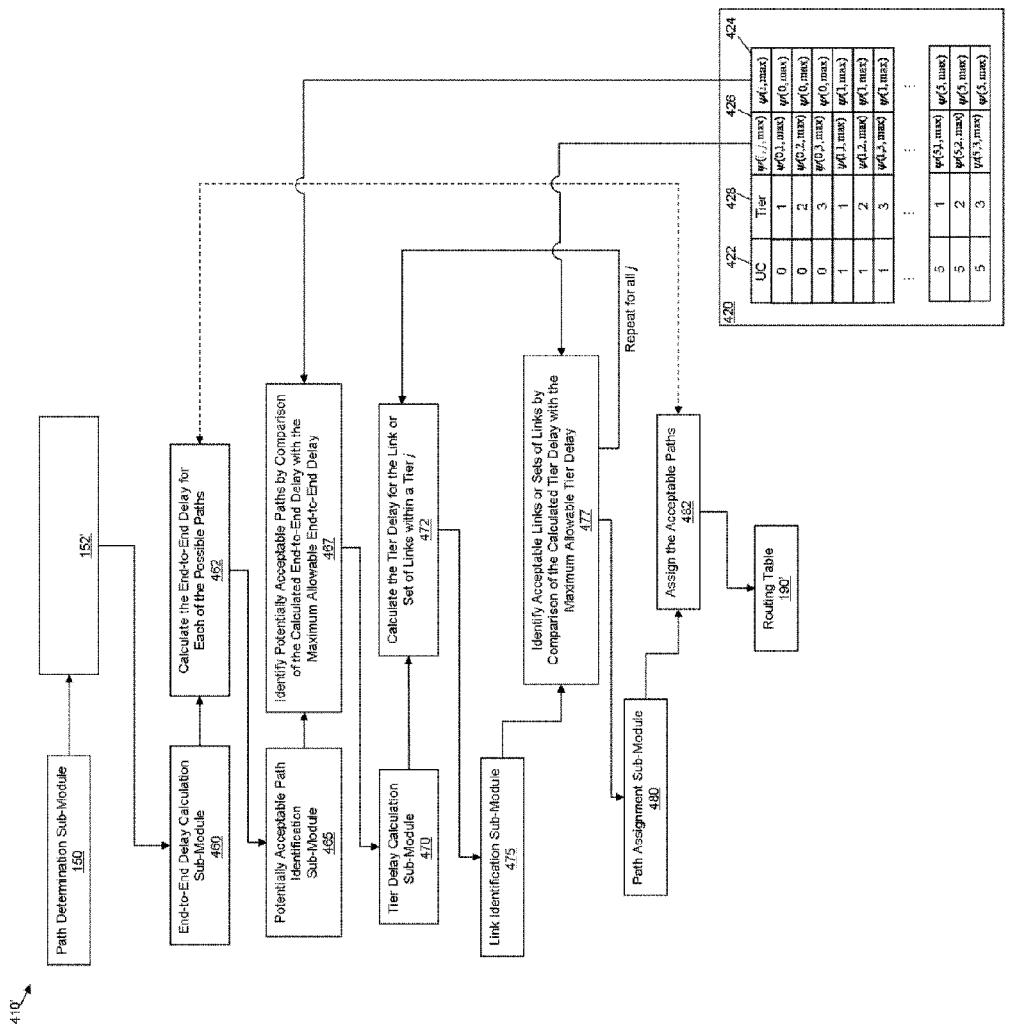
FIG. 17C is a flow chart of a method of assigning paths for operating the delay minimization module in a hybrid network including field network sets in accordance with the present invention.

FIG. 17C is a flow process diagram illustrating the operation of an embodiment of a delay minimization module 410' adapted to prepare a routing table 190' in a system including FNSs. A path determination sub-module 150 determines at step 152' possible paths between a selected source-destination pair. Step 152' includes the additional constraints (as compared to step 152 of tier delay minimization module 410) described with respect to the route optimization module 110', i.e., that the paths determination for each source-destination pair requires passage through the anchor packet selection device for N neighboring FNSs The result of execution of the tier delay minimization module 310' is the creation of the routing table 190' as shown in FIG. 14D or 15D.

In certain embodiments of the present invention, certain paths having wired connectivity are selected by the delay minimization module 410' as at least one of the assigned paths for a source-destination pair for a give usage class, presuming that such paths have a delay that is less than that of paths that are entirely or substantially wireless. If more than one hardwired path is available, they will both be used as assigned paths and/or alternative paths. In further embodiments, for each source-destination pair, at least one wireless path is selected as an assigned or alternate path in the event that a hardwired link to the CCR is disabled, due to an unexpected failure or an anticipated disconnection (e.g., for service or maintenance). Furthermore, if multiple paths are required to meet a usage class requirement, in preferred embodiments paths are selected for routing table 190' that pass through different FNSs.

In additional embodiments as discussed above, the maximum allowable throughput for a given link $\eta(L(x,y),max)$ is considered in the selection of the minimum number of independent paths $N_i^{opt}$ and/or the assignment of particular paths for a source-destination pair such that the following condition is satisfied:

$$\eta(L(x,y)) \leq \eta(L(x,y),max) \text{ for all } y \qquad (10).$$

In the event that the minimum number of independent paths $N_i^{opt}$ or the combination of the minimum number of independent paths $N_i^{opt}$ and the allowed number of alternative paths cannot be assigned, one or more of the following can be implemented until the constraints are met: (1) add another path, e.g., a set of WED, WID, MWID, MWID-JB, WGD, MWGD and/or MWGD-JB, to boost reliability, throughput or minimize delay; (2) improve the reliability of the weakest link through redundancy; and/or (3) use other RF channels and/or hopping patterns.

In still further embodiments of the present invention, based on the traffic distribution and throughput, the number of channels per selected paths is determined to ensure that the maximum allowable tier delay $\psi(i,j,max)$ and $\psi(L(x,y), max)$ are both satisfied. Paths with $\psi(i,j,x)$ that exceed the maximum allowable tier delay $\psi(i,j,max)$ or the end-to-end $\psi(i,max)$ will either (1) be replaced with other paths, or (2) amended with multiple channels per path, in order to meet process control system usage class requirements.

In accordance with conventional data frame architecture that is well known to those skilled in the art, each frame is supplied with a digit indicating whether it is an original transmission or a retransmitted frame. In accordance with certain embodiments of the present invention, the conventional data frame architecture is modified to reflecting its usage class level. A usage class digit (UCD) is added in the routing table for each source-destination pair to be utilized during the routing of a frame. This UCD is utilized in data frame transmission so that frames are dropped if the frame usage class is greater than the UCD. That is, the system will route a frame only when the frame usage class is less than or equal to the UCD. In certain embodiments, for retransmitted frames, the process will allow passing the retried frames through the assigned and alternate paths irrespective of the UCD.

Table 3 below is a partial representation of a routing table between certain pairs of WIDs and WGDs, MWIDs and MWGDs, WIDs and MWGDs, or MWIDs and WGDs, which includes an indication of a UCD for the depicted pairs. Note that the pairs can be direct links or links with intermediate hops. For example, path 1 is a path between source address 4E22 and destination address 22A4, and is an assigned path for frames with a UCD of 3, whereby an initially transmitted frame with usage class 0, 1, 2 or 3 will be passed, but an initially transmitted frame with a usage class of 4 or 5 will not be passed. Path 2 is an alternative path between the same source-destination pair with a UCD of 5 or lower, whereby retransmitted frames of all classes will be passed through the path. Path 3 is an alternate path between the 4B78 and 22A4 source-destination address pair for all usage classes, i.e., all retransmitted frames will pass. Path 4 is an assigned path between 4E22 and 22D9 for all usage classes. Path 5 is an alternate path between 4EAA and 22D9 for class 0, 1 and 2 only.

TABLE 3

(Part of the) Routing table

| Path | Source Address WID/MWID | Dest. Address WGD/MWGD | UCD | Path Type |
|---|---|---|---|---|
| 1 | 4E22 | 22A4 | 3 | AS |
| 2 | 4E22 | 22A4 | 5 | AL |
| 3 | 4B78 | 22A4 | 5 | AL |
| 4 | 4E22 | 22D9 | 5 | AS |
| 5 | 4EAA | 22D9 | 2 | AL |
| — | — | — | — | — |

AS = Assigned Path
AL = Alternate Path

The method and system of the present invention includes dynamic adjustment of routing to allow assigned and alternative paths to pass traffic irrespective of the usage class when either of the following events occur: (a) when a timeout occurs, either due to a violation of the maximum allowable delay (tier and/or end-to-end) or because an acknowledge message is not received, the assigned and alternate paths for the source-destination pair (where the timeout occurs) will allow all frames to pass irrespective of the usage class; (b) when the frame error probability for a link within an assigned path exceeds a specified threshold, all source-destination pairs with an assigned path through this link allows the assigned and alternate paths to pass all traffic. A message for adjustment of the routing table 190 or 190' can be initiated by the master WGD and/or the device that executed the route optimization module 110. The adjustment of the routing table can be effective for a preset time duration, or until a second message is received requesting reversion to normal routing settings.

In additional embodiments of the present invention, a combination of the above-described constraints is implemented to optimize and select routes for a wireless process control and/or automation network. For each particular pair of source and destination, $N_P$ is minimized such that Equation (8) is satisfied for all i, with the additional conditions that Equations (2), (6), (9a) and (10) are satisfied. If any of Equations (8), (2), (6), (9a) and (10) are not satisfied, than:
 a. another path, i.e., a set of WED, WID, MWID, MWID-JB, WGD, MWGD and/or MWGD-JB, can be added to boost reliability, throughput or minimize delay;
 b. the reliability of the weakest link can be improved through redundancy;
 c. other radio frequency channels and/or hopping patterns can be used; or
 d. any combination of (a), (b) and (c) can be implemented.

The process is repeated for each source-destination pair in the wireless process control and/or automation network, or each source-destination pair in the wireless process control and/or automation network for which optimization according to the present invention is desired.

The above route optimization module described with respect to FIGS. 14A-14C, optionally including the additional steps or sub-modules, can be implemented with respect to the entire network or certain source-destination pairs. In embodiments in which the path optimization process is implemented for the entire network, the above process, optionally including the additional steps or embodiments, is repeated for each source-destination pair in the system. In embodiments in which the path optimization process is implemented for certain selected source-destination pairs, the above process, optionally including the additional steps or embodiments, is repeated for the source-destination pairs to be optimized. To prevent channel congestion with respect to pairs that are not optimized, routing rules can be implemented that prioritize the selected source-destination pairs through the assigned paths, or through the assigned paths and alternate paths in embodiments in which alternate paths are provided. In further embodiments, the assigned paths, or the assigned paths and alternate paths in embodiments in which alternate paths are provided, can be reserved exclusively for the source-destination pairs selected for optimization according to the method and system of the present invention.

In accordance with the present invention, once the routing table is established that assigns a minimum number of reliable paths, and in certain embodiments alternate paths, between a source-destination pair for a given usage class, frames for retransmission are selected based on the routing table. When a packet is transmitted from a particular source within a given usage class, when this packet reaches any device, e.g., WID, WGD, MWID or MWGD in the network, the following decisions will be made for appropriate retransmission:

If the device is within the assigned paths for a particular source and destination pair usage class, this packet will be transmitted to the next device(s) in the path(s);

If this device is within the alternative paths for a particular source and destination pair usage class and there are no exceptions, this packet will be dropped (i.e. will not be transmitted to the next device(s) in the path(s));

If this device is not within the assigned/alternative paths for a particular source and destination pair usage class, this packet will be dropped (i.e. will not be transmitted to the next device(s) in the path(s)).

Figure 18:
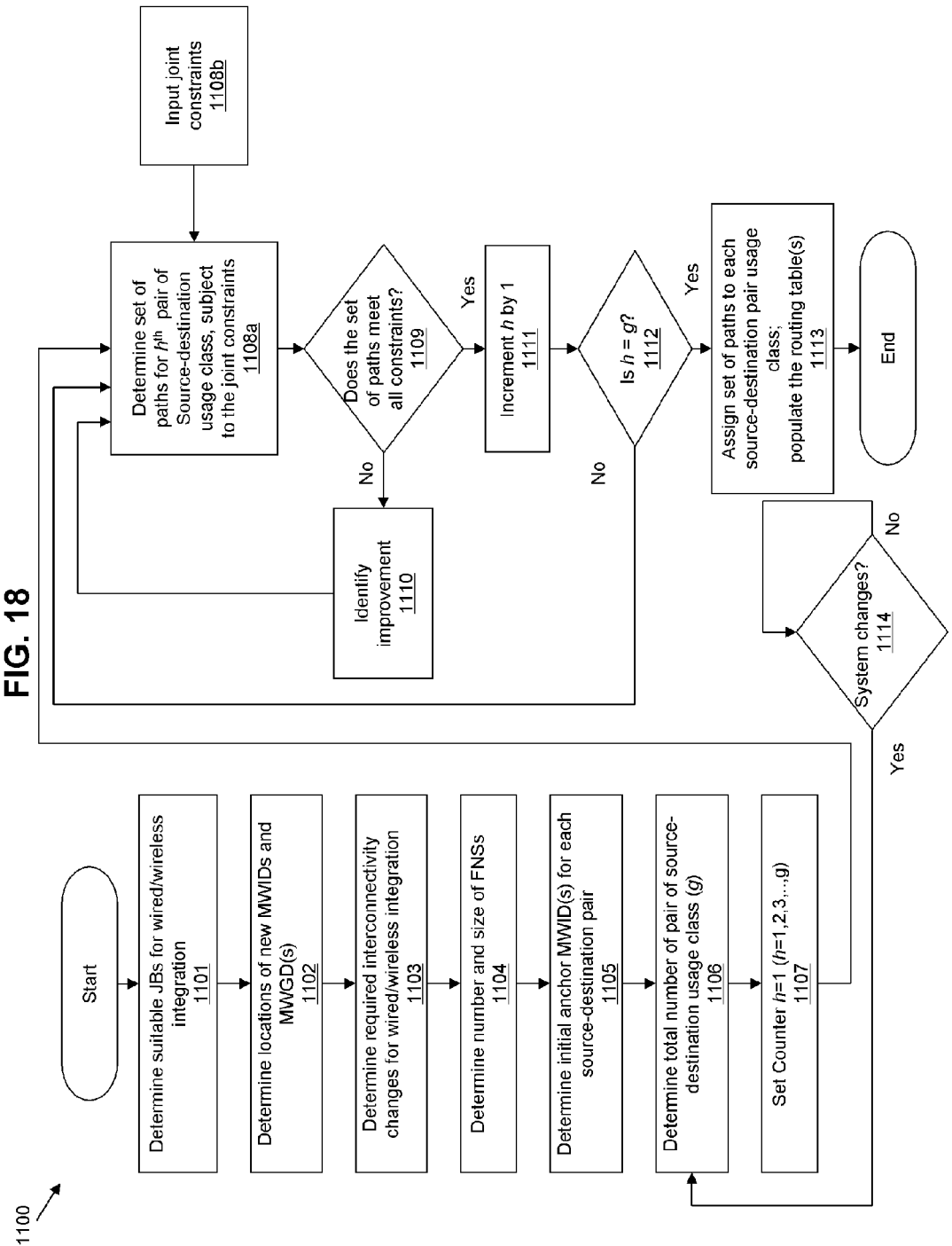
FIG. 18 is a flow chart of an overview of a method of defining field network sets and assigning paths for source-destination pairs per usage class.

Referring to FIG. 18, an overview 1100 of steps involved in executing the hybrid system including integrating existing JBs, incorporating new MWID(s) and MWGD(s), defining the FNS(s), and setting the anchor packet selection device for each FNS is shown. The steps are carried out generally in accordance with the specific modules described herein.

Suitable JBs are determined at step 1101 for wired/wireless integration. The locations of new MWID(s) and MWGD(s) is determined at step 1102. Required interconnectivity changes are determined for wired/wireless integration at step 1103. The number and size of FNS(s) are determined at step 1104. The initial anchor MWID(s) or MWGD(s) for each source-destination pair is determined at step 1105. The total number of paths for a source-destination pairs per usage class g is determined at step 1106. A counter h is set at step 1107. At step 1108a, a set of paths is determined for the $h^{th}$ source-destination pair per usage class, subject to the joint constraints inputted at step 1108b, including maximum tier delay, maximum end-to-end delay, maximum throughput, minimum link reliability level, required minimum reliability per usage class, MWID CPU maximum usage level, and the maximum number of links per path. At query step 1009, it is determined whether the set of paths meet all of the constraints. If not, improvements are identified at step 1110, including adding additional MWID(s) and/or MWGD(s), RF engineering, adding additional FNS(s), or upgrading equipment. If the constraints are met in query step 1009, h is incremented by 1. At query step 1112, it is determined whether h=g. If not, the process returns to step 1108a. If query step 1112 determines that h=g, at step 1113, the set of paths is assigned for the source-destination pair per usage class, and the routing table is populated. The process repeats for each source-destination pair per usage class. At query step 1114, which can be continuous or interim, it is determined whether there is any change in traffic loading, traffic distribution, or performance level, whether there is external interference, or whether there are hardware additions. If so, the process returns to step 1106.

Figure 19:
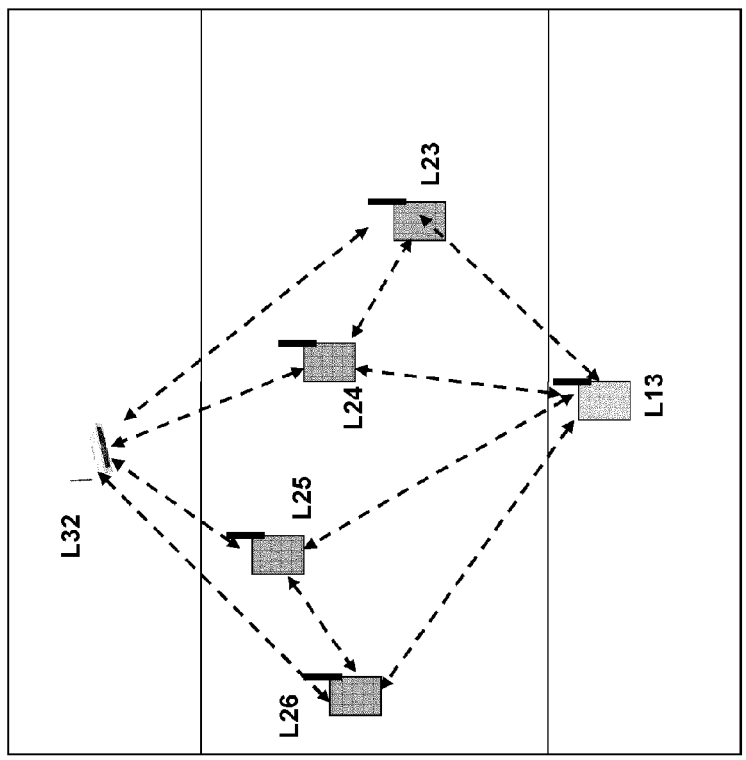
FIG. 19 is a schematic diagram of a portion of a wireless process control and/or automation network architecture depicting a set of source-destination pair components.

For the purpose of demonstrating a wireless process control system using the optimization process and system of the present invention, reference is made to the portion of an ISA-SP100 network shown in FIG. 19. The portion depicted includes a single source-destination pair with multiple paths. Each wireless link has a maximum capacity of 250 kbps, and an effective achievable throughput of 100 kbps, since the maximum achievable throughput is typically in the range of 40% of link capacity for CSMA-CA protocols and the like. The links' frame error rate profiles are given in Table 4, which also provides the existing levels of throughput per link. The process control equipment at WID L13 is assumed to generate 60 kbps when commissioned to the network, where 40 kbps is the traffic going to the CCR (uplink) and 20 kbps is the traffic coming from the CCR to L13 (downlink).

Frame retransmission rates are assumed to be below 1% for all classes of service. It should be noted that these FER values will depend on the specifics of the underlying physical layer, e.g., type of digital modulation and error control coding, radio channel path loss and fading, co-channel interference, etc. For illustration, typical FER values are assumed.

In Table 5, the required FERs per class are listed, and a typical traffic mix across the different classes of service is represented by the percentage of frames belonging to Class 0, 1, 2, 3, 4 and 5. In addition, assumed limits for total end-to-end delay and per-tier delay are specified. In general, delay values will be related to the traffic loading and queuing/priority mechanisms. Actual delay values per link can be obtained empirically from message timestamps. Depending on the number of hops that a given frame has to make, the accrued delay can be computed, which are accounted for in the optimization system and method of the present invention to provide a certain end-to-end delay.

Applying the given data into the process simulation model, the paths' frame error probabilities are calculated as shown in Table 6. The frame error probabilities when transmitting frames over multiple independent paths are then calculated as in Table 7. Based on the optimized routing method and system of the present invention, the assigned and alternating paths are given in Table 8. For the purpose of the present example, no more than 2 paths are assigned.

Table 9 provides the resulting links' throughputs following the path assignment of Table 8. Since the throughput of L26-L32 exceeds 100 kbps, a second RF channel is provided to support this traffic.

TABLE 6

| Path | Path Designation | $\Phi(L(x, y))$ |
|---|---|---|
| L13-L23-L32 | A | 5.10E−04 |
| L13-L24-L32 | B | 6.00E−06 |
| L13-L25-L32 | C | 5.00E−04 |
| L13-L26-L32 | D | 5.00E−03 |

TABLE 7

| Associated FER with Selected Paths | |
|---|---|
| x | $\Phi(x)$ |
| A | 5.10E−04 |
| B | 6.00E−06 |
| C | 5.00E−04 |
| D | 5.00E−03 |
| A & B | 3.06E−09 |
| A & C | 2.55E−07 |
| A & D | 2.55E−06 |
| B & C | 3.00E−09 |
| B & D | 3.00E−08 |
| C & D | 2.50E−06 |
| A & B & C | 1.53E−12 |
| A & B & D | 1.53E−11 |
| B & C & D | 1.50E−11 |
| A & B & C & D | 7.66E−15 |

TABLE 4

| Source | Destination | Link FER | $\eta(L(x, y))$ (kbps) |
|---|---|---|---|
| L13 | L23 | 1.00E−05 | 0 |
| L13 | L24 | 1.00E−06 | 0 |
| L13 | L25 | 5.00E−07 | 0 |
| L13 | L26 | 1.00E−07 | 0 |
| L23 | L32 | 5.00E−04 | 60 |
| L24 | L32 | 5.00E−06 | 30 |
| L25 | L32 | 5.00E−04 | 70 |
| L26 | L32 | 5.00E−03 | 90 |

TABLE 8

| Class | Assigned path | Alternate path |
|---|---|---|
| 0 | A & B | C & D |
| 1 | A & B | C & D |
| 2 | A & B | C & D |
| 3 | A & B | C & D |
| 4 | B | A & C |
| 5 | B | A & C |

TABLE 5

| Class | Maximum Allowable FER $\Phi_c(i)$ | Traffic Mix $D_i$ | End-to-End $\psi(i, max)$ | Tier 1 $\psi(i, 1, max)$ | Tier 2 $\psi(i, 2, max)$ | Tier 3 $\psi(i, 3, max)$ |
|---|---|---|---|---|---|---|
| 0 | 1.00E−08 | 0% | 0.3 sec | 0.1 sec | 0.1 sec | 0.1 sec |
| 1 | 1.00E−08 | 8% | 0.5 sec | 0.2 sec | 0.2 sec | 0.1 sec |
| 2 | 1.00E−07 | 10% | 0.5 sec | 0.2 sec | 0.2 sec | 0.1 sec |
| 3 | 1.00E−06 | 12% | 1 sec | 0.4 sec | 0.3 sec | 0.3 sec |
| 4 | 1.00E−05 | 35% | 5 sec | 2 sec | 2 sec | 1 sec |
| 5 | 1.00E−05 | 35% | 5 sec | 2 sec | 2 sec | 1 sec |

TABLE 9

Link Throughput

| Source | Destination | Throughput (kbps) |
|---|---|---|
| L13 | L23 | 46 |
| L13 | L24 | 60 |
| L13 | L25 | 40 |
| L13 | L25 | 40 |
| L23 | L32 | 92 |
| L24 | L32 | 90 |
| L25 | L32 | 90 |
| L26 | L32 | 110 |

The "normalized" spectrum usage (counted per RF channel use) can be estimated by taking into account the total number of RF channel occupancies for the end-to-end connection. This can be calculated as follows:

$$U = \sum_i D_i N_i \tag{11}$$

where $D_i$ represents the traffic distribution percentage for class i, and $N_i$ is the number RF channels occupied per class. This expression applies to the standard (i.e., non-optimized) operation procedure. However, with the optimization algorithm of this invention, the normalized spectrum usage becomes:

$$U = \sum_i D_i N_i^{opt} + P_{ret} \sum_i D_i (N_i^{opt} + 2) \tag{12}$$

where $P_{ret}$ is the average retransmitted probability in the system. By applying these formulas for the specific parameters used in this example, under standard non-optimized operation the following result for spectrum utilization is attained:

$U=1+4*(0\%+8\%+10\%+12\%+35\%+35\%)=5$, since there is one RF transmission from L13 to a WID, and four separate RF transmissions going from WID to WGD. On the other hand, the normalized spectrum usage is obtained as follows for the case of the process optimization of this invention:

$U=[1+2*(8\%+10\%+12\%)+1*(35\%+35\%)]+0.01*4$
$[(8\%+10\%+12\%)+3*(35\%+35\%)]=2.4$ where 1% retransmission probability is assumed.

The ratio of 5/2.4≅2 indicates that double the spectrum would be required if the process optimization of this invention is not followed. Notably, these savings in spectrum consumption do not preclude meeting the minimum usage class requirements.

Figure 20A:
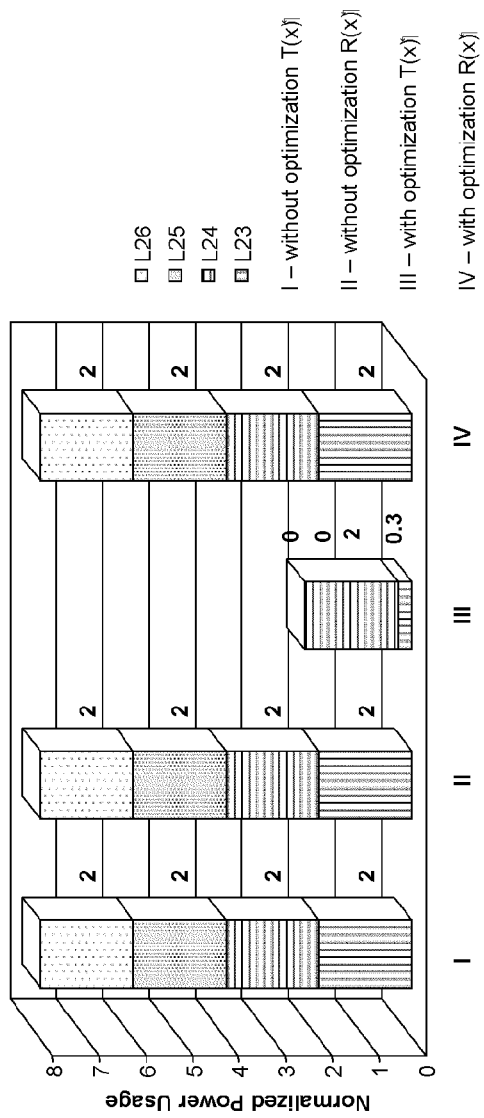
FIG. 20A is a chart of normalized power usage comparison for wireless intermediate devices using the system and method of the present invention compared to prior art methods.
Figure 20B:
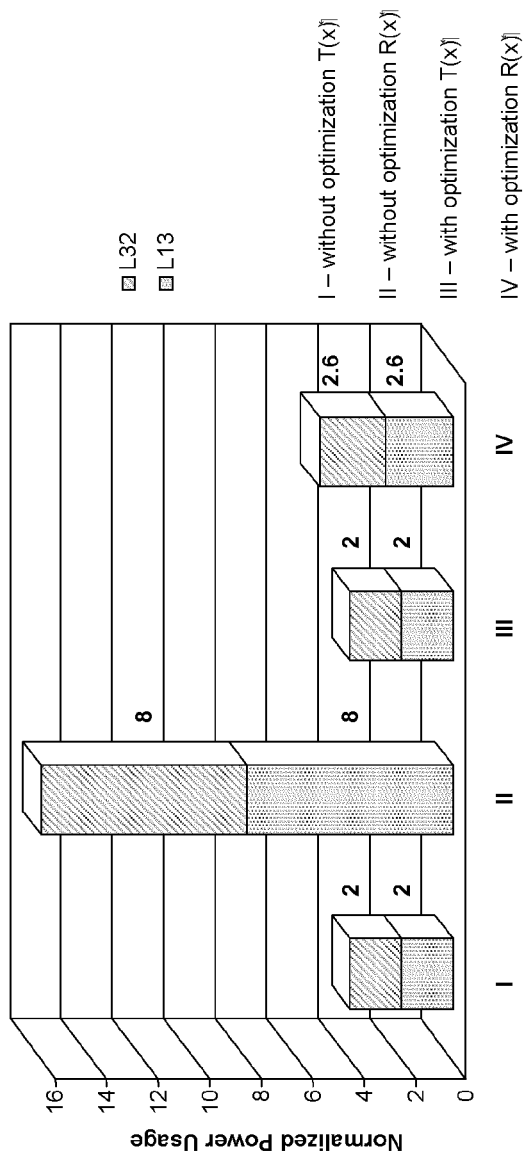
FIG. 20B is a chart of normalized power usage comparison for wireless end devices and wireless gateway devices using the system and method of the present invention compared to methods of the prior art.

This optimization procedure can also significantly reduce power consumption for the nodes. Battery power usage is directly proportional to the number of transmitted and received frames, and is not significantly impacted by other processing activities such as encryption, authentication, heartbeat signal, and the like. FIGS. 20A and 20B show the normalized power usage (which is proportional to the number of frames transmitted and received) from L13 to L32, with and without the optimization scheme. Note that for the purpose of FIGS. 20A and 20B, a single transmission consists of a frame sent from L13 to L32 and the acknowledgement frames sent from L32 to L13.

FIG. 20A indicates that the number of received frames for the four WIDs remains the same with and without the optimization scheme, whereas the number of transmitted frames drops from 8 to 2.3 frames when the optimization scheme is implemented. FIG. 20B demonstrates that the number of frames received by the WED and WGD drop from 8 to 2.6 for a single transmission, while the number of transmitted frames remain unchanged. Thus, the implementation of the optimization scheme extends battery lifecycle by 55% (16/10.3) for WIDs, and by 117% (10/4.6) for WEDs.

Figure 21B:
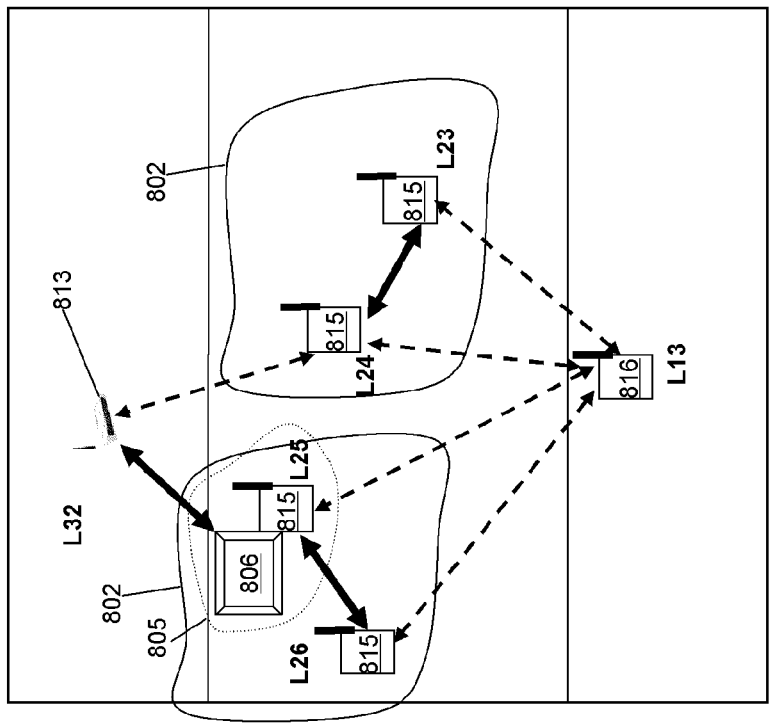
FIGS. 21A and 21B are schematic diagrams of a portion of a hybrid wired/wireless process control and/or automation network architecture depicting a set of source-destination pair components and associated field network sets according to certain embodiments of the present invention.
Figure 21A:
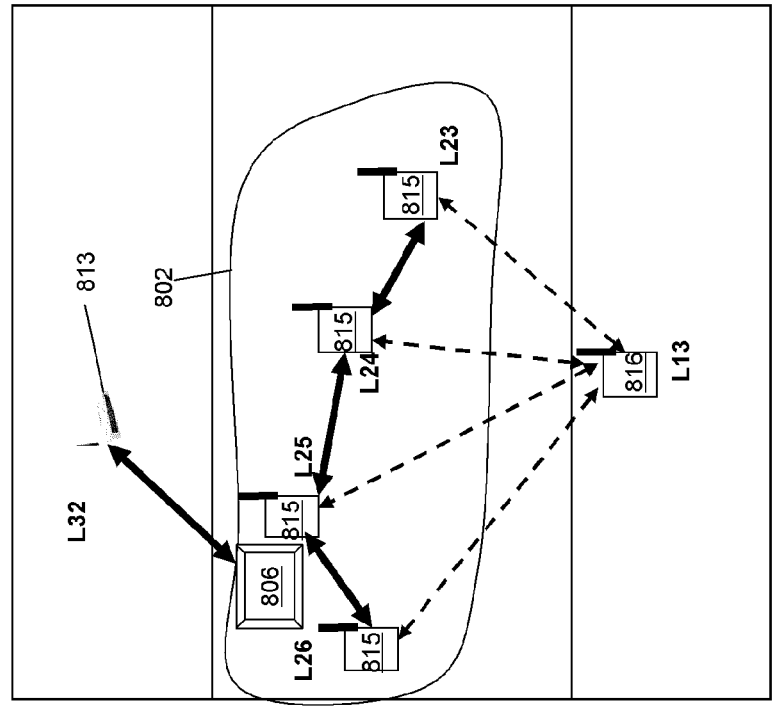

FIGS. 21A and 21B are schematic explanatory diagrams of two possible configurations of FNSs 820. Segmenting the wireless network into excessive FNSs will not yield a high performance gain, while segmenting the plant wireless network into too few FNSs will result in decrease in path redundancy, thus in the event of a point of failure, a reduction of packet reliability/availability can occur.

The selection of the FNS members and size is dynamic. When one or more new devices (e.g., field end devices, having wired or wireless connectivity, WIDs, MWIDs, WGD and/or MWGDs) are added, devices are rearranged, or devices are removed, the FNSs size and/or number is dynamically altered if necessary to achieve the requisite packet routing and/or path requirement constraints. An FNS architecture module is executed or re-executed to account for the removed, added or rearranged devices. For instance, an FNS that encompasses and borders additional or rearranged devices affects the size of the FNS, e.g., the FNS becomes larger, or requires dividing the FNS into multiple FNSs. Accordingly, the selection of the FNS members and size includes (but is not necessarily limited to) the following considerations:

geographical area/plant environment;
maximum allowable delay;
whether one or more devices, including field end devices, having wired or wireless connectivity, WIDs, MWIDs, WGD and/or MWGDs, are added, subtracted or rearranged;
network loading (e.g., the number of destination-source pairs);
diversity requirements (support of multiple paths) to meet reliability requirements; and
availability of redundant links to the CCR.

Given the above factors, a practical FNS size limit can be provisioned as follows:

with 1 MWID-JB connection to a MWGD-JB, the number of MWID within an FNS can be between 1 to 5;
with 2 MWID-JB connections to a MWGD-JB, the number of MWID within an FNS can be between 1 to 10;
with 1 MWID-JB connection to the master WGD or directly to CCR, the number of MWID within an FNS can be between 1 to 5; and
with 2 MWID-JB connections to the master WGD or directly to CCR, the number of MWID within an FNS can be between 1 to 10.

In addition, within an FNS, a MWID is preferably selected as being the interface for wired connectivity to the CCR, e.g., as a member of an MWID-JB set. Considerations include physical proximity to the CCR, minimizing the number of transmissions within the FNS is achieved, and whether a JB exists in the plant that is proximate to that particular MWID candidate. Similar considerations are used in selecting the interface for an FNS in the WGD tier.

For a particular source-destination pair, one particular MWID within an FNS is tagged as the anchor packet selection device for all transmitted packets from a particular source. The one packet with the highest quality index is selected by the anchor forwarded, potentially over multiple links or paths, through the MWID-JB and then through MWGD to the Master Gateway then to CCR.

The method of selecting the anchor MWID to perform the selecting function for a particular source-destination pair includes: A) selecting the nearest FNS to the source (nearest to the WID or MWID in the FNS); B) selecting the MWID-JB as the anchor packet selection MWID, and if that MWID-JB's CPU is fully loaded, then selecting the MWID within the center of FNS; C) if the selected MWID within the center of FNS is fully loaded, in terms of path throughput or packet selection functions, then selecting the nearest to center MWID, and so forth; D) if all MWIDs within an FNS are fully loaded, then selecting a different FNS; E) if a second path is needed of if a second FNS is required for that particular source-destination pair, then repeat steps A-D for selecting the anchor MWID for the second FNS. When we have two FNSs are required for a particular source-destination pair, anchor MWIDs are need in each FNS.

In the forward direction, for a particular source-destination pair, one particular MWID within an FNS is tagged as the anchor packet selection device for all transmitted packets from a particular source, and the one packet with the highest quality index is selected and forwarded (potentially over multiple links or paths) through the MWID-JB, through MWGD to the Master Gateway, and ultimately to CCR. The selected packet will be forwarded and erroneous packets will be discarded at an early stage. This is in contrast to prior art techniques, in which erroneous packet(s) continue to propagate into the network (ineffectively utilizing the network resources, such as energy, spectrum, CPU power, and the like) and are dropped at master WGD, or multiple copies of the packet are unnecessarily propagated through the network to reach the destination (whereby the destination must determine which packet is to be used).

In the reverse direction, the anchor MWID within an FNS source-destination pair receives the packet from the CCR. Possible sequences of packet transmission from CCR to WED include (but are not limited to):

CCR to the master WGD to a MWGD-JB to a MWGD to a MWID to a MWID to the field device (WED);

CCR to the master WGD to a MWGD to a MWID-JB to a MWID to the field device (WED), CCR to the master WGD to a MWGD-JB to a MWGD to a MWID-JB to a MWID to a WID to the field device (WED), or CCR to the master WGD to a MWGD-JB to a MWID to the field device (WED).

The above sequences can be reversed to obtain the sequence of transmission from the WED to the CCR.

If a packet belongs to particular source-destination pair and proceeds through two different FNSs, each set will have an anchor packet selection MWID for that pair source and destination. In addition, an anchor MWGD or MWGD-JB is used to provide the selection between the two received packets from MWID sets.

Two concurrent schemes can be used to select the packet with the highest quality. A low density parity check (LDPC) can be implemented to verify the quality of each packet, and majority logic combining can also be used. As an example, of packet selection, if two packets are received from different paths with different quality checks, the one with highest quality check is selected. If three packets are received from different paths but two are exactly in terms of information bits and/or parity check, one of these two packets will be selected.

The packet selection function for an FNS will be distributed (load balanced) among the various MWIDs within a given FNS to handle all pairs of source-destination paths. This can be implemented automatically through the master WGD (e.g., using an operation similar to the path selection sub-module 150) or determined manually by a plant operator.

The method and system of the present invention have been described above and in the attached drawings; however, modifications will be apparent to those of ordinary skill in the art and the scope of protection for the invention is to be defined by the claims that follow. In addition, while certain implementations of the present invention have been described with respect to the ISA-SP100 protocol, the present invention can also be implemented within other wireless process control and/or automation protocols including but not limited to the HART® protocol.

We claim:

1. A process control and/or automation network carrying source-destination traffic for a commercial or industrial processing facility, the network comprising:
   a distributed control system in a central control room within the facility;
   a first tier comprising a plurality of wireless end devices receiving instructions from and/or providing data to the distributed control system, the instructions and/or data in the form of packets, each wireless end device being associated with one or more meters, remote terminal units, diagnostic devices, pumps, valves, sensors, or tank level measuring devices;
   a second tier comprising a plurality of wireless routers each including a memory that stores a routing table and a processor that routes packets;
   a third tier comprising a master wireless gateway device operably connected to receive packets from and transmit packets to the distributed control system; and
   a plurality of field network sets each containing one or more of the plurality of wireless routers or one or more wireless gateway devices, wherein at least one of the wireless routers or wireless gateway devices in each field network set serves as an anchor packet selection device, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device;
   wherein the processor of each of the plurality of wireless routers routes packets across the three tiers between the plurality of end devices and the wireless gateway devices based on the stored routing table.

2. The process control and/or automation network as in claim 1, further comprising at least one marshalling cabinet and at least one junction box, the at least one junction box within one of the field network sets and wired to the marshalling cabinet for communication.

3. The process control and/or automation network as in claim 2, further comprising a junction box router in wired communication between the junction box and the marshalling cabinet and in wired communication with the master gateway device.

4. The process control and/or automation network as in claim 3, wherein a wireless router in the field network set containing the junction box is configured for wired communication and is wired to the junction box.

5. The process control and/or automation network as in claim 3, wherein the wireless router that is wired to the junction box is a wireless intermediate device.

6. The process control and/or automation network as in claim 3, wherein the wireless router that is wired to the junction box is a wireless gateway device.

7. The process control and/or automation network as in claim 1, wherein the routing table stored in memory of the wireless router specifies, for each wireless end device, a predetermined number of assigned paths from the wireless end device to the master gateway device per usage class, the wireless router further storing a frame selection module executable by the processor of the wireless router that, upon receipt of a packet to or from a wireless end device, permits transmission of the packet along the assigned path if the router is within that particular assigned path, or drops the packet if the wireless router is not in the assigned path.

8. The process control and/or automation network as in claim 1, wherein the routing table stored in memory of the wireless router specifies, for each wireless end device, a predetermined number of assigned and alternate paths from the wireless end device to the master gateway device per usage class;
the wireless router further storing a frame selection module executable by the processor of the wireless router that, upon receipt of a packet to or from a wireless end device,
permits transmission of the packet along the assigned path if the router is within that particular assigned path, or
permits transmission of the packet along the alternate path if the router is within that particular alternate path and there exists an exception in the network that requires use of the alternate path, or
drops the packet if the wireless router is not in the assigned or alternate path.

9. The process control and/or automation network as claim 1, wherein at least one of the field network sets has at least one junction box,
and wherein at least one of the wireless routers is configured for wired communication and wired to a junction box,
and wherein one of the wireless routers that is wired to a junction box is designated as an anchor packet selection device through which all traffic in that field network set is routed.

10. The process control and/or automation network as in claim 9,
wherein the routing table stored in memory of the wireless router specifies, for each wireless end device, a predetermined number of assigned paths from the wireless end device to the master gateway device per usage class, the wireless router further storing a frame selection module executable by the processor of the wireless router that, upon receipt of a packet to or from a wireless end device, permits transmission of the packet along the assigned path if the router is within that particular assigned path, or drops the packet if the wireless router is not in the assigned path;
wherein the anchor packet selection device of each network set and for each tier further includes a packet selection module executable by the processor of the anchor packet selection device to select a packet among plural packets of the same information with the highest quality for retransmission;
and wherein the frame selection module receives the best packet from the packet selection module and transmits at least one copy of the best packet in the assigned paths toward the destination or the next tier.

11. The process control and/or automation network as in claim 10, wherein the packet selection module implements a low density parity check.

12. The process control and/or automation network as in claim 10, wherein the packet selection module implements a load balancing protocol to distribute traffic among various wireless routers in the field network set.

13. The process control and/or automation network as in claim 10, wherein the packet selection module implements
a low density parity check and
a load balancing protocol to distribute traffic among various wireless routers in the field network set.

14. The process control and/or automation network as in claim 1, wherein at least some of the wireless routers in a field network set include a wireless router wired to a junction box which contain stored in their memories field network set information as to which wireless routers are wired to junction boxes and their respective performance characteristics, the wireless routers having field network set information further comprising a routing module that uses the field network set information to dynamically route packets within the field network set.

15. The process control and/or automation network as in claim 1, wherein at least some of the wireless routers in a field network set include a wireless router wired to a junction box, wherein field network sets including a wireless router wired to a junction box are wired to the central control room.

16. The process control and/or automation network as in claim 15, wherein the field network sets including a wireless router wired to a junction box include a designated junction box that is wired to the distributed control system in the central control room.

17. The process control and/or automation network as in claim 15, wherein the wired connection is through a marshalling cabinet.

18. The process control and/or automation network as in claim 15, wherein the wired connection is through a junction box router.

19. A process control and/or automation network carrying source-destination traffic for a commercial or industrial processing facility, the network comprising:
a distributed control system in a central control room within the facility;
a first tier comprising a plurality of wireless end devices receiving instructions from and/or providing data to the distributed control system, the instructions and/or data in the form of packets, each wireless end device being associated with one or more meters, remote terminal units, diagnostic devices, pumps, valves, sensors, or tank level measuring devices;
a second tier comprising a plurality of wireless routers each including a memory that stores a routing table and a processor that routes packets;
a third tier comprising a master wireless gateway device operably connected to receive packets from and transmit packets to the distributed control system; and
a plurality of field network sets spanning across multiple tiers, each field network set containing one or more of the plurality of wireless routers and one or more wireless gateway devices, wherein the routers and gateway devices of each field network set act as a single routing device to route packets to routers and gateway devices external to the field network set, wherein at least one of the wireless routers or wireless gateway devices in each field network set serves as an anchor packet selection device, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device;

wherein the processor of each of the plurality of wireless routers routes packets across the three tiers between the plurality of end devices and the wireless gateway devices based on the stored routing table.

20. The process control and/or automation network as in claim 19, further comprising at least one marshalling cabinet and at least one junction box, the at least one junction box within one of the field network sets and wired to the marshalling cabinet for communication.

21. The process control and/or automation network as in claim 20, further comprising a junction box router in wired communication between the junction box and the marshalling cabinet and in wired communication with the master gateway device.

22. The process control and/or automation network as in claim 21, wherein a wireless router in the field network set containing the junction box is configured for wired communication and is wired to the junction box.

23. The process control and/or automation network as in claim 22, wherein the wireless router that is wired to the junction box is a wireless intermediate device.

24. The process control and/or automation network as in claim 4, wherein the wireless router that is wired to the junction box is a wireless gateway device.

25. A method of selecting paths for source-destination traffic in a process control and/or automation network, the process control and/or automation network including one or more wireless end devices for transmitting data and/or receiving data, and either one or more wireless intermediate devices for transmitting data and/or receiving data and routing received data and one or more wireless gateway devices for assigning data paths, transmitting data, receiving data and routing received data, or one or more wireless intermediate devices or one or more wireless gateway devices, wherein a source-destination pair includes links between the one or more wireless end devices, and the one or more wireless intermediate devices and/or the one or more wireless gateway devices, the method of selecting paths comprising:
  a. specifying a minimum reliability requirement for a selected source-destination pair;
  b. specifying a minimum number of paths between the selected source-destination pair;
  c. determining possible paths between the selected source-destination pair;
  d. calculating the reliability of each of the possible paths, or an effective reliability of one or more groups of possible paths;
  e. identifying one or more reliable paths, or one or more reliable groups of paths, by comparing the reliability of each of the possible paths or groups of possible paths with the specified minimum reliability requirements; and
  f. assigning the minimum number of paths for the selected source-destination pair to a routing table from the identified reliable paths or the identified reliable group of paths, and discarding, or assigning as alternate paths to the routing table, identified reliable paths or identified reliable groups of paths that exceed the minimum number of paths;

wherein the wireless process control and/or automation network includes plural of the wireless intermediate devices grouped into intermediate field network sets and/or plural of the wireless gateway devices grouped into gateway field network sets, wherein at least one of the wireless intermediate devices in each intermediate field network set and at least one of the wireless gateway devices in each gateway field network set serves as an anchor packet selection device, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device, further wherein step (c) includes determining possible paths between a source-destination pair passing though a designated anchor packet selection device of a predetermined number of the field network sets.

26. The method of claim 25, wherein a plurality of usage classes are defined for wireless communication, step (a) specifies a set of minimum reliability requirements for each usage class, and step (b) specified a minimum number of paths for each usage class.

27. The method of claim 25, further comprising, if the minimum number of paths is not met in step (f),
  i. adding additional paths or groups of paths to the routing table to boost reliability, throughput or minimize delay;
  ii. improve the reliability of the weakest link through redundancy; and/or
  iii. use other radio frequency channels and/or hopping patterns.

28. The method of claim 25, further comprising specifying a number of alternate paths, and assigning the specified number of alternate paths for the source-destination pair to the routing table, wherein frames are routed through the specified number of alternate paths and the assigned minimum number of paths from step (f) only if degradation in performance is sensed in any of the links or devices in the source-destination path.

29. The method of claim 25, further comprising specifying a maximum allowable delay for a source-destination pair, and, prior to assigning in step (f), discarding any paths that exceed the maximum allowable delay even if the determined reliability of those paths meets the specified minimum reliability requirements as determined in step (e).

30. The method as in claim 26, further comprising specifying a maximum allowable delay for each usage class, and, prior to assigning in step (f), discarding any paths that exceed the maximum allowable delay for the usage class even if the determined reliability of those paths meets the specified minimum reliability requirements as determined in step (e).

31. The method of claim 25, further comprising specifying a maximum allowable throughput for a link represented as $\eta(L(x, y), max)$, prior to step (f), discarding paths that do not meet the condition $\eta(L(x, y)) \leq \eta(L(x, y), max)$ for all links y, where $\eta(L(x, y))$ represents the throughput for the y-th link of the x-th path, even if the determined reliability of those paths meets the specified minimum reliability requirements as determined in step (e).

32. The method of claim 26, wherein routing is dynamically adjusted to allow assigned and alternative paths to pass a data frame irrespective of the usage class when a timeout occurs for that data frame, when the data frame is identified as a retransmitted data frame, or when the frame error probability for a link within an assigned path exceeds a specified threshold.

33. The method of claim 26, further comprising, during abnormal channel conditions, sending a control message to wireless intermediate devices and/or wireless gateway devices to route frames irrespective of the usage class.

34. The method of claim 25, which includes optimizing routes for a group of less than all selected source-destination pairs, and prioritizing the group of selected source-destination pairs through the assigned minimum number of paths or reserving the assigned minimum number of paths exclusively for the group of selected source-destination pairs.

35. The method of claim 25, wherein at least one of the field network sets has at least one junction box,
and wherein at least one of the wireless routers is configured for wired communication and wired to a junction box,
and wherein one of the wireless routers that is wired to a junction box is designated as an anchor packet selection device through which all traffic in that field network set is routed.

36. The method of claim 25, wherein at least some of the wireless routers in a field network set include a wireless router wired to a junction box which contain stored in their memories field network set information as to which wireless routers are wired to junction boxes and their respective performance characteristics, the wireless routers having field network set information further comprising a routing module that uses the field network set information to dynamically route packets within the field network set.

37. The method of claim 25, wherein at least some of the wireless routers in a field network set include a wireless router wired to a junction box, wherein field network sets including a wireless router wired to a junction box are wired to the central control room.

38. A method of selecting paths for source-destination traffic in a wireless process control and/or automation network, the wireless process control and/or automation network including one or more wireless end devices for transmitting data and/or receiving data, and either one or more wireless intermediate devices for transmitting data and/or receiving data and routing received data and one or more wireless gateway devices for assigning data paths, transmitting data, receiving data and routing received data, or one or more wireless intermediate devices or one or more wireless gateway devices, wherein a source-destination pair includes links between the one or more wireless end devices, and the one or more wireless intermediate devices and/or the one or more wireless gateway devices, the method of selecting paths comprising:
  a. designating a maximum allowable end-to-end delay for a selected source-destination pair;
  b. determining possible paths between the selected source-destination pair;
  c. calculating an end-to-end delay for one of the possible paths;
  d. identifying an acceptable path by comparing the calculated end-to-end delay for the one of the possible paths with the maximum allowable end-to-end delay, wherein a path is deemed acceptable if the calculated end-to-end delay is equal to or less than the maximum allowable end-to-end delay;
  e. assigning the acceptable path to a routing table; and
  f. repeating steps (c)-(e) for each of the possible paths identified in step (b);
wherein the wireless process control and/or automation network includes plural of the wireless intermediate devices grouped into intermediate field network sets and/or plural of the wireless gateway devices grouped into gateway field network sets, wherein at least one of the wireless intermediate devices in each intermediate field network set and at least one of the wireless gateway devices in each gateway field network set serves as an anchor packet selection device, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device;
further wherein step (b) includes determining possible paths between a source-destination pair passing though a designated anchor packet selection device of a predetermined number of the field network sets.

39. The method of claim 38, wherein at step (a), a minimum reliability requirement and a minimum number of paths is specified for the selected source-destination pair, the method further comprising,
  calculating the reliability of each of the acceptable paths or a group of acceptable paths;
  identifying one or more reliable paths, or a group of paths, by comparing the reliability of each of the acceptable paths or a group of acceptable paths with the specified minimum reliability requirements; and
  assigning the minimum number of paths for the selected source-destination pair to a routing table from the identified reliable paths or a group of paths.

40. The method of claim 38, further comprising specifying a number of alternate paths, and assigning the specified number of alternate paths for the source-destination pair to the routing table, wherein frames are routed through the specified number of alternate paths and the assigned minimum number of paths only if degradation in performance is sensed in any of the links or devices in the source-destination path.

41. The method of claim 38, further comprising specifying a maximum allowable throughput for a link represented as $\eta(L(x, y), max)$, discarding paths that do not meet the condition $\eta(L(x, y)) \leq \eta(L(x, y), max)$ for all links y, where $\eta(L(x, y))$ represents the throughput for the y-th link of the x-th path.

42. The method of claim 38, wherein a plurality of usage classes are provided for wireless communication, and step (a) designates a maximum allowable end-to-end delay for each usage class for the selected source-destination pair.

43. The method of claim 42, wherein, during abnormal channel conditions, sending a control message to wireless intermediate devices and/or wireless gateway devices to route frames irrespective of the usage class.

44. A method of selecting paths for source-destination traffic in a wireless process control and/or automation network, the wireless process control and/or automation network including a tier of one or more wireless end devices for transmitting data and/or receiving data, and either a tier of one or more wireless intermediate devices for transmitting data and/or receiving data and routing received data and a tier of one or more wireless gateway devices for assigning data paths, transmitting data, receiving data and routing received data, or a tier of one or more wireless intermediate devices or a tier of one or more wireless gateway devices, wherein a source-destination pair includes links between the one or more wireless end devices, and the one or more wireless intermediate devices and/or the one or more wireless gateway devices, the method of selecting paths comprising:
  a. designating a maximum allowable tier delay for a selected source-destination pair and for each tier;

b. determining possible paths between the selected source-destination pair;
c. calculating a tier delay for a link or set of links within a selected one of the tiers for one of the possible paths;
d. identifying an acceptable link or set of links by comparison of the calculated tier delay for that link or set of links with the maximum allowable tier delay for the selected tier, wherein a link or set of links is deemed acceptable if the calculated tier delay is equal to or less than the maximum allowable tier delay for the selected tier;
e. repeating steps (c) and (d) for each tier of the one of the possible paths for the remaining tiers;
f. assigning the one of the possible paths for the selected source-destination pair to a routing table if all of the links or sets of links within the one of the possible paths are identified as acceptable; and
g. repeating steps (c)-(f) for each of the possible paths identified in step (b);
wherein the wireless process control and/or automation network includes plural of the wireless intermediate devices grouped into intermediate field network sets and/or plural of the wireless gateway devices grouped into gateway field network sets, wherein at least one of the wireless intermediate devices in each intermediate field network set and at least one of the wireless gateway devices in each gateway field network set serves as an anchor packet selection device, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device,
further wherein step (b) includes determining possible paths between a source-destination pair passing though a designated anchor packet selection device of a predetermined number of the field network sets.

45. The method of claim 44, wherein at step (a), a minimum reliability requirement and a minimum number of paths is specified for the selected source-destination pair, the method further comprising:
calculating the reliability of each of the acceptable paths or a group of acceptable paths;
identifying one or more reliable paths, or a group of paths, by comparing the reliability of each of the acceptable paths or a group of acceptable paths with the specified minimum reliability requirements; and
assigning the minimum number of paths for the selected source-destination pair to a routing table from the identified reliable paths or a group of paths.

46. The method of claim 45, further comprising specifying a number of alternate paths, and assigning the specified number of alternate paths for the source-destination pair to the routing table, wherein frames are routed through the specified number of alternate paths and the assigned minimum number of paths only if degradation in performance is sensed in any of the links or devices in the source-destination path.

47. The method of claim 44, further comprising
specifying a maximum allowable throughput for a link represented as $\eta(L(x, y), max)$,
and discarding paths that do not meet the condition $\eta(L(x, y)) \leq \eta(L(x, y), max)$ for all links y, where $\eta(L(x, y))$ represents the throughput for the y-th link of the x-th path.

48. The method of claim 44, wherein a plurality of usage classes are defined for wireless communication, and step (a) designates a maximum allowable tier delay for each usage class for the selected source-destination pair.

49. The method of claim 48, wherein, during abnormal channel conditions, sending a control message to wireless intermediate devices and/or wireless gateway devices to route frames irrespective of the usage class.

50. A method of selecting paths for source-destination traffic in a wireless process control and/or automation network, the wireless process control and/or automation network including a tier of one or more wireless end devices for transmitting data and/or receiving data, and either a tier of one or more wireless intermediate devices for transmitting data and/or receiving data and routing received data and a tier of one or more wireless gateway devices for assigning data paths, transmitting data, receiving data and routing received data, or a tier of one or more wireless intermediate devices or a tier of one or more wireless gateway devices, wherein a source-destination pair includes links between the one or more wireless end devices, and the one or more wireless intermediate devices and/or the one or more wireless gateway devices, the method of selecting paths comprising:
a. designating a maximum allowable end-to-end delay and a maximum allowable tier delay for a selected source-destination pair and for each tier for a selected source-destination pair;
b. determining possible paths between the selected source-destination pair;
c. calculating an end-to-end delay for one of the possible paths;
d. identifying a potentially acceptable path by comparison of the calculated end-to-end delay for the one of the possible paths with the maximum allowable tier delay, wherein a path is deemed potentially acceptable if the calculated end-to-end delay is equal to or less than the maximum allowable end-to-end delay;
e. calculating a tier delay for a link or set of links within one of the tiers in the potentially acceptable path;
f. identifying an acceptable link or set of links within that one of the tiers by comparison of the calculated tier delay for that link or set of links with the maximum allowable tier delay for that one of the tiers, wherein a link or set of links is deemed acceptable if the calculated tier delay is equal to or less than the maximum allowable tier delay for that one of the tiers;
g. repeating steps (e) and (f) for a link or set of links within each tier of the potentially acceptable path;
h. assigning the potentially acceptable path for the selected source-destination pair to a routing table if all of the links or sets of links within the one of the possible paths are identified as acceptable; and
i. repeating steps (c)-(h) for each of the possible paths identified in step (b);
wherein the wireless process control and/or automation network includes plural of the wireless intermediate devices grouped into intermediate field network sets and/or plural of the wireless gateway devices grouped into gateway field network sets, wherein at least one of the wireless intermediate devices in each intermediate field network set and at least one of the wireless gateway devices in each gateway field network set serves as an anchor packet selection device, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device, further wherein step (b) includes determining possible paths between a source-destination pair passing though a designated anchor packet selection device of a predetermined number of the field network sets.

51. The method of claim 50, wherein at step (a), a minimum reliability requirement and a minimum number of paths is specified for the selected source-destination pair, the method further comprising, calculating the reliability of each of the acceptable paths or a group of acceptable paths;

identifying one or more reliable paths, or a group of paths, by comparing the reliability of each of the acceptable paths or a group of acceptable paths with the specified minimum reliability requirements; and assigning the minimum number of paths for the selected source-destination pair to a routing table from the identified reliable paths or a group of paths.

52. The method of claim 51, further comprising specifying a number of alternate paths, and assigning the specified number of alternate paths for the source-destination pair to the routing table, wherein frames are routed through the specified number of alternate paths and the assigned minimum number of paths only if degradation in performance is sensed in any of the links or devices in the source-destination path.

53. The method of claim 50, further comprising:
specifying a maximum allowable throughput for a link represented as $\eta(L(x, y), max)$, and discarding paths that do not meet the condition $\eta(L(x, y)) \leq \eta(L(x, y), max)$ for all links y, where $\eta(L(x, y))$ represents the throughput for the y-th link of the x-th path.

54. The method of claim 50, wherein a plurality of usage classes are provided for wireless communication, and step (a) designates a maximum allowable end-to-end delay and a maximum allowable tier delay for each usage class for the selected source-destination pair.

55. The method of claim 54, wherein, during abnormal channel conditions, sending a control message to wireless intermediate devices and/or wireless gateway devices to route frames irrespective of the usage class.

56. A method of integrating a wireless process control and/or automation network with a wired network for carrying source-destination traffic, the method comprising:
a. determining and selecting existing junction boxes for wired/wireless integration;
b. providing a plurality of wireless routers modified for wired connection;
c. installing the modified wireless routers and wiring them to the existing junction boxes selected for integration;
d. determining a plurality of field network sets each including at least one modified wireless router and one or more of a wireless routers and/or junction boxes, wherein at least one of the wireless routers in each field network set serves as an anchor packet selection device, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device;
e. determining, for each source-destination pair, an anchor packet selection device through which all traffic for that source-destination pair is routed;
f. determining the total number of paths per source-destination pairs per usage class (g);
g. setting a counter h;
h. determining a set of paths is for the $h^{th}$ source-destination pair per usage class, subject to one or more selected constraints including maximum tier delay, maximum end-to-end delay, maximum throughput, minimum link reliability level, required minimum reliability per usage class, CPU maximum usage level for the modified wireless router, the maximum number of links per path, or a combination of at least one of the foregoing constraints;
i. determining whether the set of paths meet all of the selected constraints;
j. incrementing h by 1 if the constraints are met;
k. assigning the set of paths is assigned for the source-destination pair per usage class of h=g.

57. A communication path optimization system for controlling a wireless process control and/or automation network, the wireless process control and/or automation network including one or more wireless end devices for transmitting data and/or receiving data, and either one or more wireless intermediate devices for transmitting data and/or receiving data and routing received data and one or more wireless gateway devices for assigning data paths, transmitting data, receiving data and routing received data, or one or more wireless intermediate devices or one or more wireless gateway devices, wherein at least one source-destination pair includes plural links between the one or more wireless end devices, and the one or more wireless intermediate devices and/or the one or more wireless gateway devices, the communication path optimization system comprising:

a memory that stores
a set of routing rules specifying a minimum reliability requirement for a selected source-destination pair and
a specified minimum number of paths between the selected source-destination pair;
a processor coupled to the memory; and
a route optimization module executable by the processor and operable to transmit assigned reliable paths resulting from execution of the route optimization module to a routing table for instructing at least one of the one or more wireless gateway devices and/or the wireless intermediate devices, the route optimization module including:
a path determination sub-module for determination of possible paths between the selected source-destination pair;
a reliability calculation sub-module for calculation of the reliability of each of the possible paths, or an effective reliability of one or more groups of possible paths;
a reliable path identification sub-module for identification of one or more reliable paths, or a one or more reliable groups of paths, by comparing the reliability of each of the possible paths or groups of possible paths with the specified minimum reliability requirements specified in the set of routing rules; and
a path assignment sub-module for assignment of the minimum number of paths specified in the set of routing rules for the selected source-destination pair to the routing table from the identified reliable paths or the identified reliable groups of paths, and discarding, or assigning as alternate paths to the routing table, identified reliable paths or identified reliable groups of paths that exceed the minimum number of paths;

wherein the path determination sub-module is for determination of possible paths between the selected source-destination pair passing through a designated anchor point in a defined field network set, such that once an anchor point is designated for a particular source-destination pair, all traffic between that source-destination pair will pass through that particular anchor point until either an operator action or a predetermined condition results in a re-designation of the traffic for that particular source-destination pair to a different anchor point.

58. The communication path optimization system of claim 57, wherein the processor that executes the route optimization module resides in a wireless gateway device.

59. The communication path optimization system of claim 58, in which the wireless process control and/or automation network includes a plurality of wireless gateway devices, wherein the wireless gateway device that executes the route optimization module is a master wireless gateway device.

60. The communication path optimization system of claim 57, wherein the processor that executes the route optimization module resides in a computing device separate from a wireless gateway device.

61. A communication path optimization system for controlling a wireless process control and/or automation network, the wireless process control and/or automation network including one or more wireless end devices for transmitting data and/or receiving data, and either one or more wireless intermediate devices for transmitting data and/or receiving data and routing received data and one or more wireless gateway devices for assigning data paths, or transmitting data, receiving data and routing received data, or one or more wireless intermediate devices or one or more wireless gateway devices, wherein at least one source-destination pair includes links between the one or more wireless end devices, and the one or more wireless intermediate devices and/or the one or more wireless gateway devices, the communication path optimization system comprising:

a memory that stores
a set of routing rules specifying a maximum allowable end-to-end delay for a selected source-destination pair;
a processor coupled to the memory; and
an end-to-end delay minimization module executable by the processor and operable to transmit assigned acceptable paths resulting from execution of the end-to-end delay minimization module to a routing table for instructing at least one of the one or more wireless gateway devices and/or the wireless intermediate devices, the end-to-end delay minimization module including:
a path determination sub-module for determination of possible paths between the selected source-destination pair;
an end-to-end delay calculation sub-module for calculation of an end-to-end delay for one of the possible paths;
a path identification sub-module for identification of an acceptable path by comparing the calculated end-to-end delay for the one of the possible paths with the maximum allowable end-to-end delay, wherein a path is deemed acceptable if the calculated end-to-end delay is equal to or less than the maximum allowable end-to-end delay; and
a path assignment sub-module for assignment of the acceptable path to the routing table, wherein the end-to-end delay calculation sub-module, the path identification sub-module and the path assignment sub-module are executed for each of the possible paths identified in the path determination sub-module;

wherein the path determination sub-module is for determination of possible paths between the selected source-destination pair passing through a designated anchor point in a defined field network set, such that once an anchor point is designated for a particular source-destination pair, all traffic between that source-destination pair will pass through that particular anchor point until either an operator action or a predetermined condition results in a re-designation of the traffic for that particular source-destination pair to a different anchor point.

62. A communication path optimization system for controlling a wireless process control and/or automation network, the wireless process control and/or automation network including a tier of one or more wireless end devices for transmitting data and/or receiving data, and either a tier of one or more wireless intermediate devices for transmitting data and/or receiving data and routing received data, and a tier of one or more wireless gateway devices for assigning data paths, transmitting data, receiving data and routing received data, or a tier of one or more wireless intermediate devices or a tier of one or more wireless gateway devices, wherein at least one source-destination pair includes links between the one or more wireless end devices, and the one or more wireless intermediate devices and/or the one or more wireless gateway devices, the communication path optimization system comprising:

a memory that stores
a set of routing rules specifying a maximum allowable tier delay for a selected source-destination pair;
a processor coupled to the memory; and
a tier delay minimization module executable by the processor and operable to transmit assigned acceptable paths resulting from execution of the tier delay minimization module to a routing table for instructing at least one of the one or more wireless gateway devices and/or the wireless intermediate devices, the tier delay minimization module including:
a path determination sub-module for determination of possible paths between the selected source-destination pair;
a tier delay calculation sub-module for calculation of an end-to-end delay for one of the possible paths;
a link identification sub-module for identification of an acceptable link or set of links by comparison of the calculated tier delay for that link or set of links with the maximum allowable tier delay for that one of the tiers, wherein a link or set of links is deemed acceptable if the calculated tier delay is equal to or less than the maximum allowable tier delay for that one of the tiers; and
a path assignment sub-module for assignment of an acceptable path to the routing table, wherein the tier delay calculation sub-module and the link identification sub-module are executed for each tier of the one of the possible paths, and wherein the tier delay calculation sub-module, the link identification sub-module and the path assignment sub-module are executed for each of the possible paths identified in the path determination sub-module;

wherein the path determination sub-module is for determination of possible paths between the selected source-destination pair passing through a designated anchor point in a defined field network set, such that once an anchor point is designated for a particular source-destination pair, all traffic between that source-destination pair will pass through that particular anchor point until either an operator action or a predetermined condition results in a re-designation of the traffic for that particular source-destination pair to a different anchor point.

63. A communication path optimization system for controlling a wireless process control and/or automation network, the wireless process control and/or automation network including a tier of one or more wireless end devices for transmitting data and/or receiving data, and either a tier of one or more wireless intermediate devices for transmitting data and/or receiving data and routing received data and a tier of one or more wireless gateway devices for assigning data paths, transmitting data, receiving data and routing received data, or a tier of one or more wireless intermediate devices or a tier of one or more wireless gateway devices, wherein at least one source-destination pair includes links between the one or more wireless end devices, and the one or more wireless intermediate devices and/or the one or more wireless gateway devices, the communication path optimization system comprising:
   a memory that stores
      a set of routing rules specifying a maximum allowable tier delay and a maximum allowable end-to-end delay for a selected source-destination pair;
   a processor coupled to the memory; and
   a path determination module for determination of possible paths between the selected source-destination pair;
   an end-to-end delay minimization module executable by the processor and operable to identify potential acceptable paths resulting from execution of the end-to-end delay minimization module, the end-to-end delay minimization module including:
      an end-to-end delay calculation sub-module for calculation of an end-to-end delay for one of the possible paths;
      a path identification sub-module for identification of a potentially acceptable path by comparing the calculated end-to-end delay for the one of the possible paths with the maximum allowable end-to-end delay, wherein a path is deemed potentially acceptable if the calculated end-to-end delay is equal to or less than the maximum allowable end-to-end delay; and
   a tier delay minimization module executable by the processor and operable to transmit assigned acceptable paths resulting from execution of the tier delay minimization module to a routing table for instructing at least one of the one or more wireless gateway devices and/or the wireless intermediate devices, the tier delay minimization module including:
      a tier delay calculation sub-module for calculation of an end-to-end delay for one of the potentially acceptable paths;
      a link identification sub-module for identification of an acceptable link or set of links by comparison of the calculated tier delay for that link or set of links with the maximum allowable tier delay for that one of the tiers, wherein a link or set of links is deemed acceptable if the calculated tier delay is equal to or less than the maximum allowable tier delay for that one of the tiers; and
      a path assignment sub-module for assignment of an acceptable path to the routing table,
   wherein the tier delay calculation sub-module and the link identification sub-module are executed for each tier of the potentially acceptable paths, and
   wherein the end-to-end delay minimization module and tier delay minimization module are executed for each of the possible paths identified in the path determination module;
   wherein the path determination sub-module is for determination of possible paths between the selected source-destination pair passing through a designated anchor point in a defined field network set, such that once an anchor point is designated for a particular source-destination pair, all traffic between that source-destination pair will pass through that particular anchor point until either an operator action or a predetermined condition results in a re-designation of the traffic for that particular source-destination pair to a different anchor point.

64. A communication path optimization system for controlling a wireless process control and/or automation network, the wireless process control and/or automation network including a tier of one or more wireless end devices for transmitting data and/or receiving data, and either a tier of one or more wireless intermediate devices for transmitting data and/or receiving data and routing received data and a tier of one or more wireless gateway devices for assigning data paths, transmitting data, receiving data and routing received data, or a tier of one or more wireless intermediate devices or a tier of one or more wireless gateway devices, wherein at least one source-destination pair includes links between the one or more wireless end devices, and the one or more wireless intermediate devices and/or the one or more wireless gateway devices, the communication path optimization system comprising:
   a memory that stores
      a set of routing rules specifying a maximum allowable tier delay and a maximum allowable end-to-end delay for a selected source-destination pair;
   a processor coupled to the memory; and
   a path determination module for determination of possible paths between the selected source-destination pair passing through a designated anchor packet selection device of a field network set, the field network set including a group of wireless intermediate devices and/or wireless gateway devices, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device;
   an end-to-end delay minimization module executable by the processor and operable to identify potential acceptable paths resulting from execution of the end-to-end delay minimization module, the end-to-end delay minimization module including:
      an end-to-end delay calculation sub-module for calculation of an end-to-end delay for one of the possible paths;
      a path identification sub-module for identification of a potentially acceptable path by comparing the calculated end-to-end delay for the one of the possible paths with the maximum allowable end-to-end delay, wherein a path is deemed potentially acceptable if the calculated end-to-end delay is equal to or less than the maximum allowable end-to-end delay; and a tier delay minimization module executable by the processor and operable to transmit assigned acceptable paths resulting from execution of the tier delay minimization module to a routing table for instructing at least one of the one or more wireless gateway devices and/or the wireless intermediate devices, the tier delay minimization module including:
- a tier delay calculation sub-module for calculation of an end-to-end delay for one of the potentially acceptable paths;
- a link identification sub-module for identification of an acceptable link or set of links by comparison of the calculated tier delay for that link or set of links with the maximum allowable tier delay for that one of the tiers, wherein a link or set of links is deemed acceptable if the calculated tier delay is equal to or less than the maximum allowable tier delay for that one of the tiers; and
- a path assignment sub-module for assignment of an acceptable path to the routing table, wherein the tier delay calculation sub-module and the link identification sub-module are executed for each tier of the potentially acceptable paths, and wherein the end-to-end delay minimization module and tier delay minimization module are executed for each of the possible paths identified in the path determination module.

65. A method of selecting paths in a wireless process control and/or automation network, the wireless process control and/or automation network including a tier of one or more wireless end devices for transmitting data and/or receiving data, and either a tier of one or more wireless intermediate devices for transmitting data and/or receiving data and routing received data and a tier of one or more wireless gateway devices for assigning data paths, transmitting data, receiving data and routing received data, a tier of one or more wireless intermediate devices or a tier of one or more wireless gateway devices, wherein a source-destination pair includes links between the one or more wireless end devices, and the one or more wireless intermediate devices and/or the one or more wireless gateway devices, the method of selecting paths comprising:
a. determining possible paths between a selected source-destination pair;
b. identifying one or more reliable paths, or one or more reliable groups of paths, by comparing the reliability of each of the possible paths or groups of possible paths with a specified minimum reliability requirement;
c. identifying a potentially acceptable path by comparison of a calculated end-to-end delay for the one of the possible paths with a maximum allowable tier delay, wherein a path is deemed potentially acceptable if the calculated end-to-end delay is equal to or less than the maximum allowable end-to-end delay;
d. identifying an acceptable link or set of links by comparison of a calculated tier delay for a selected link or set of links with a maximum allowable tier delay for a selected tier, wherein a link or set of links is deemed acceptable if the calculated tier delay is equal to or less than the maximum allowable tier delay for that one of the tiers; and
e. assigning the potentially acceptable path for the selected source-destination pair to a routing table if all of the links or sets of links within the one of the possible paths are identified as acceptable in step (d) and if the potentially acceptable path is identified as reliable in step (b);

wherein the wireless process control and/or automation network includes plural of the wireless intermediate devices grouped into intermediate field network sets and/or plural of the wireless gateway devices grouped into gateway field network sets, wherein at least one of the wireless intermediate devices in each intermediate field network set and at least one of the wireless gateway devices in each gateway field network set serves as an anchor packet selection device, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device, further wherein step (a) includes determining possible paths between a source-destination pair passing though a designated anchor packet selection device of a predetermined number of the field network sets.

66. A communication path optimization system for controlling a wireless process control and/or automation network, the wireless process control and/or automation network including a tier of one or more wireless end devices for transmitting data and/or receiving data, and either a tier of one or more wireless intermediate devices for transmitting data and/or receiving data and routing received data, and a tier of one or more wireless gateway devices for assigning data paths, transmitting data, receiving data and routing received data, a tier of one or more wireless intermediate devices or a tier of one or more wireless gateway devices, wherein at least one source-destination pair includes links between the one or more wireless end devices, and the one or more wireless intermediate devices and/or the one or more wireless gateway devices, the communication path optimization system comprising:
a memory that stores
- a set of routing rules specifying a minimum reliability requirement for a selected source-destination pair,
- a specified minimum number of paths between the selected source-destination pair
- a set of routing rules specifying a maximum allowable tier delay and a maximum allowable end-to-end delay for a selected source-destination pair, and
- a routing table containing instructions to be processed by at least one of the one or more wireless gateway devices and/or the wireless intermediate devices;

a processor coupled to the memory;
a path determination module for determination of possible paths between the selected source-destination pair passing through a designated anchor packet selection device of a field network set, the field network set including a group of wireless intermediate devices and/or wireless gateway devices, such that once a particular anchor packet selection device is designated for a particular source-destination pair, all traffic between that source-destination pair will pass through that particular anchor packet selection device until either an operator action or a predetermined condition results in a re-designation of the traffic for that particular source-destination pair to a different anchor packet selection device;
a route optimization module executable by the processor and operable to identify reliable paths between the selected source-destination pair;
an end-to-end delay minimization module executable by the processor and operable to identify potential acceptable paths that have a calculated end-to-end delay which is equal to or less than a maximum allowable end-to-end delay; and a tier delay minimization module executable by the processor and operable to identify potential acceptable links or sets of links by comparison of a calculated tier delay for a selected link or set of links with a maximum allowable tier delay for a selected tier;

wherein the potentially acceptable path for the selected source-destination pair is assigned to the routing table stored in the memory if all of the links or sets of links within the one of the possible paths are identified by the tier delay minimization module and the route optimization module, and wherein the end-to-end delay minimization module and tier delay minimization module are executed for each of the possible paths identified in the path determination module.

\* \* \* \* \*

UNITED STATES PATENT AND TRADEMARK OFFICE
CERTIFICATE OF CORRECTION

PATENT NO. : 8,942,098 B2
APPLICATION NO. : 13/508083
DATED : January 27, 2015
INVENTOR(S) : Daraiseh et al.

Page 1 of 1

It is certified that error appears in the above-identified patent and that said Letters Patent is hereby corrected as shown below:

In the Claims

For col. 52, l. 19-20, correct:
"k. assigning the set of paths is assigned for the source-destination pair per usage class of h=g."
to
"k. assigning the set of paths for the source-destination pair per usage class if h=g."

Signed and Sealed this
Twenty-fifth Day of August, 2015

Michelle K. Lee
*Director of the United States Patent and Trademark Office*